US012650518B2

(12) United States Patent　　(10) Patent No.:　US 12,650,518 B2
Fujisawa et al.　　(45) Date of Patent:　Jun. 9, 2026

(54) RANGING DEVICE

(71) Applicant: DENSO CORPORATION, Kariya-city (JP)

(72) Inventors: Takayoshi Fujisawa, Kariya-city (JP); Akifumi Ueno, Kariya-city (JP); Noriyuki Ozaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 142 days.

(21) Appl. No.: 18/740,309

(22) Filed: Jun. 11, 2024

(65) Prior Publication Data

US 2024/0353564 A1　　Oct. 24, 2024

Related U.S. Application Data

(60) Division of application No. 17/653,528, filed on Mar. 4, 2022, now Pat. No. 12,422,561, which is a (Continued)

(30) Foreign Application Priority Data

Sep. 6, 2019　(JP) ................................. 2019-163207
Sep. 27, 2019　(JP) ................................. 2019-177385
(Continued)

(51) Int. Cl.
　　*G01S 7/4861*　　(2020.01)
　　*G01S 7/487*　　(2006.01)
　　(Continued)
(52) U.S. Cl.
　　CPC .......... *G01S 17/931* (2020.01); *G01S 7/4861* (2013.01); *G01S 7/487* (2013.01); *G01S 17/10* (2013.01)

(58) Field of Classification Search
　　CPC ...... G01S 17/931; G01S 7/4861; G01S 7/487; G01S 17/10; G01S 7/484; G01S 17/87; (Continued)

(56) References Cited

U.S. PATENT DOCUMENTS 7,391,795 B2 * 6/2008 Yumoto ................ G02F 1/3534
　　　　　　　　　　　　　　　　372/21
9,537,956 B1　　1/2017 Sibenac et al.
(Continued)

FOREIGN PATENT DOCUMENTS

JP　　　7-72237　A　　3/1995
JP　　10-253760　A　　9/1998
(Continued)

OTHER PUBLICATIONS

U.S. Appl. No. 17/653,528 and its entire file history.

*Primary Examiner* — Daniel L Murphy
*Assistant Examiner* — Amie M Ndure
(74) *Attorney, Agent, or Firm* — Precision Patents, P.C.

(57)　　　ABSTRACT

In a ranging device, a characteristic setting unit is configured to extract, from one or more pieces of received-light information representing changes with time in amount of received light acquired by the light receiving unit, at least one of a received-light amount range and a light reception time range of pulsed light other than emitted light from the light emitting unit, as a specified range. A received-light integration unit is configured to generate integrated received-light information by integrating the received-light information on a time axis with emission timings matched over a plurality of light receptions. A distance calculation unit is configured to exclude or identify distance noise formed of pulsed waveforms arising from pulsed light other than the emitted light, using the specified range extracted by
(Continued)

the characteristic setting unit, and calculate a distance to the object reflecting the emitted light.

11 Claims, 56 Drawing Sheets

Related U.S. Application Data continuation of application No. PCT/JP2020/033103, filed on Sep. 1, 2020.

(30)     Foreign Application Priority Data

| | | |
|---|---|---|
| Jan. 30, 2020 | (JP) ................................. | 2020-013600 |
| Jul. 22, 2020 | (JP) ................................. | 2020-125653 |

(51)  Int. Cl.
    *G01S 17/10*      (2020.01)
    *G01S 17/931*    (2020.01)

(58)  Field of Classification Search
    CPC .... G01S 7/4876; G01S 7/4863; G01S 17/894;
                                          G01C 3/06
    See application file for complete search history.

(56)     References Cited

U.S. PATENT DOCUMENTS

| | | | |
|---|---|---|---|
| 12,422,561 B2 * | 9/2025 | Fujisawa ............... | G01S 7/4863 |
| 2005/0207943 A1 * | 9/2005 | Puzey ...................... | C12Q 1/04 |
| | | | 422/82.05 |
| 2006/0013270 A1 * | 1/2006 | Yumoto ................ | G02F 1/3775 |
| | | | 372/21 |
| 2007/0285649 A1 | 12/2007 | Nakamura | |
| 2016/0069998 A1 | 3/2016 | Takasuka et al. | |
| 2019/0265333 A1 | 8/2019 | Ueno et al. | |
| 2022/0187470 A1 * | 6/2022 | Fujisawa ................ | G01S 7/487 |

FOREIGN PATENT DOCUMENTS

| | | | |
|---|---|---|---|
| JP | 1998253760 | * | 9/1998 |
| JP | 11-160432 A | | 6/1999 |
| JP | 5644294 B2 | | 12/2014 |
| JP | 2015-103164 A | | 6/2015 |
| JP | 2017-125682 A | | 7/2017 |
| JP | 2019-95353 A | | 6/2019 |

* cited by examiner

FIG.2

FIG.4
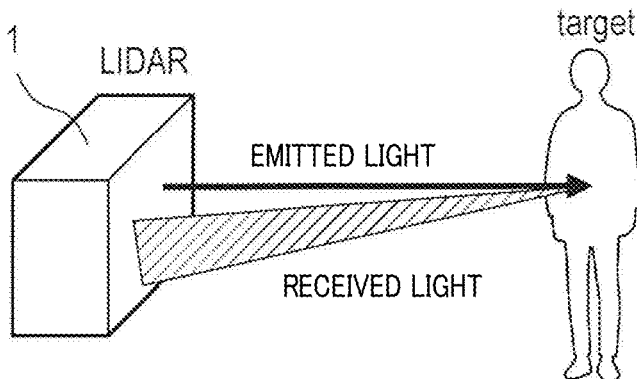
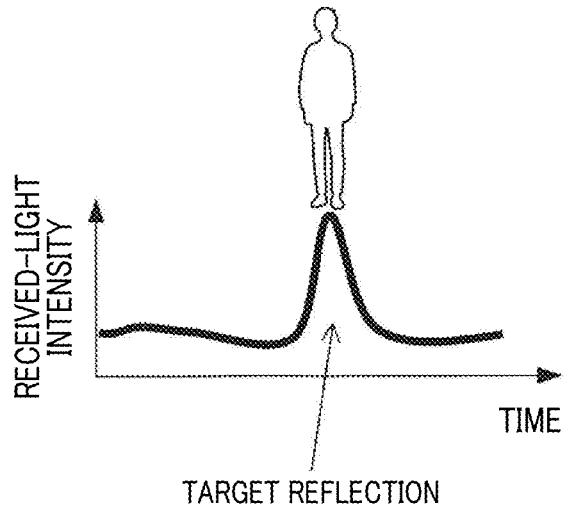

FIG.5
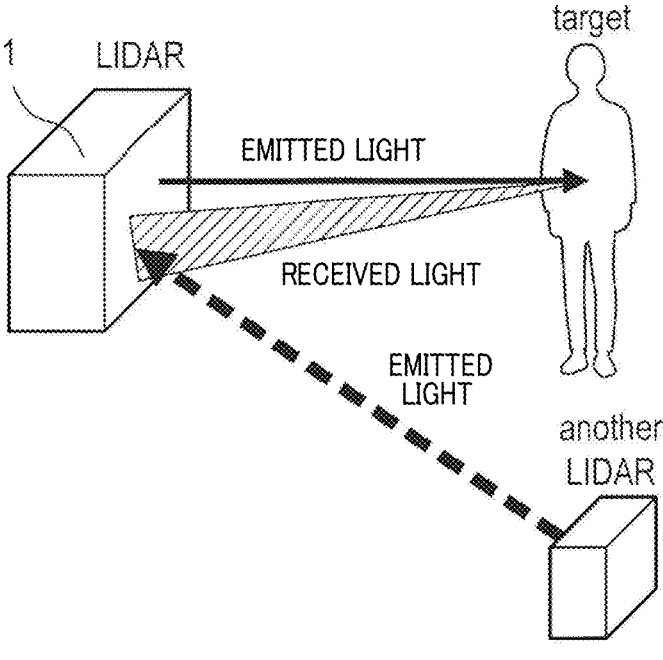
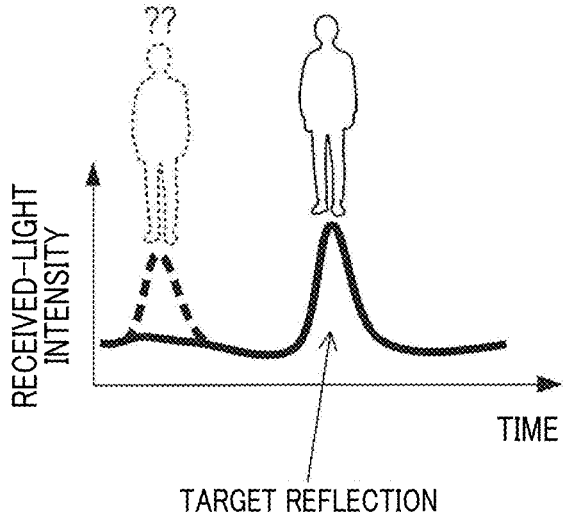

Figure 35:
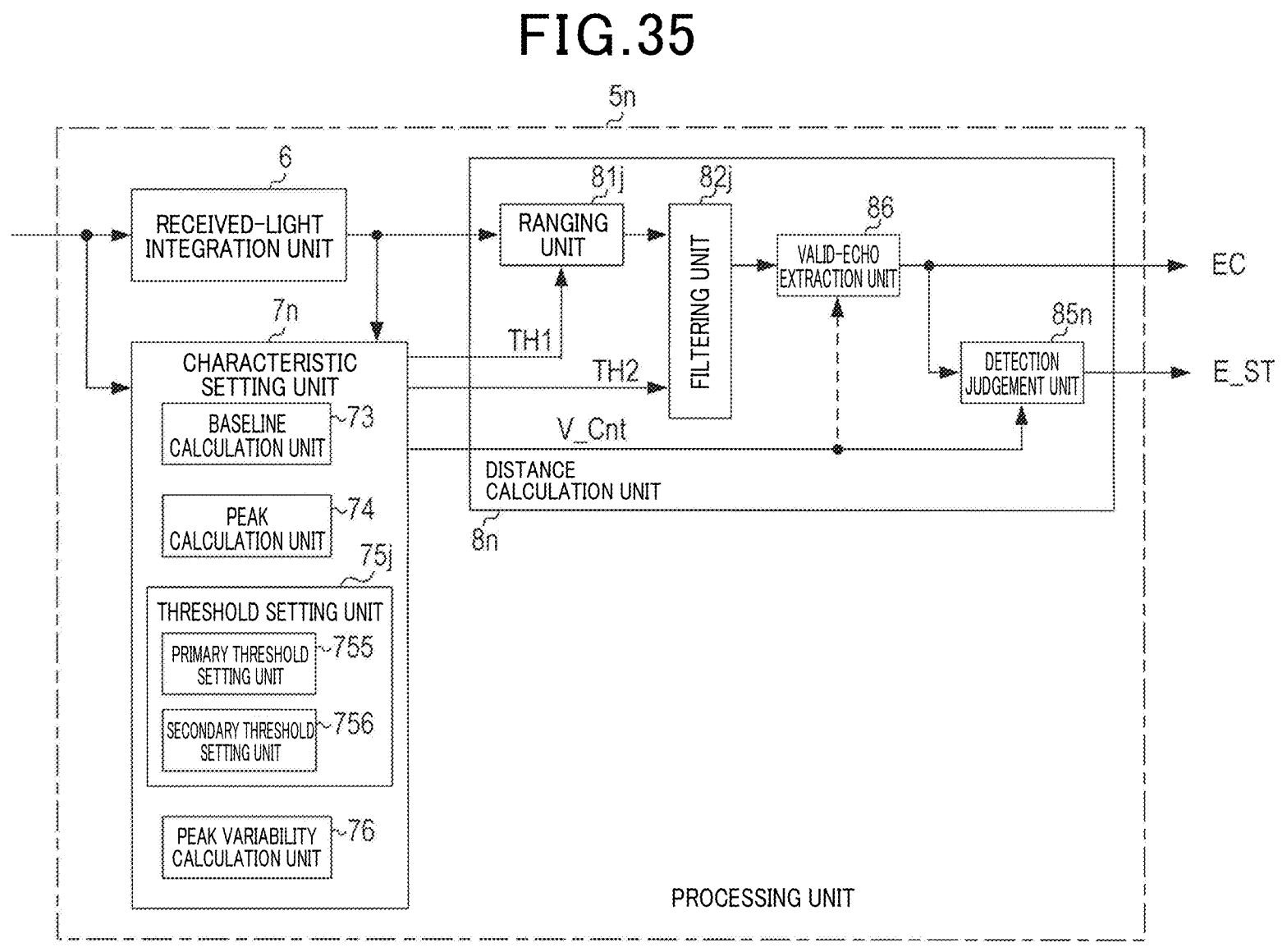

RECEIVED-LIGHT INTEGRATION UNIT

CHARACTERISTIC SETTING UNIT

BASELINE CALCULATION UNIT

PEAK CALCULATION UNIT

THRESHOLD SETTING UNIT

PRIMARY THRESHOLD SETTING UNIT

SECONDARY THRESHOLD SETTING UNIT

PEAK VARIABILITY CALCULATION UNIT

RANGING UNIT

FILTERING UNIT

VALID-ECHO EXTRACTION UNIT

DETECTION JUDGEMENT UNIT

DISTANCE CALCULATION UNIT

PROCESSING UNIT

EC

E_ST

TH1

TH2

V_Cnt

Figure 41:
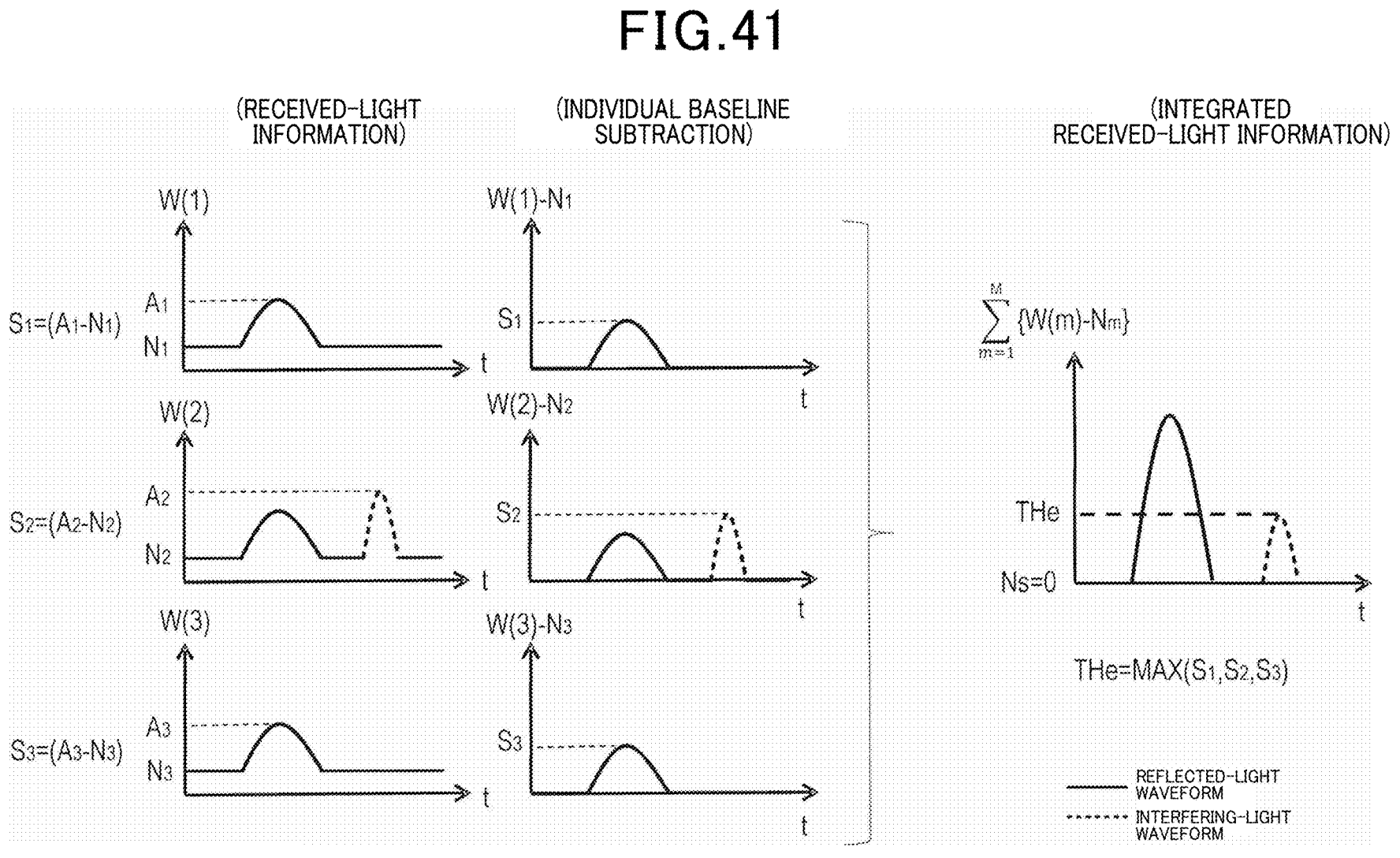

(RECEIVED-LIGHT INFORMATION)

(INDIVIDUAL BASELINE SUBTRACTION)

(INTEGRATED RECEIVED-LIGHT INFORMATION)

$S_1=(A_1-N_1)$ $S_2=(A_2-N_2)$ $S_3=(A_3-N_3)$ $W(1)-N_1$ $W(2)-N_2$ $W(3)-N_3$ $$\sum_{m=1}^{M}\{W(m)-N_m\}$$

$THe=MAX(S_1,S_2,S_3)$ $Ns=0$

REFLECTED-LIGHT WAVEFORM

INTERFERING-LIGHT WAVEFORM

FIG.47
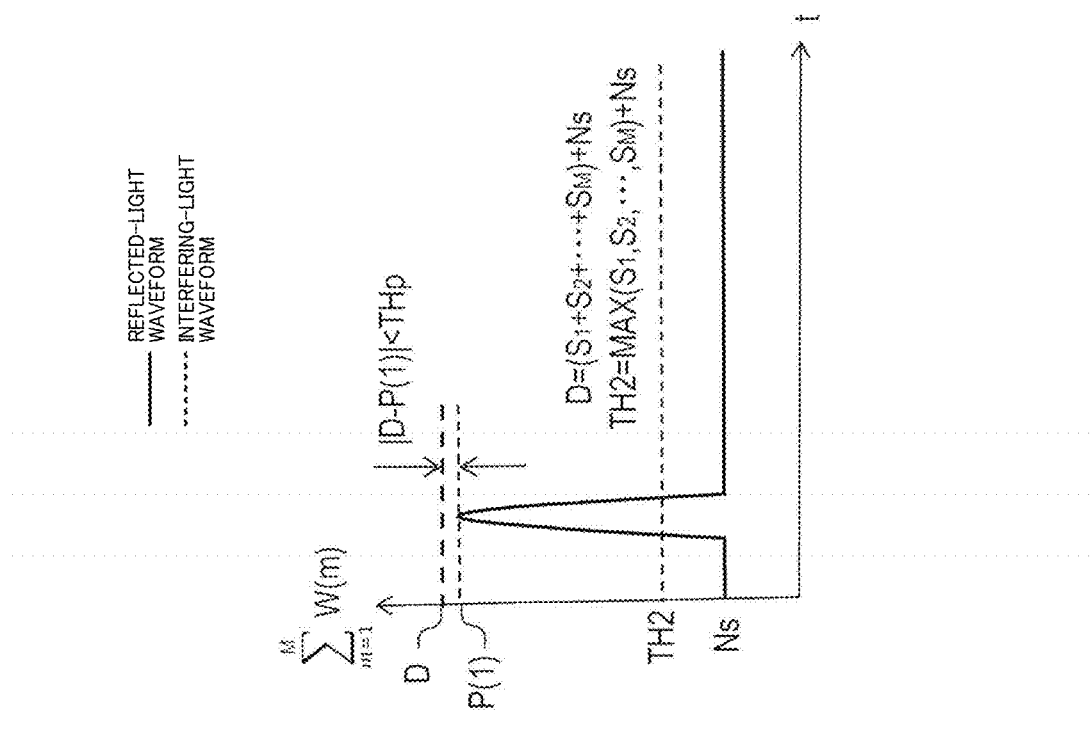
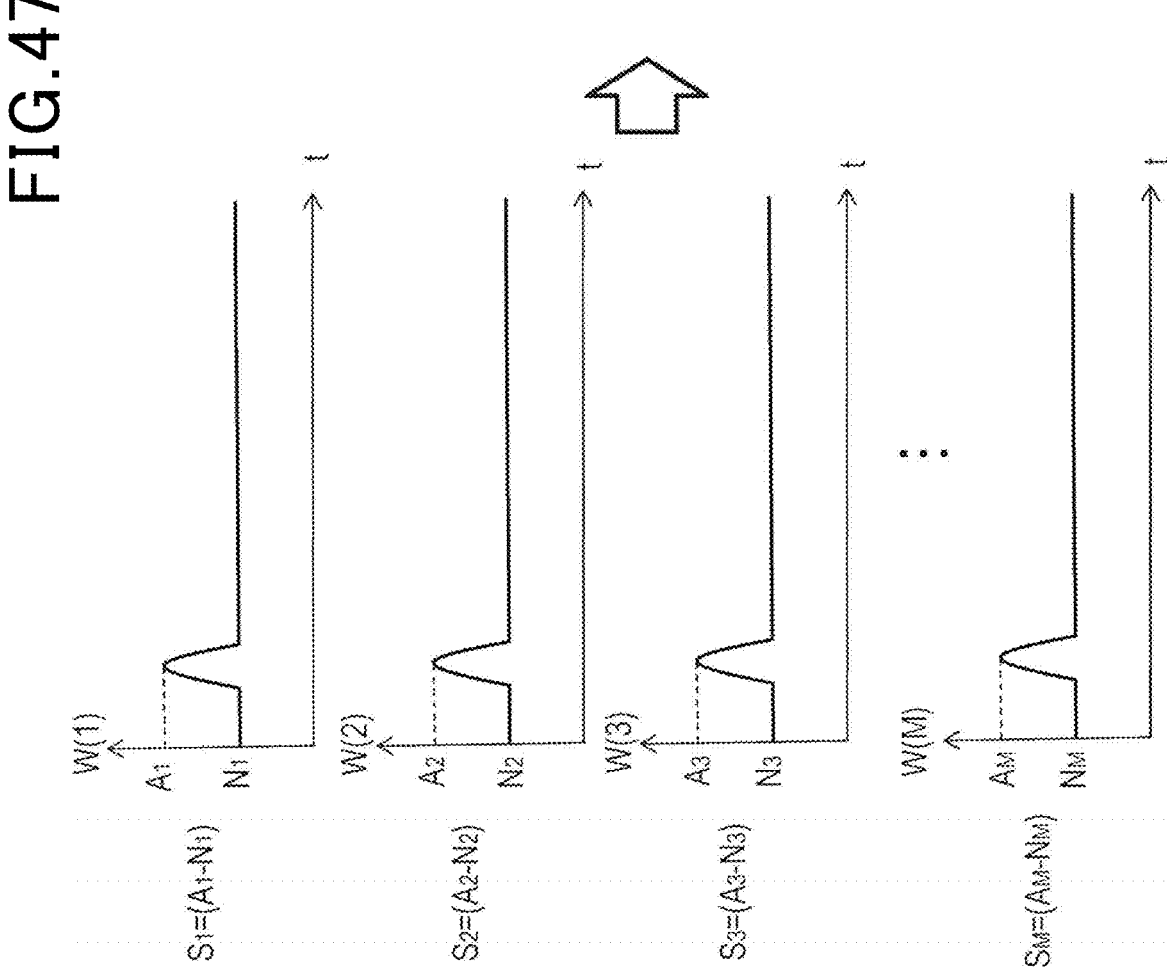

RANGING DEVICE

CROSS-REFERENCE TO RELATED APPLICATION

This application is a divisional application of Ser. No. 17/653,528, filed on Mar. 4, 2022, which is a continuation application of International Application No. PCT/JP2020/033103 filed Sep. 1, 2020 which designated the U.S. and claims priority to Japanese Patent Application No. 2019-163207 filed with the Japan Patent Office on Sep. 6, 2019, Japanese Patent Application No. 2019-177385 filed with the Japan Patent Office on Sep. 27, 2019, Japanese Patent Application No. 2020-013600 filed with the Japan Patent Office on Jan. 30, 2020, and Japanese Patent Application No. 2020-125653 filed with the Japan Patent Office on Jul. 22, 2020, the entire contents of each of which are incorporated herein by reference.

BACKGROUND

Technical Field

This disclosure relates to a technique for measuring a distance from an object that reflects light.

Related Art

Ranging devices are known that measure a time of flight (TOF) of light from emission to reception by emitting light and receiving reflected light from an object and determines a distance to the object from the measured TOF. TOF is an abbreviation for Time of Flight.

A known ranging device uses an array of multiple SPADs as a photodetector. "SPAD" is an abbreviation for Single Photon Avalanche Diode, which is a highly sensitive avalanche photodiode that operates in the Geiger mode.

In the photodetector using the SPAD array, the number of pulse signals output from the respective SPADs (hereinafter referred to as the number of responses) is counted. A waveform represented by the time series of counted values is detected as a received-light waveform. In addition, the effects of disturbance light incident on the SPAD array are suppressed by repeating the measurement and integrating the received-light waveforms.

BRIEF DESCRIPTION OF THE DRAWINGS

In the accompanying drawings:

FIG. 2 is an illustration of a relationship between emission timing and received-light waveform;

FIG. 4 is an illustration of a relationship between presence of a target and received-light waveform;

FIG. 5 is an illustration of a received-light waveform when emitted light from another ranging device is received;

FIG. 34 is a block diagram of a ranging device according to a thirteenth embodiment;

FIG. 35 is a block diagram of a ranging device according to a fourteenth embodiment;

FIG. 39 is a block diagram of a ranging device according to a fifteenth embodiment;

FIG. 41 is an illustration of a procedure of calculating integrated received-light information using a post-subtraction integration method;

FIG. 47 is an illustration of each piece of received-light information and integrated received-light information in a case where there are no interfering light peaks;

FIG. 53 is an illustration of emission timings when the output interval is randomly varied in each of two light emitting units;

FIG. 54 is an illustration of emission timings when each of two light emitting units has a different and constant output interval;

FIG. 56 is an illustration of a process performed by the distance calculation unit illustrated in FIG. 55;

FIG. 58 is an illustration of a process performed by the distance calculation unit illustrated in FIG. 57.

DESCRIPTION OF SPECIFIC EMBODIMENTS

Figure 1:
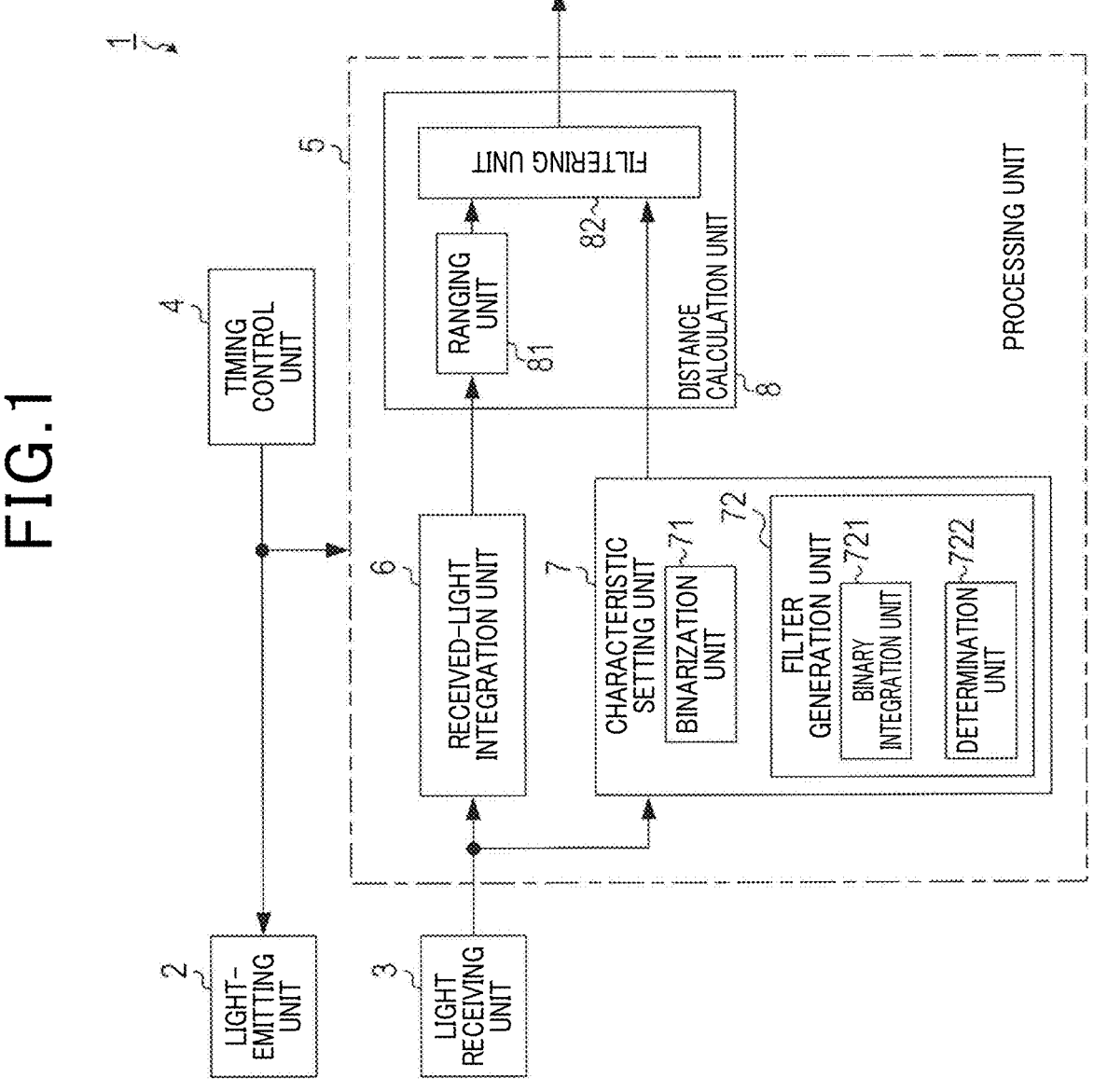
FIG. 1 is a block diagram of a ranging device according to a first embodiment.

According to a result of detailed research that was performed by the present inventors, the following issue was found with the technique described in JP 5644294 B.

For example, when the ranging device is mounted to a vehicle, emitted light from a ranging device mounted to another vehicle may be mistakenly detected as reflected light from an object. That is, since the light-reception timing is acquired from a pulsed waveform in the received-light waveform to calculate the TOF, the pulsed waveform appears at the light-reception timing of the emitted light from the other ranging device. Even if such a pulsed waveform is singularly detected, the intensity of the received light is so high that, unlike the case of normal noise, the suppression effect of the integration is not sufficient, and the received light may be mistakenly recognized as a reflection from a target. The similar issue may also occur in cases where emitted light from other ranging devices not mounted to the vehicle, so-called interfering light, is received. In view of the foregoing, it is desired to have a technique for suppressing false detections due to pulsed interfering light.

One aspect of the present disclosure provides a ranging device including a light emitting unit, a light receiving unit, a characteristic setting unit, a received-light integration unit, and a distance calculation unit.

The light emitting unit is configured to emit light toward an object. The light receiving unit is configured to receive light reflected from the object. The characteristic setting unit is configured to extract, from one or more pieces of received-light information representing changes with time in amount of received light acquired by the light receiving unit, at least one of a received-light amount range and a light reception time range of pulsed light other than emitted light from the light emitting unit, as a specified range.

The received-light integration unit is configured to generate integrated received-light information by integrating at least a part of information acquired from the received-light information on a time axis with emission timings matched over a plurality of light receptions. The distance calculation unit is configured to exclude or identify distance noise formed of pulsed waveforms arising from pulsed light other than the emitted light using the specified range extracted by the characteristic setting unit, and calculate a distance to the object reflecting the emitted light.

With such a configuration, the distance to the object is calculated using the integrated received-light information that is an integration of a plurality of pieces of received-light information, which enables suppression of the amount of received light arising from pulsed light other than emitted light in the received-light waveform represented by the integrated received-light information.

Moreover, the distance noise is excluded or identified using the specified range extracted from the plurality of pieces of received-light information to be integrated. This can suppress false detections based on distance noise, that is, this can suppress detection of the distance even though there is no object.

Hereinafter, exemplary embodiments of the present disclosure will be described in detail with reference to the accompanying drawings, in which like reference numerals refer to like or similar elements, duplicated description thereof will be omitted.

1. First Embodiment

1-1. Configuration

The ranging device 1 illustrated in FIG. 1 is a so-called LIDAR device, which is mounted to and used in a vehicle and measures a distance to an object from a measured round trip time of light by emitting light and receiving reflected light from the object that reflected the emitted light. LIDAR is an abbreviation for Light Detection and Ranging.

As illustrated in FIG. 1, the ranging device 1 includes a light emitting unit 2, a light receiving unit 3, a timing control unit 4, and a processing unit 5.

The light emitting unit 2 includes one or more light-emitting elements and repeatedly emits pulsed laser light according to emission trigger signals from the timing control unit 4. For example, a laser diode may be used as the light-emitting element.

The light receiving unit 3 includes a two-dimensional array of SPADs and a photodetector. "SPAD" is an abbreviation for Single Photon Avalanche Diode. Each SPAD is an avalanche photodiode (APD) that operates in the Geiger mode. The Geiger mode is an operation mode in which a reverse bias voltage higher than a breakdown voltage is applied to the APD. The SPAD breaks down upon incidence of a photon. The photodetector detects, for each SPAD, a voltage change when the SPAD breaks down, outputs a digital pulse of a predefined pulse width, and aggregates the number of pulses detected every preset unit time. Based on the aggregate result, the received-light information representing the relationship between time and amount of light is generated by sampling the amount of light received over a certain period of time with the emission timing as the start time. The waveform represented by the received-light information is referred to as the received-light waveform.

Figure 2:
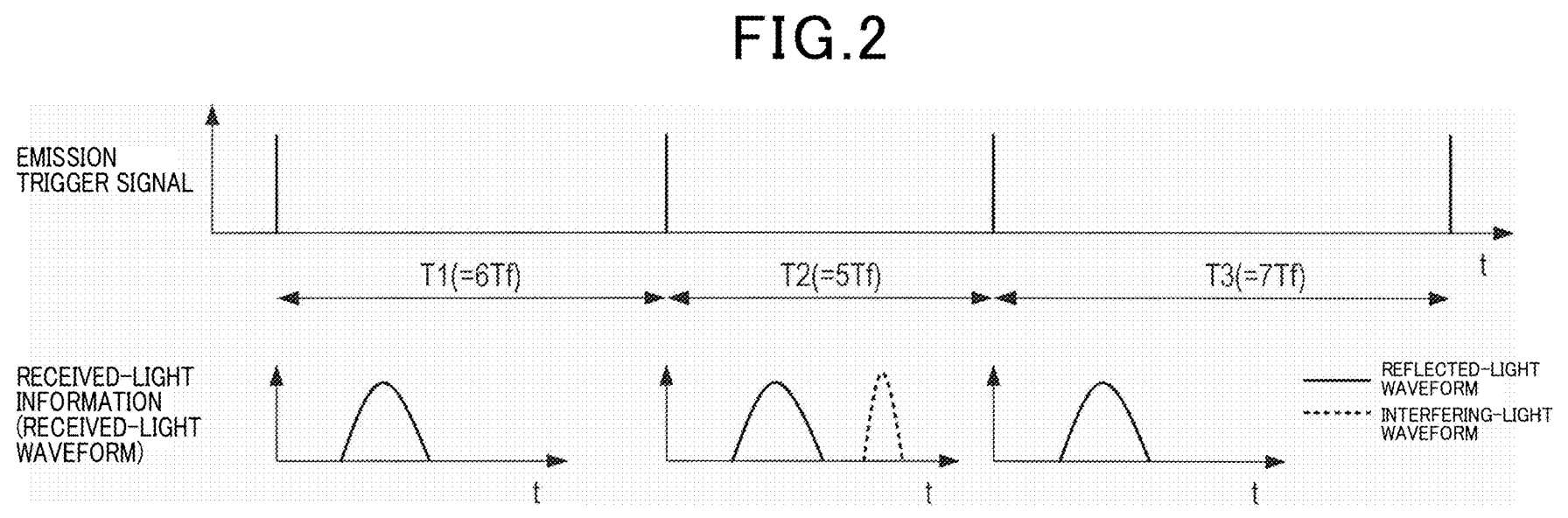

The timing control unit 4 repeatedly outputs the emission trigger signal as illustrated in FIG. 2. Output intervals T1, T2, T3, . . . of the emission trigger signals are not constant, but varies randomly within a certain range. The certain range is defined such that any output interval in the range is set greater than the time Tmax that it takes for light to make a round trip over the maximum detection distance of the ranging device 1 and each of a plurality of pieces of received-light information to be integrated as described below can be regarded as measured for an object at the same position. In FIG. 2, the output interval is varied in units of a preset reference time Tf such that Tmax<5Tf. In the following, the timings at which the emission trigger signals are output are referred to as emission timings.

Returning to FIG. 1, the processing unit 5 includes a received-light integration unit 6, a characteristic setting unit 7, and a distance calculation unit 8.

Figure 3:
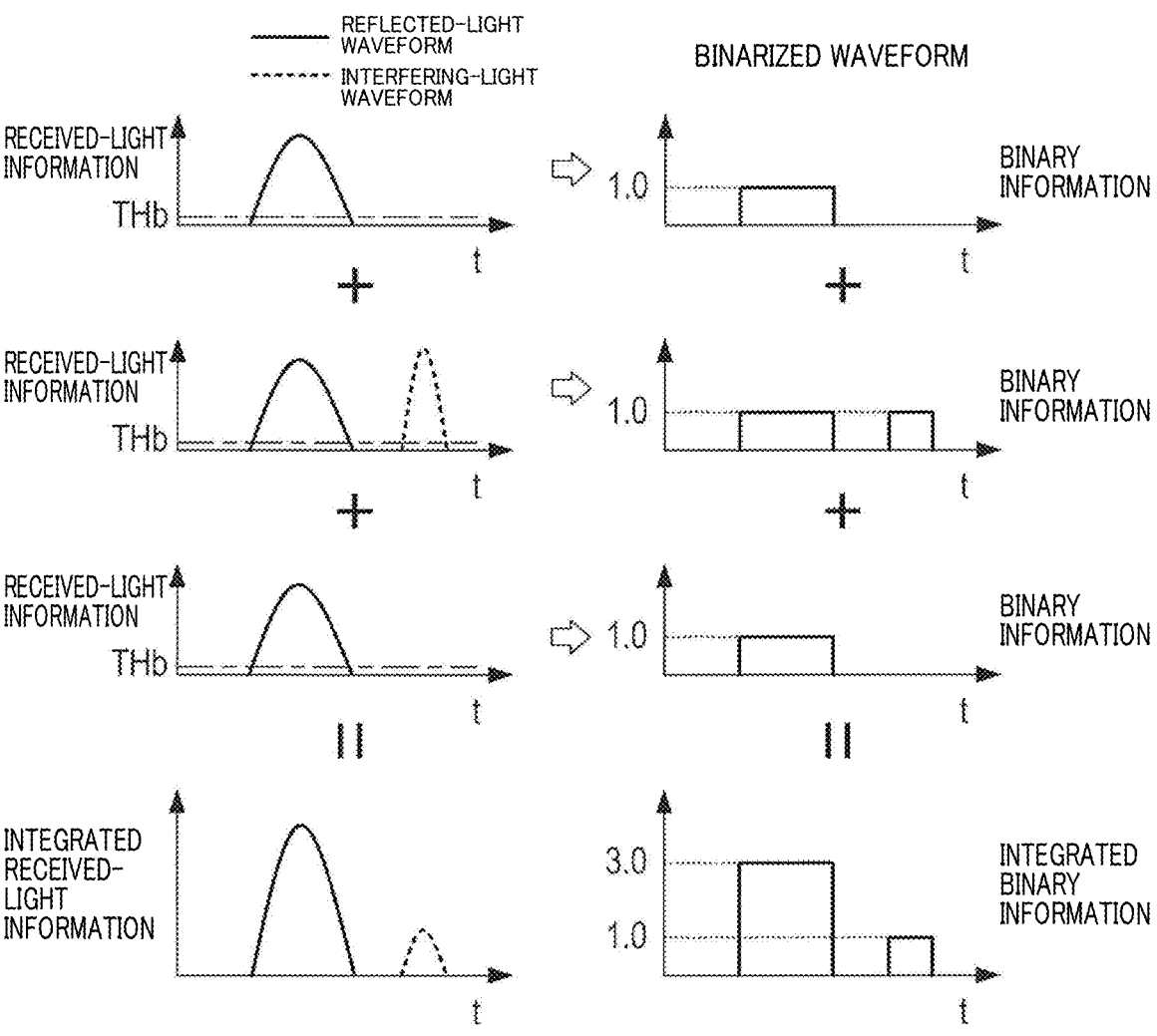
FIG. 3 is an illustration of binarizing received-light waveforms, integrating received-light waveforms, and integrating binarized waveforms.

The received-light integration unit 6 integrates M pieces of received-light information acquired at the M consecutive light-emission timings from the received-light unit 3 with each light-emission timing as the starting point, as illustrated in FIG. 3. FIG. 3 illustrates the case of M=3. The M pieces of received-light information to be integrated by the received-light integration unit 6 is referred to as a subject information set. The result of integration by the received-light integration unit 6 is referred to as integrated received-light information, and the waveform represented by the integrated received-light information is referred to as an integrated received-light waveform. The integrated received-light information is fed to the distance calculation unit 8.

As illustrated in FIGS. 3 and 4, when an object is actually present, a pulsed waveform based on reflected light from the same object (hereinafter referred to as the reflected-light waveform) is detected in all of the received-light waveforms indicated by the M pieces of received-light information, within the substantially same time range on the time axis starting from the timing of emission. The reflected light from the object corresponds to non-interfering light.

As illustrated in FIGS. 3 and 5, in the presence of an object, when pulsed interfering light arriving from the outside is received irrespective of light emitted at the emission timing from the ranging device 1, a pulsed waveform (hereinafter referred to as an interfering-light waveform) other than reflected-light waveforms may be detected. The pulsed interfering light includes emitted light from other ranging devices. The interfering-light waveform does not occur in all of the M pieces of received information, but may appear singularly. If the source of the interfering light is another ranging device mounted to another vehicle, or another ranging device that repeatedly emits and receives light based on the same principle as in the ranging device 1 in the present disclosure, the interfering-light waveform may appear in each of M pieces of received-light information. However, since the emission timing in each ranging device 1 varies randomly, the interfering-light waveform will be detected in a time range different from the time range in which the reflected-light waveforms are to be detected on the time axis starting from the emission timing. FIG. 3 illustrates a case where the interfering-light waveform is detected only in the second emission timing of three consecutive emission timings.

Integration of the received-light information by the received-light integration unit 6 increases the amplitude of the reflected-light waveform that is detected at substantially the same position each time and suppresses the amplitude of the interfering-light waveform that is detected singularly.

Returning to FIG. 1, the characteristic setting unit 7 includes a binarization unit 71 and a filter generation unit 72.

As illustrated in FIG. 3, the binarization unit 71 generates, for each of the M pieces of received-light information to be integrated by the received-light integration unit 6, received-light binary information by binarizing the received-light waveform indicated by the received-light information using a preset binarization threshold THb. The binarized waveform indicated by this received-light binary information has a value (i.e., waveform amplitude) of 1.0 in a time range where the signal intensity is greater than the binarization threshold THb and has a value of 0 in a time range where the signal intensity is equal to or less than the binarization threshold THb. The binarization threshold THb is set to, for example, the lower limit of a range of amounts of received interfering light. The binarization threshold THb is not limited to a preset fixed value. For example, a variable value calculated according to the received-light information may be used.

The filter generation unit 72 includes a binary integration unit 721 and a determination unit 722.

The binary integration unit 721 integrates the M pieces of received-light binary information generated by the binarization unit 71 on a time axis with the emission timings matched. An integrated binary waveform indicated by the integrated binary information, which is a result of integration, has a value (i.e., waveform amplitude) of M in the time range where the reflected-light waveforms are detected, and a value less than M in the time range where the interfering-light waveforms are detected, for example, one in the example of FIG. 3.

7

Figure 6:
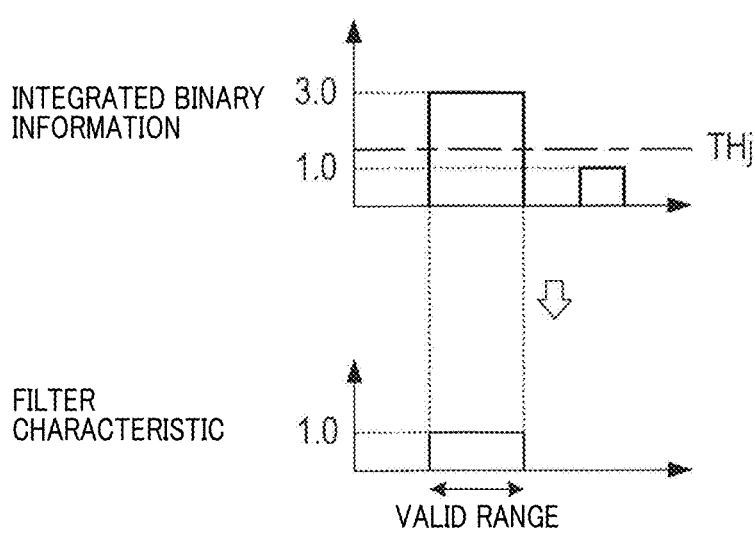
FIG. 6 is an illustration of a relationship between integration of binarized waveforms and filter characteristic.

As illustrated in FIG. 6, based on the integrated binary information generated by the binary integration unit 721, the determination unit 722 binarizes the integrated binary waveform indicated by the integrated binary information using a determination threshold THj set to a value less than M. The determination unit 722 extracts, from the result of binarization, a valid range in which a reflected-light waveform is estimated to be detected, and supplies it to the distance calculation unit 8. A light reception time range for the interfering light is included in an invalid range, which is a range other than the valid range. That is, the invalid range corresponds to a specified range. The determination threshold THj may be a value set according to the number of integrations M as described above, or a preset fixed threshold value may be used.

Returning to FIG. 1, the distance calculation unit 8 includes a ranging unit 81 and a filtering unit 82.

Figure 7:
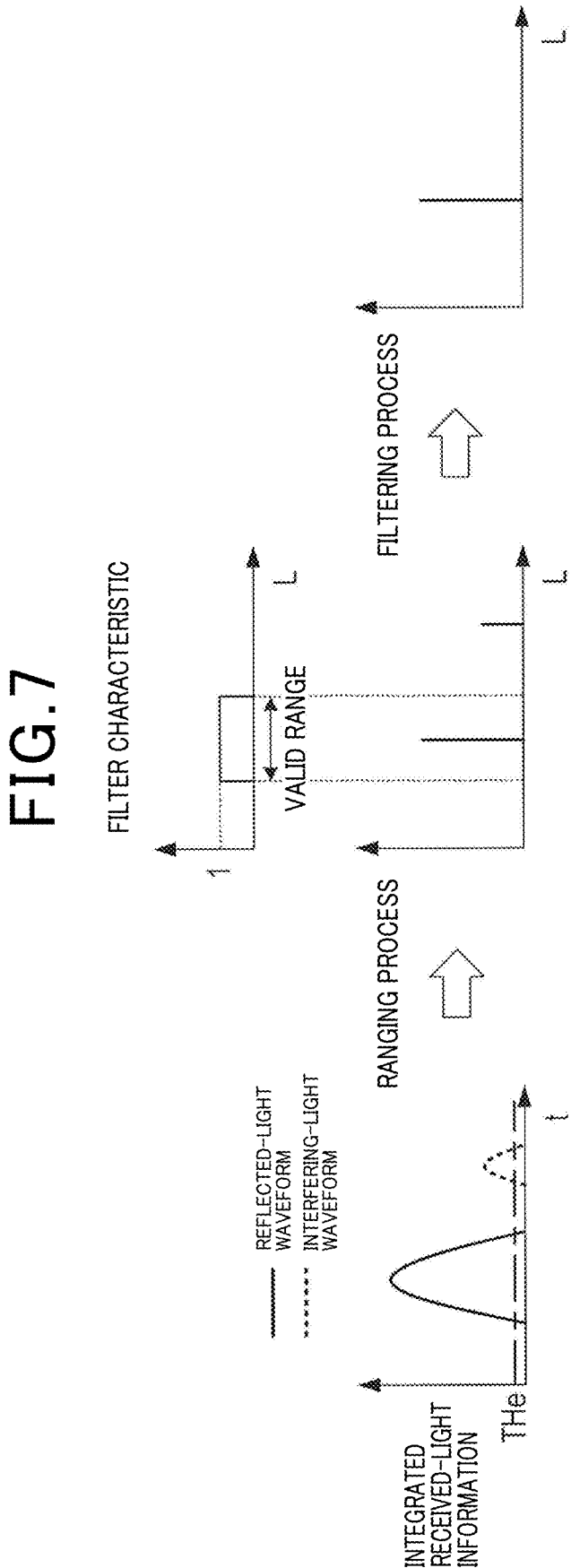
FIG. 7 is an illustration of a process performed by a distance calculation unit.

As illustrated in FIG. 7, the ranging unit 81 calculates, based on the integrated received-light information, the light-reception timing for each pulsed waveform having a peak value greater than an extraction threshold THe that is set equal to or greater than a minimum of intensities to be detected. The extraction threshold THe is set equal to or greater than the minimum of intensities to be detected. The extraction threshold THe is set to, for example, a value equal to or greater than the binarization threshold THb and equal to or less than the determination threshold THj, but is not limited to this setting.

The ranging unit 81 further calculates a distance to the object reflecting the emitted light from a time difference between the light-emission timing and the light-reception timing. The light-reception timing may be the timing at which a peak is actually acquired or the timing at which the signal level is in the middle of the range where the signal level is equal to or higher than a certain threshold. The light-emission timing may be the timing of a peak estimated using an interpolation method from the discrete signal levels acquired. The distance calculated by the ranging unit 81 is not limited to a single distance. As a result of processing by the ranging unit 81, not only the distance based on the reflected-light waveform but also the distance based on the interfering light waveform is calculated. The information of the peaks detected by the ranging device 81 using the extraction threshold THe will be referred to as echo information EC and denoted as EC(1), EC(2), . . . in the order of increasing distance. In addition to the distance, the echo information EC(i) may include the peak value of the integrated received-light waveform.

The filtering unit 82 converts the valid range on the time axis extracted by the determination unit 722 into a valid range on the distance axis (hereinafter referred to as a valid distance range). This conversion may be performed by the determination unit 722. The filtering unit 82 extracts, from the integrated received-light information, the echo information EC having peak values greater than the extraction threshold THe. For each piece of the extracted echo information EC, the filtering unit 82 calculates, for each of the calculated distances calculated by the ranging unit 81, whether the calculated distance is included in the valid distance range. If the filtering unit 82 determines that the calculated distance is not included in the valid distance range, the filtering unit 82 discards the calculated distance. If the filtering unit 82 determines that the calculated distance is included in the valid range, the filtering unit 82 outputs the calculated distance as a distance to the real object. This process in the filtering unit 82 is referred to as a filtering process. That is, the characteristics of the filter are set according to the valid range extracted by the determination unit 722.

1-2. Advantages

The first embodiment described above can provide the following advantages (1a) In the present embodiment, a distance to an object that reflected emitted light is calculated using integrated received-light information of M pieces of received-light information. This can suppress randomly generated noise in the received-light information and suppress false detection due to noise.

(1b) In the present embodiment, binary information is generated by binarizing each of the M pieces of received-light information using the binarization threshold THb. Furthermore, a valid range where reflected-light waveforms are estimated to be present is extracted by binarizing integrated binary information of the generated M pieces of binary information, using the determination threshold THj. Then, a distance included in the valid range, of distances calculated for the respective pulsed waveforms by the distance measuring unit 81, is output as the distance to the object. That is, distances included in the invalid range other than the valid range (i.e., the specified range) are discarded. Therefore, according to the present embodiment, this can suppress false detections based on interfering-light waveforms, that is, false distance detections in cases where no objects are present.

That is, even in cases where the interfering-light waveform is detected only once with the integrated received-light information, a peak value equal to or greater than that of the reflected-light waveform may be acquired if the signal level of the interfering-light waveform is high. Thus, it may be difficult to distinguish between the reflected-light waveform and the interfering-light waveform with the integrated received-light information. In contrast, use of the integrated binary information allows the amplitude to be acquired according to the number of integrations regardless of the signal level of the waveform indicated by the received-light information, which enables discrimination between the reflected-light waveform and the interfering-light waveform.

(1c) In the present embodiment, a distance to an object is calculated using M pieces of received-light information measured by randomly changing the timing of emission. Therefore, pulsed interfering-light waveforms, such as waveforms caused by light emission from other ranging devices mounted to other vehicles or the like, at different times from when reflected-light waveforms are detected in the M pieces of received-light information to be integrated, which can improve the detection accuracy of the valid range by integrated binary information.

2. Second Embodiment

2-1. Differences from the First Embodiment

A second embodiment is similar in basic configuration to the first embodiment. Therefore, only differences of the second embodiment from the first embodiment will be described. Elements having the same functions as those in the first embodiment are assigned the same reference numerals. As for these elements, the preceding description should be referenced.

9

Figure 8:
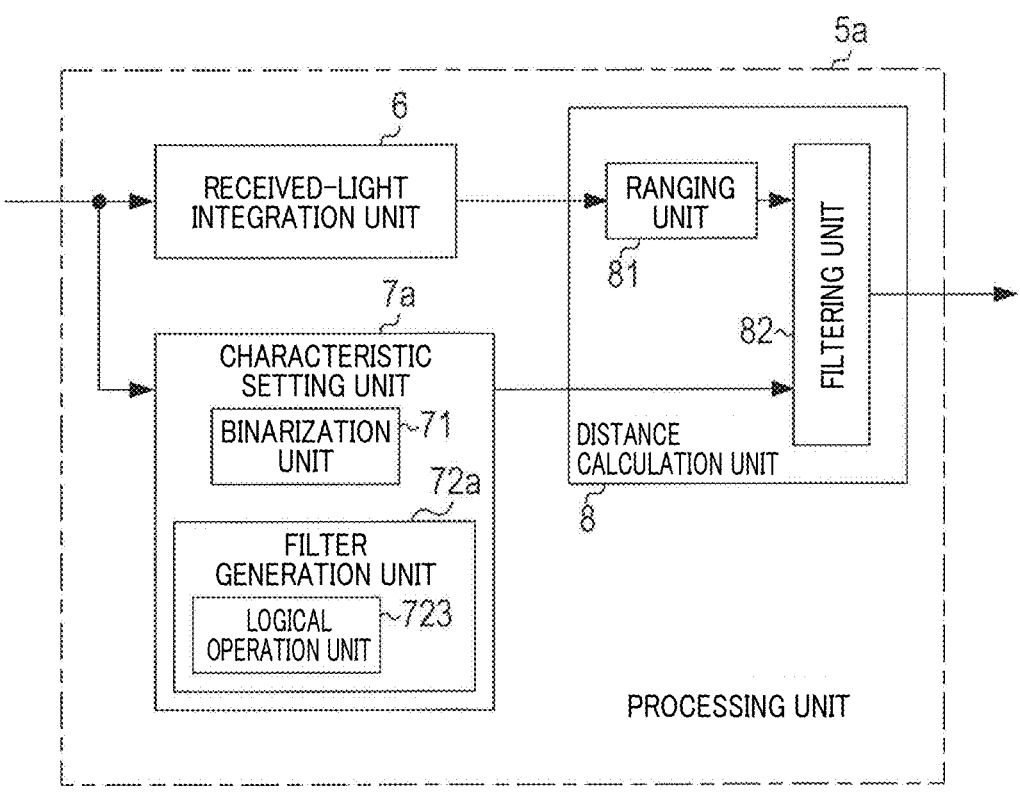
FIG. 8 is a block diagram of a ranging device according to a second embodiment.

In the second embodiment, the characteristic setting unit 7a in the processing unit 5a is different in configuration from the characteristic setting unit 7 in the processing unit 5 of the first embodiment. Specifically, the configuration of the filter generation unit 72a in the characteristic setting unit 7a is different. As illustrated in FIG. 8, the filter generation unit 72a includes a logical operation unit 723 instead of the binary integration unit 721 and the determination unit 722.

Figure 9:
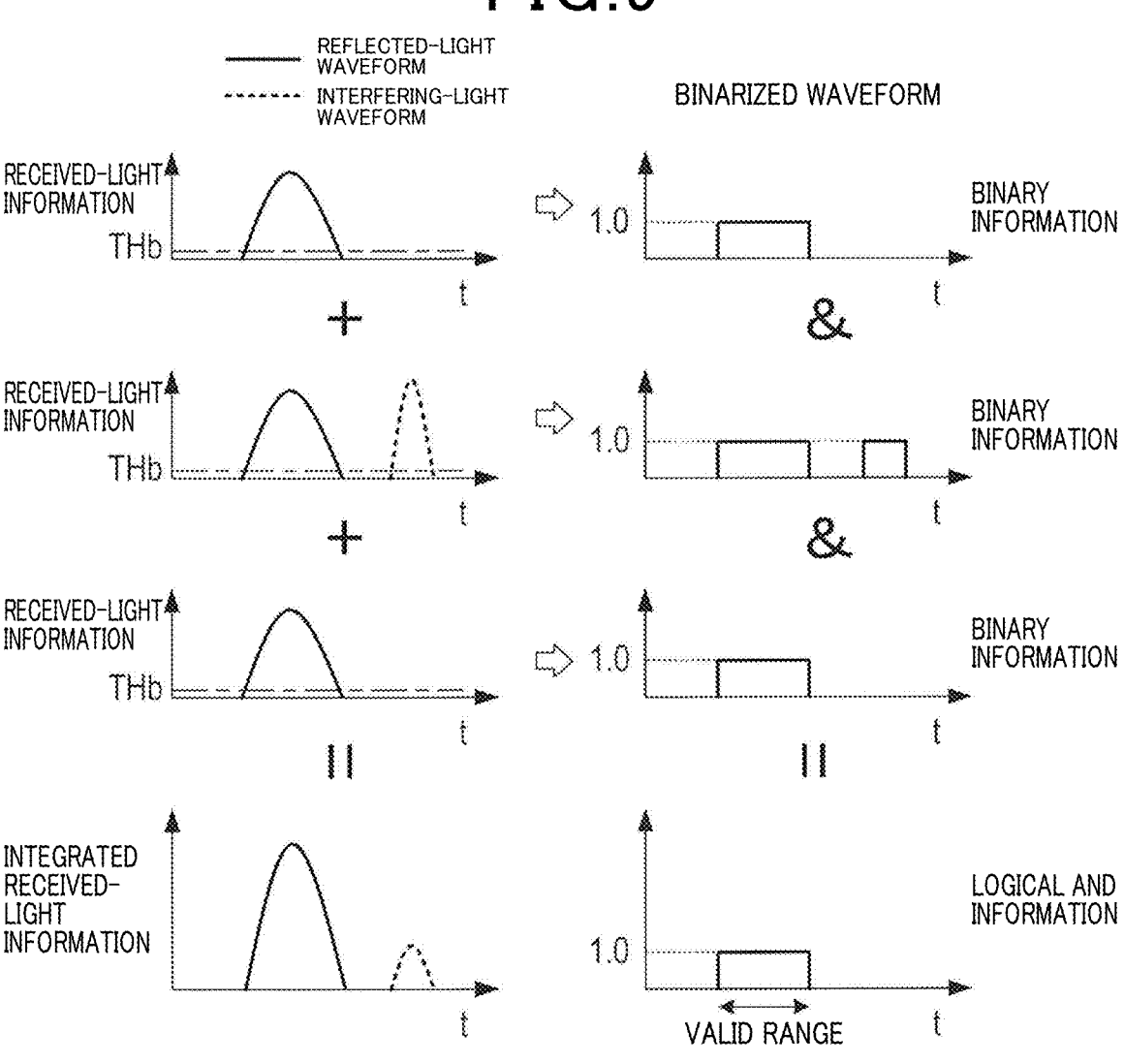
FIG. 9 is an illustration of binarizing received-light waveforms, integrating received-light waveforms, and logically ANDing binarized waveforms.

The logical operation unit 723 extracts the valid range by calculating the logical AND of the M pieces of binarized information generated by the binarization unit 71, as illustrated in FIG. 9. The valid range is extracted by this logical AND operation as the range in which at least one signal is detected in each of all of the M pieces of binary information.

2-2. Advantages

The second embodiment set forth above in detail can provide not only the advantage (1a) of the first embodiment, but also the following advantages (2a) to (2c).

(2a) In the present embodiment, the similar valid range is extracted as in the first embodiment, which can suppress false detections based on interfering-light waveforms, that is, false distance detections in cases where no objects are present.

(2b) In the present embodiment, a distance to an object is calculated using M pieces of received-light information measured by randomly changing the timing of emission of light. Therefore, pulsed interfering-light waveforms, such as waveforms of light emitted from other ranging devices, are detected at different times from when reflected-light waveforms are detected in the M pieces of received-light information subjected to the logical AND calculation, which can improve the detection accuracy of the valid range by the logic calculation unit 723.

(2c) In the present embodiment, the similar valid range as in the first embodiment can be extracted by simple processing as compared to in the first embodiment, which can reduce the processing load on the processing unit 5a.

3. Third Embodiment

3-1. Differences from the First Embodiment

A third embodiment is similar in basic configuration to the first embodiment. Therefore, only differences of the third embodiment from the first embodiment will be described. Elements having the same functions as those in the first embodiment are assigned the same reference numerals. As for these elements, the preceding description should be referenced.

Figure 10:
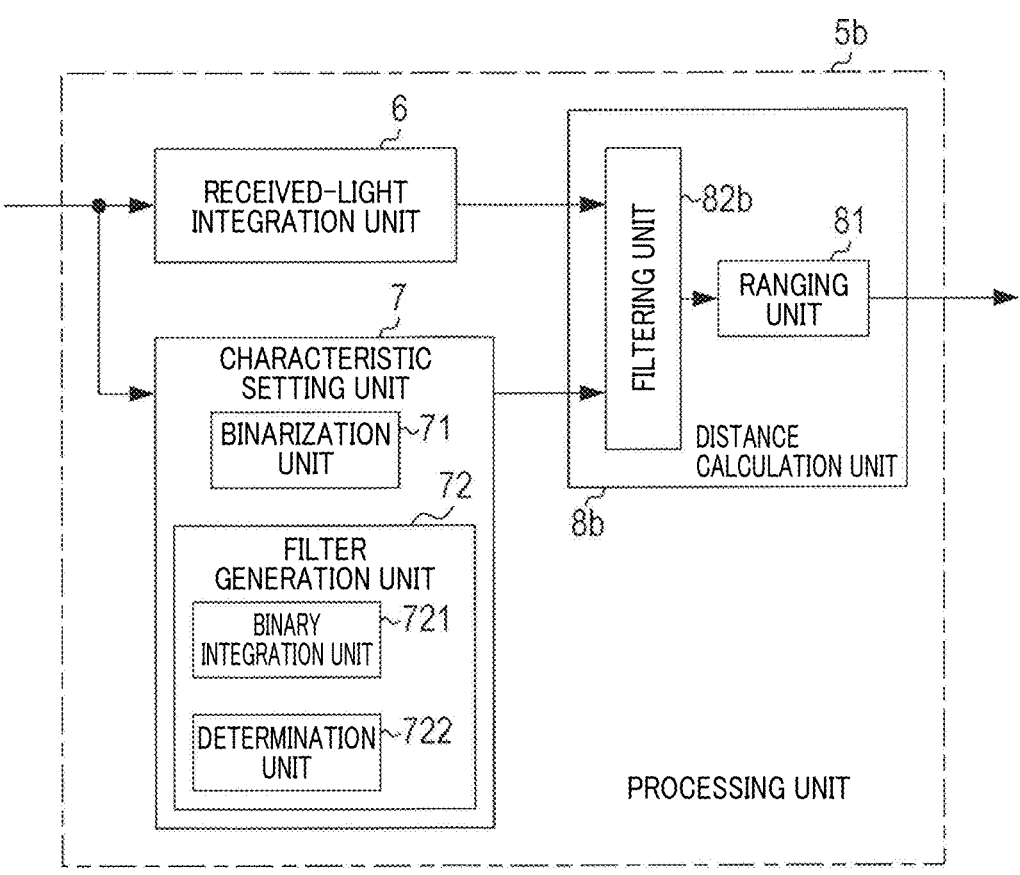
FIG. 10 is a block diagram of a ranging device according to a third embodiment.

In the third embodiment, the distance calculation unit 8b in the processing unit 5b is different in configuration from the distance calculation unit 8 in the processing unit 5 of the first embodiment. Specifically, in the first embodiment, the filtering unit 82 performs the filtering process on the result of the ranging process performed by the ranging unit 81. In the second embodiment, as illustrated in FIG. 10, the filtering unit 82b performs the filtering process on the integrated received-light information from the received-light integration unit 6, and then the ranging unit 81 performs the ranging process on the result of the filtering process.

Figure 11:
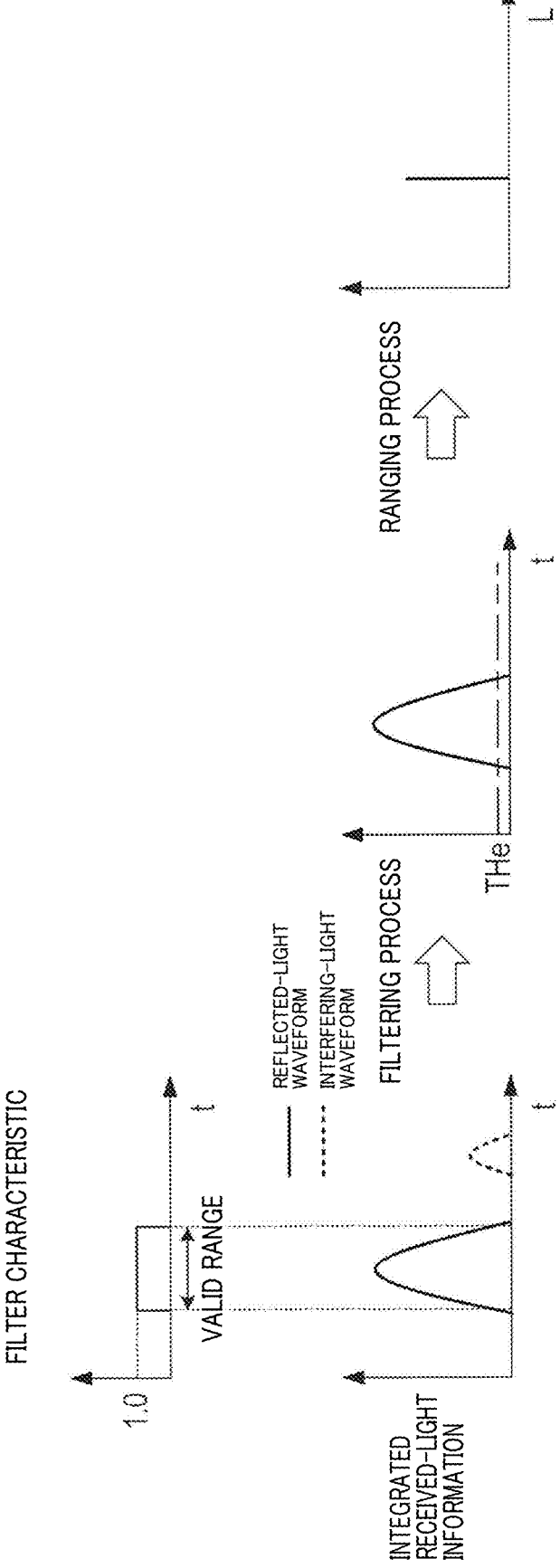
FIG. 11 is an illustration of a process performed by a distance calculation unit according to the third embodiment.

That is, as illustrated in FIG. 11, the filtering unit 82b performs, on the time axis, the filtering process on the integrated received-light waveform to thereby extract a signal waveform in a period of time corresponding to the valid range, such that signal waveforms are removed in a period of time corresponding to the invalid range. The ranging device 81 performs the ranging process only on the pulsed waveform extracted by the filtering process, that is, the reflected-light waveform, and generates echo information EC including a distance to the object.

3-2. Advantages

The third embodiment set forth above in detail can provide not only the advantages (1a) to (1c) of the first embodiment, but also the following advantage.

(3a) According to the present embodiment, the interfering-light waveforms are removed before processing in the ranging unit 81, which can reduce the processing load on the ranging unit 81.

3-3. Modification

Figure 12:
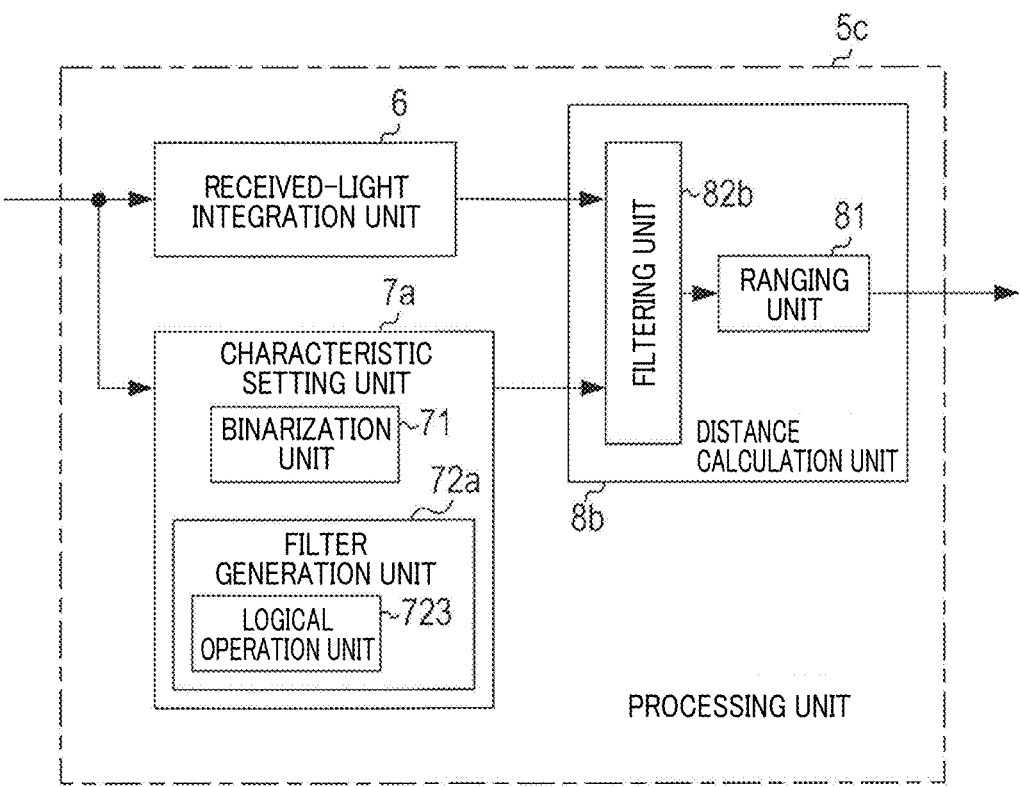
FIG. 12 is a block diagram of a ranging device according to a modification to the third embodiment.

In the third embodiment, the configuration of the processing unit 5b has been described, in which the characteristic setting unit 7 and the distance calculation unit 8b described in the first embodiment are combined. In a modification to the third embodiment, the characteristic setting unit 7a and the distance calculation unit 8b described in the second embodiment may be combined as in the processing unit 5c illustrated in FIG. 12.

4. Fourth Embodiment

4-1. Differences from the First Embodiment

A fourth embodiment is similar in basic configuration to the first embodiment. Therefore, only differences of the fourth embodiment from the first embodiment will be described. Elements having the same functions as those in the first embodiment are assigned the same reference numerals. As for these elements, the preceding description should be referenced.

Figure 13:
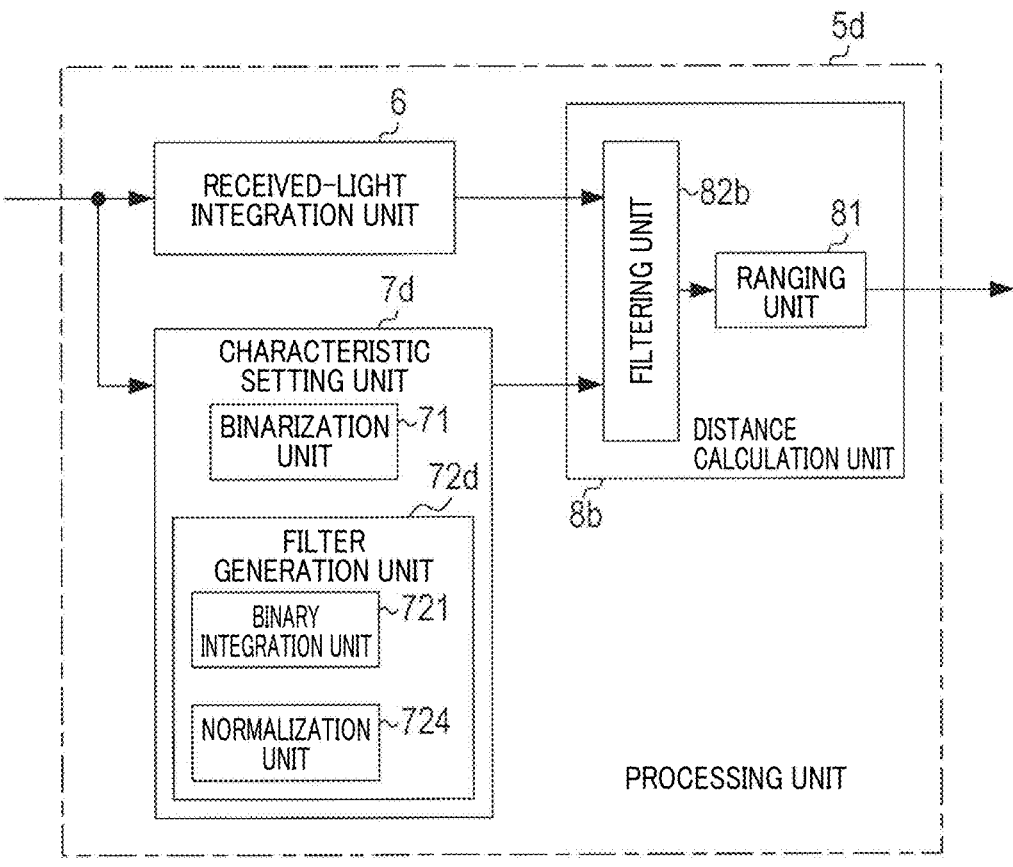
FIG. 13 is a block diagram of a ranging device according to a fourth embodiment.

In the fourth embodiment, the characteristic setting unit 7d and the distance calculation unit 8b in the processing unit 5d are different in configuration from the characteristic setting unit 7 and the distance calculation unit 8 in the processing unit 5 of the first embodiment. Specifically, the configuration of the filter generation unit 72d in the characteristic setting unit 7d is different. As illustrated in FIG. 13, as compared to the filter generation unit 72 of the first embodiment, the determination unit 722 is omitted and a normalization unit 724 is provided instead. Furthermore, in the fourth embodiment, instead of the distance calculation unit 8, the distance calculation unit 8b described in the third embodiment is provided.

Figure 14:
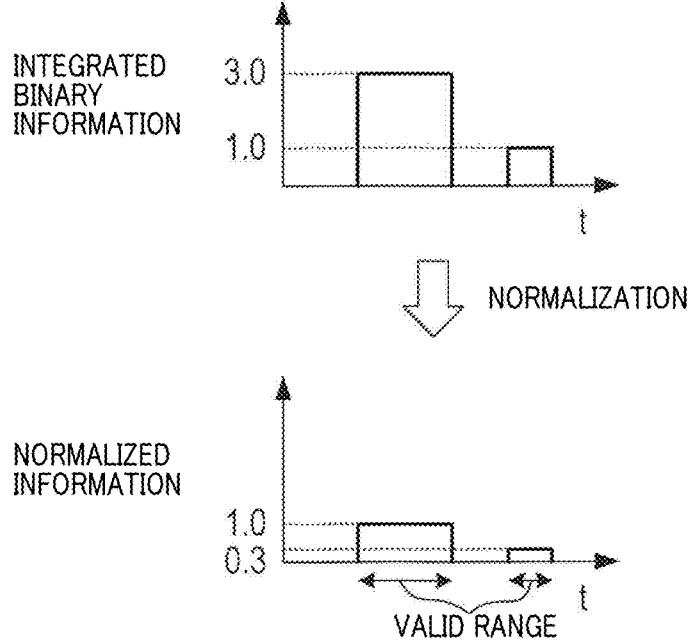
FIG. 14 is an illustration of a process of normalizing binarized waveforms.

The normalization unit 724, as illustrated in FIG. 14, generates normalized information by dividing an integrated value represented by the integrated binary information acquired by the binary integration unit 721 by the number of integrations M. M is the number of pieces of received-light information to be integrated by the received-light integration unit 6. That is, the signal level in the normalized information becomes 1.0 in a range where at least one signal is detected in each of all the pieces of the received-light information to be integrated, and the signal level in the normalized information becomes 1/M in a range where a signal is detected in only one piece of received-light information.

Figure 15:
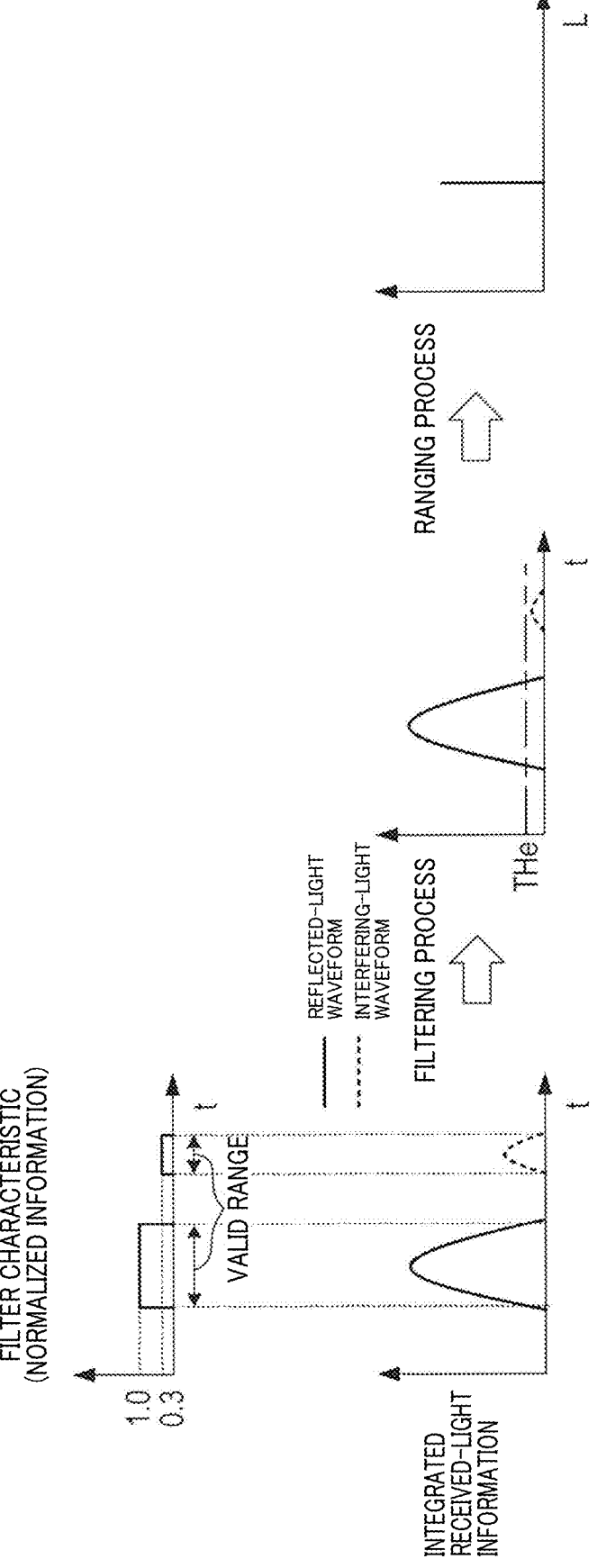
FIG. 15 is an illustration of a process performed by a distance calculation unit according to the fourth embodiment.

In the filtering unit 82b, as illustrated in FIG. 15, the integrated received-light information is multiplied by the signal level indicated by the normalized information as a gain. By multiplying the integrated received-light information by the gain, the peak value of the waveform is more suppressed in the range where a single pulsed waveform is detected, and is more likely to be less than the extraction threshold THe. As a result, the likelihood is reduced that the ranging process is performed by the ranging unit 81 on pulsed waveforms that belong to the range with low gain.

4-2. Advantages

The fourth embodiment set forth above in detail can provide not only the advantage (1a) of the first embodiment, but also the following advantages (4a) to (4c).

(4a) In the present embodiment, in addition to the valid range as in the first embodiment, the valid range with a gain less than one is extracted. This not only can suppress false detections based on interfering-light waveforms, that is, false distance detections in cases where no objects are present, but also can calculate a distance for pulsed waveforms that are detected in the same range with high frequency, although not every time.

(4b) In the present embodiment, the distance is calculated using M pieces of received-light information measured by randomly changing the timing of emission of light. Therefore, pulsed interfering-light waveforms, such as waveforms of light emitted from other ranging devices, are detected at different times from when reflected-light waveforms are detected in the M pieces of received-light information, which can sufficiently suppress the gain of the normalized information in the range where the interfering-light waveforms are detected.

(4c) According to the present embodiment, the processing load on the ranging unit 81 can be reduced as the interfering-light waveform is more likely to be removed by the filtering process before performance of the ranging process by the ranging unit 81.

4-3. Modification

In the above first to fourth embodiments, the filtering unit 82 performs the filtering process on the distance to the object calculated by the distance measuring unit 81, and the filtering unit 82b performs the filtering process on the integrated received-light waveform on the time axis calculated by the received-light integration unit 6.

When the ranging unit 81 uses intermediate data, such as data necessary for calculating the full width at half maximum (FWHM) and multiple discrete signal levels near the peak, to calculate the light-reception timing, the ranging unit 81 may perform the filtering process on the intermediate data, as illustrated in FIGS. 55 to 58.

Figure 55:
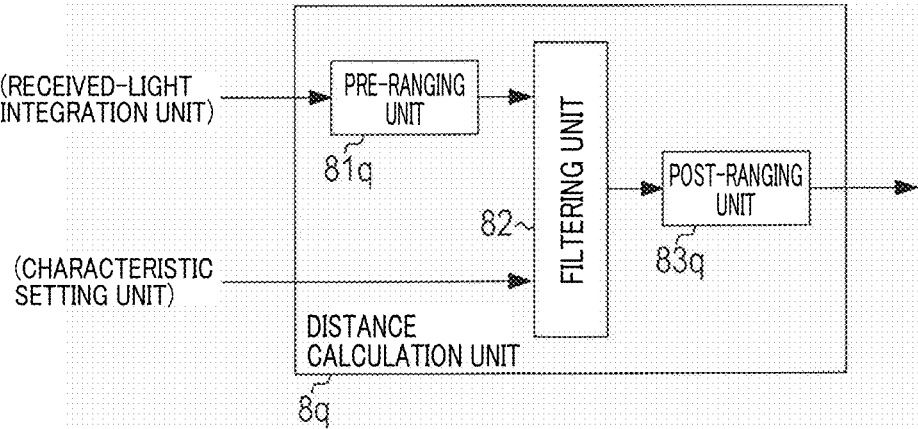
FIG. 55 is a block diagram of a distance calculation unit according to a modification.

For example, the distance calculation unit 8q illustrated in FIG. 55 includes the pre-ranging unit 81q, a filtering unit 82, and the post-ranging unit 83q.

Figure 56:
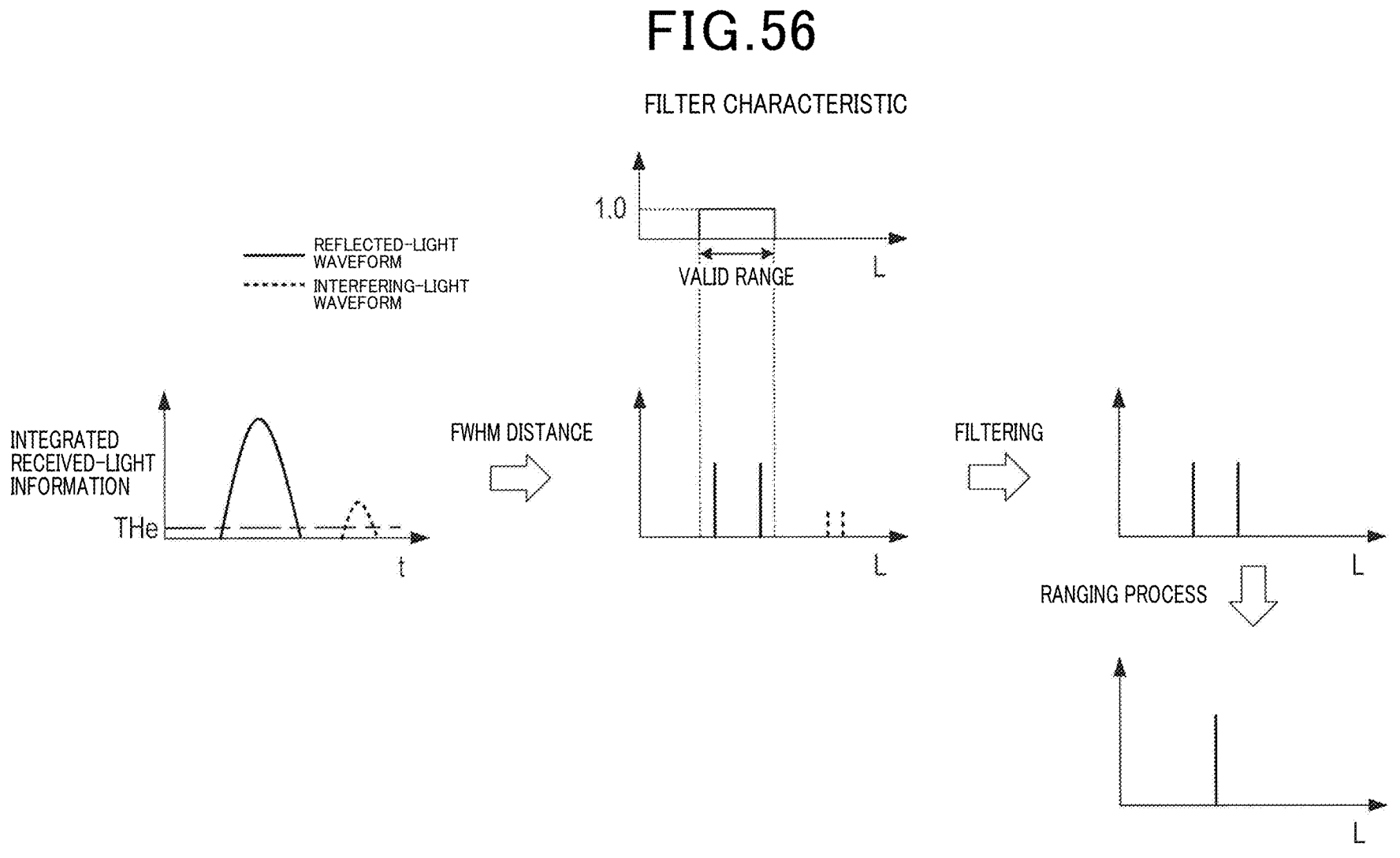

The pre-ranging unit 81q extracts the timings required to calculate the intermediate data on the time axis and converts the extracted timings into distance data. FIG. 56 illustrates the case of extracting FWHM distances that are the distance data calculated from the timings at which the ½ level of the peak required for calculation of the FWHM is acquired.

The filtering unit 82 performs the filtering process on the distance axis to extract the FWHM distances related to the peak for which echo information EC is to be generated.

The post-ranging unit 83q calculates a distance to the object that reflected the emitted light using the FWHM distances extracted by the filtering unit 82.

Figure 57:
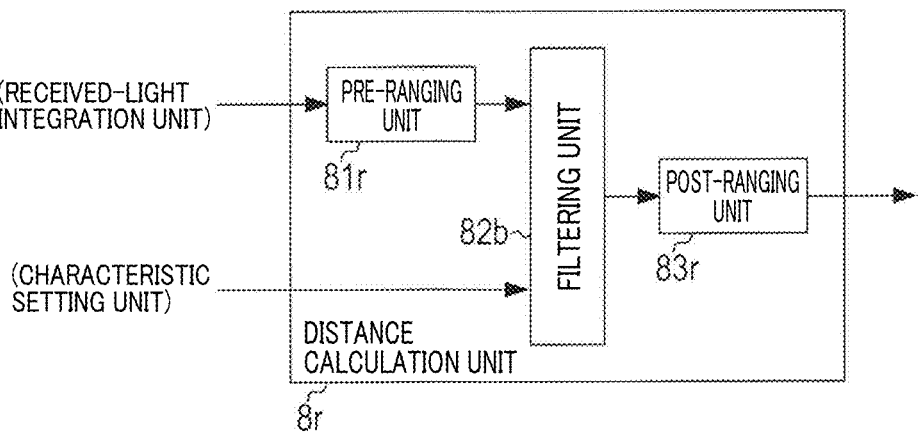
FIG. 57 is a block diagram of a distance calculation unit according to a modification.

The distance calculation unit 8r illustrated in FIG. 57 includes the pre-ranging unit 81r, the filtering unit 82b, and the post-ranging unit 83r.

Figure 58:
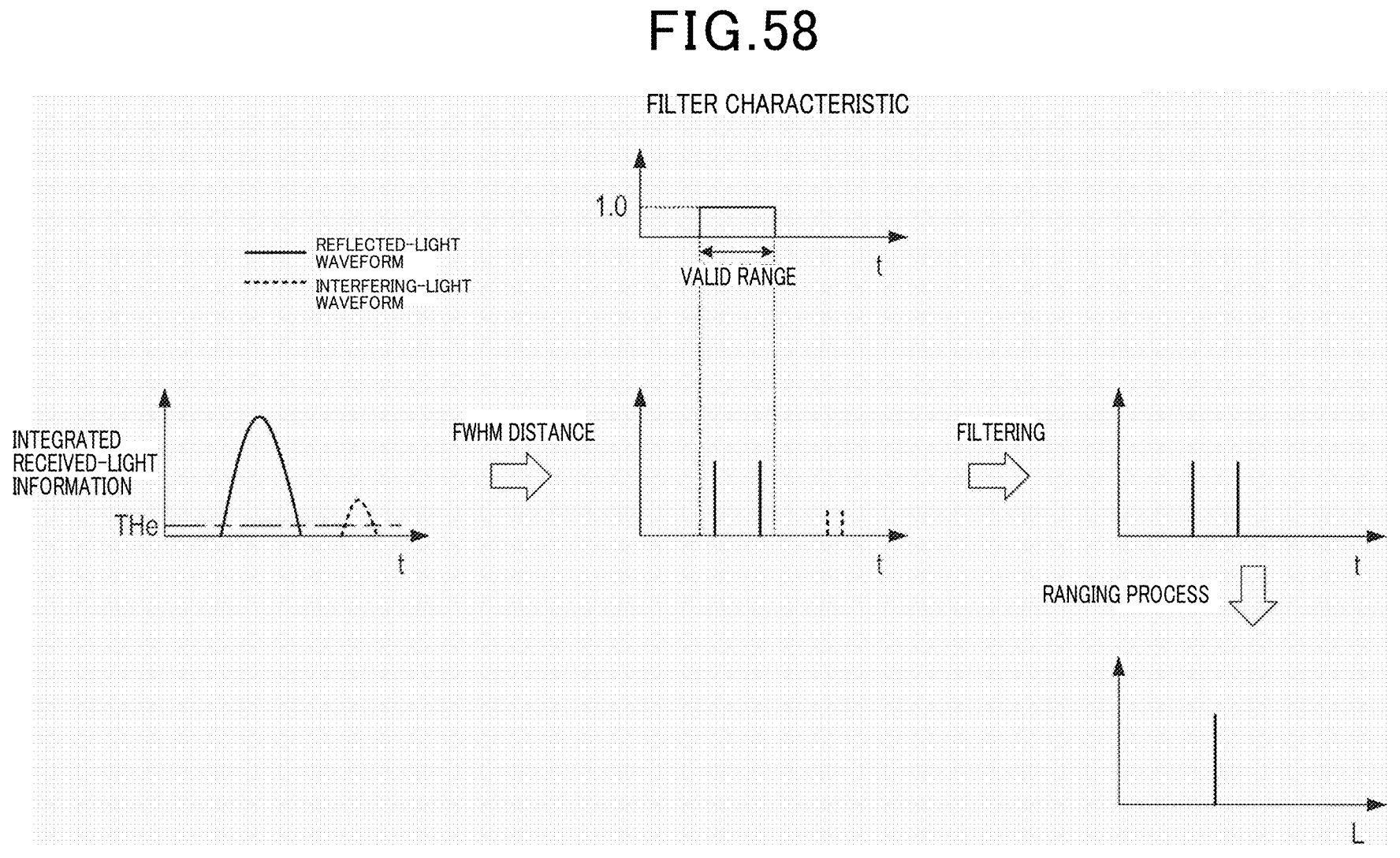

The pre-ranging unit 81r extracts the timings required to calculate the intermediate data on the time axis. FIG. 58 illustrates the case of extracting FWHM times from the timings at which the ½ level of the peak required for calculation of the FWHM is acquired.

The filtering unit 82b performs, on the time axis, the filtering process on the FWHM times extracted by the pre-ranging unit 81r to extract the FWHM times related to the peak for which echo information EC is to be generated.

The post-ranging unit 83r converts the FWHM times extracted by the filtering unit 82b into distance data and calculates a distance to the object that reflected the emitted light using the distance data.

In FIGS. 56 and 58, the cases are illustrated where the FWHMs are used as the intermediate data, but the intermediate data is not limited to the FWHMs, but can be time data or distance data extracted from pulses exceeding the extraction threshold THe, such as peak times of the pulses.

5. Fifth Embodiment

5-1. Differences from the First Embodiment

A fifth embodiment is similar in basic configuration to the first embodiment. Therefore, only differences of the fifth embodiment from the first embodiment will be described. Elements having the same functions as those in the first embodiment are assigned the same reference numerals. As for these elements, the preceding description should be referenced.

In the fifth embodiment, the characteristic setting unit 7e and the distance calculation unit 8e in the processing unit 5e are different in configuration from those of the first embodiment.

Figure 16:
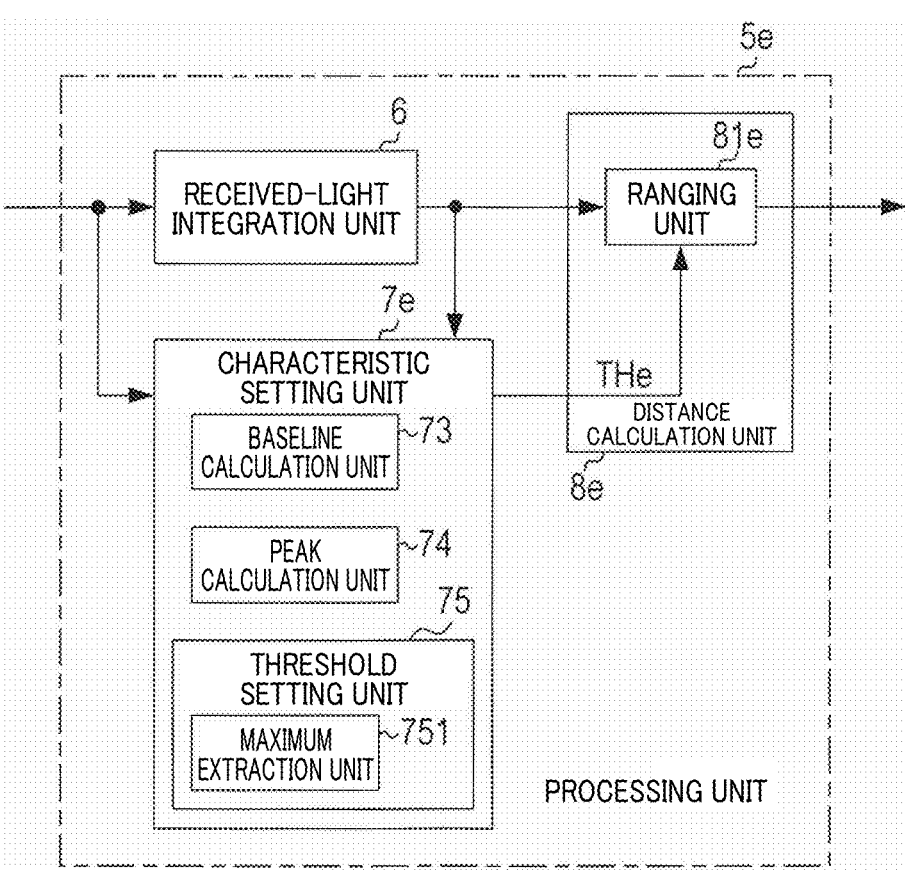
FIG. 16 is a block diagram of a ranging device according to a fifth embodiment.

As illustrated in FIG. 16, the characteristic setting unit 7e includes a baseline calculation unit 73, a peak calculation unit 74, and a threshold setting unit 75.

The baseline calculation unit 73 calculates an individual baseline value representing the baseline value for each of the plurality of pieces of received-light information subjected to integration by the received-light integration unit 6. The baseline refers to an amount of light received as an offset with effects on reflected light based on the emitted light, effects of interfering light from other LiDAR devices and the like, and effects of clutter removed. The clutter is received-light noise generated near the zero distance, caused by received light that was reflected from the housing of the ranging device 1. The baseline value may be, for example, the average or median of amounts of received light detected in a time range with such a time range removed that may be affected by reflected light, interfering light, and clutter. The baseline is also referred to as a noise floor level. In the following, the individual baseline value in the m-th received-light information is denoted by $N_m$, where m=1, 2, . . . , M.

The baseline calculation unit 73 calculates an integrated baseline value that represents a baseline value in the integrated received-light information. The integrated baseline value Ns may be calculated in a similar manner as the individual baseline values based on the integrated received-light information, or by summing the individual baseline values (i.e., $Ns=N_1+N_2+ . . . +N_M$).

Figure 17:
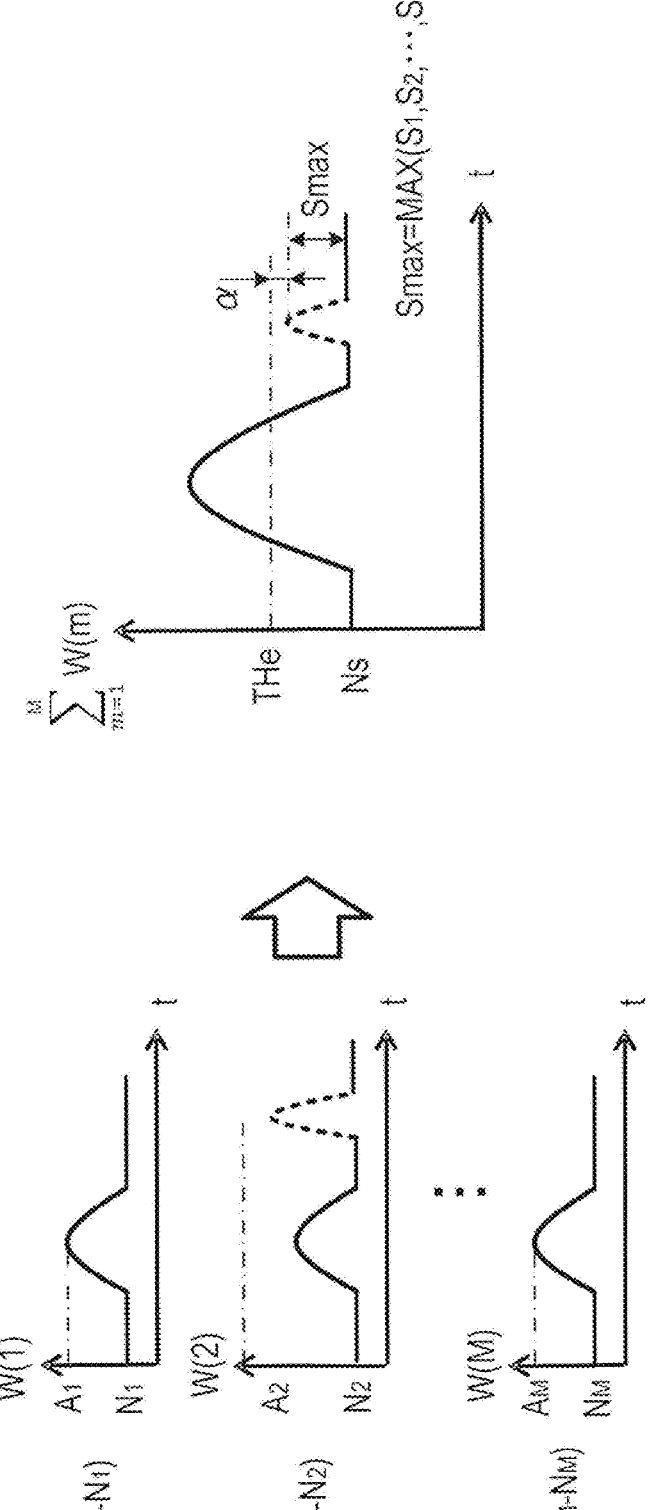
FIG. 17 is an illustration of a process performed by a threshold setting unit according to the fifth embodiment.

The peak calculation unit 74 acquires the maximum amount of received light for each piece of received-light information. Here, as illustrated in FIG. 17, each piece of received-light information is selected regardless of whether it has a received-light waveform or an interfering-light waveform. The maximum amount of received light may be acquired from the entire time range indicated by the received-light information or, for example, from the time range with a time range removed in which clutter is detected. The maximum amount of received light in the m-th piece of received-light information is hereinafter referred to as a raw peak value $A_m$. The peak calculation unit 74 further calculates, for each of the M pieces of received-light information, a relative peak value $S_m$ of received-light waveform by subtracting the individual baseline value $N_m$ from the raw peak value $A_m$. In calculating the relative peak value $S_m$, a value acquired by dividing the integrated baseline value Ns by the number of integrations M may be used instead of the individual baseline value $N_m$.

The threshold setting unit 75 includes a maximum extraction unit 751.

The maximum extraction unit 751 extracts the maximum relative peak value $Smax=MAX(S_1, S_2, \ldots, S_M)$, which is the maximum value among the M relative peak values $S_1$ to $S_M$ calculated by the peak calculation unit 74. Furthermore, the maximum extraction unit 751 sets a sum of the maximum relative peak value Smax and a margin $\alpha$ and the integrated baseline value Ns, as the extraction threshold value THe. The margin $\alpha$ may be omitted.

The distance calculation unit 8e includes the ranging unit 81e. The ranging unit 81e uses the integrated received-light information to extract pulsed waveforms whose peak value is greater than the extraction threshold THe set by the threshold setting unit 75, and calculates a distance to the object from the reception timing of each of the extracted pulsed waveforms. That is, the ranging unit 81e differs from the ranging unit 81 in that the extraction threshold THe is variably set. The ranging unit 81e generates and outputs the echo information EC that associates the calculated distance with the peak value.

5-2. Advantages

The fifth embodiment set forth above in detail can provide not only the advantage (1a) of the first embodiment, but also the following advantage (5a).

(5a) In the present embodiment, based on the maximum relative peak value Smax extracted from the M pieces of received-light information, the extraction threshold THe used to extract the pulsed waveforms subjected to ranging is set. Therefore, according to the present embodiment, this can suppress false detections based on interfering-light waveforms, that is, false distance detections in cases where no objects are present, and can suppress the ranging process from being performed on interfering-light waveforms, thereby reducing the processing load on the ranging unit 81e. In addition, only the memory for the maximum relative peak value Smax is required, while the memory for the filtering process over the time range is required in the first through fourth embodiments. This can provide advantages of reducing the amount of memory required for implementation.

That is, as illustrated in FIG. 17, even if the peak value of the interfering light waveform is greater than each of the peak values of the reflected-light waveforms, the peak value of the interfering light waveform in the integrated received-light information will not exceed the extraction threshold THe unless the interfering light waveform is detected at the same timing in each of the M pieces of received-light information W(1) to W(M). This allows the ranging process to be performed after removing the interfering light waveform using the extraction threshold THe.

5-3. Modifications

In the present embodiment, the received-light integration unit 6 calculates the integrated received-light information by simply adding the plurality of pieces of received-light information W(1) to W(M), such that the individual baseline values $N_1$ to $N_M$ becomes the integrated baseline value Ns. However, the method of integrating received-light information is not limited to simple addition. For example, the received-light integration unit 6 may be configured to integrate the plurality of pieces of received-light information W(1) to W(M) such that the integrated baseline value Ns becomes zero. In the following, the integrated received-light information integrated such that Ns=0 is referred to as zero-base integrated received-light information, and the integrated received-light information integrated such that Ns≠0 is referred to as non-zero-base integrated received-light information.

Specifically, as illustrated in FIG. 41, the received-light integration unit 6 calculates the individual baseline values $N_1$ to $N_M$ for the respective pieces of received-light information W(1) to W(M). Furthermore, the received-light integration unit 6 subtracts the individual baseline values $N_m$ from the respective pieces of received-light information W(m) and sums the subtraction results $(W(m)-N_m)$, thereby calculating the zero-base integrated received-light information. This method is hereinafter referred to as a post-subtraction integration method.

Figure 42:
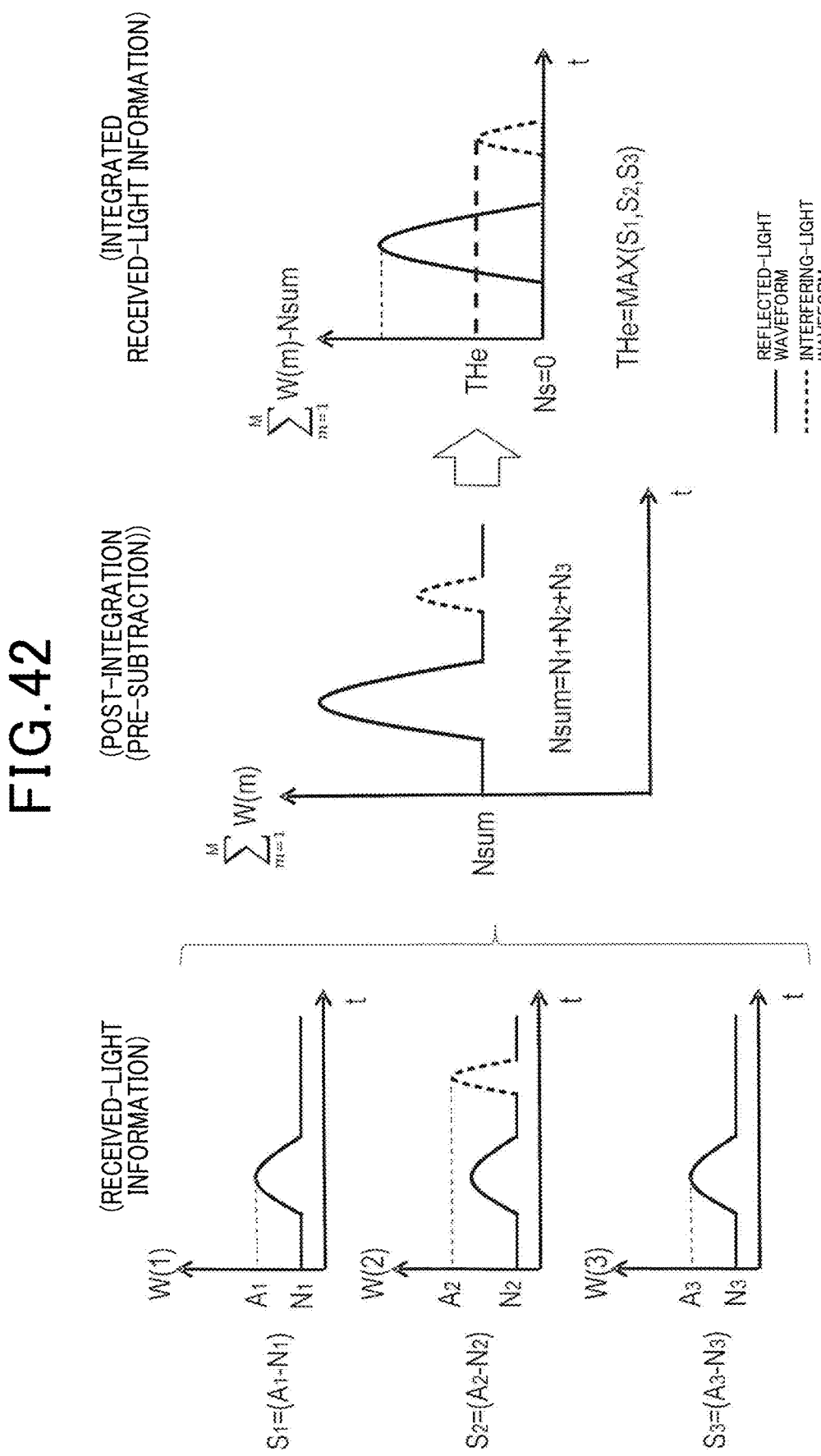
FIG. 42 is an illustration of a procedure of calculating integrated received-light information using a post-integration subtraction method.

As illustrated in FIG. 42, the received-light integration unit 6 subtracts Nsum which is a sum of the individual baseline values $N_1$ to $N_M$ from $\Sigma W(m)$ which is a simple sum of the pieces of received-light information W(1) to W(M), thereby calculating a zero-base integrated received-light information. The value used for subtraction may be a baseline value extracted from $\Sigma W(m)$ instead of Nsum. This method is hereinafter referred to as a post-integration subtraction method.

Figure 43:
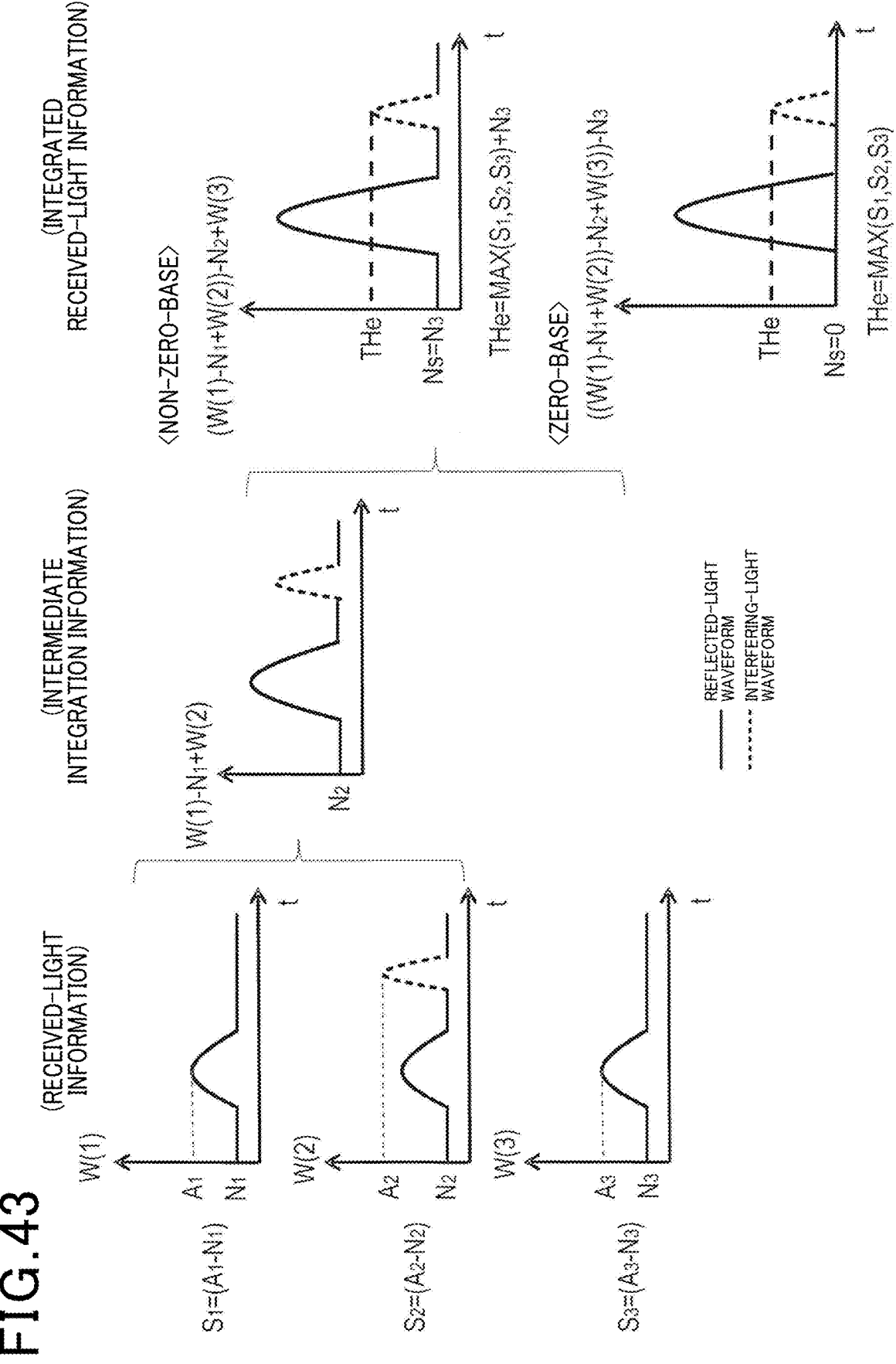
FIG. 43 is an illustration of a procedure of calculating integrated received-light information using a sequential integration method.

As illustrated in FIG. 43, the received-light integration unit 6 may calculate the zero-base integrated received-light information using the following procedure. That is, it is supposed that the first piece of received-light information is the first intermediate integrated information. For i=2 to M, the individual baseline value $N_{i-1}$ extracted from the (i−1)-th piece of received-light information is subtracted from the (i−1)-th piece of intermediate integrated information, and the i-th piece of received-light information is added to this subtraction result, thereby sequentially calculating the i-th piece of intermediate integrated information. Then, the zero-base integrated received-light information is calculated by subtracting the individual baseline value $N_M$ extracted from the M-th piece of received-light information from the M-th piece of intermediate integrated information. This method is hereinafter referred to as a zero-base sequential integration method.

In the above description, after the individual baseline value $N_{i-1}$ is subtracted from the (i−1)-th piece of intermediate integration information, the i-th received-light information is added to the subtraction result. However, the order of calculation is not limited thereto. Alternatively, for example, the individual baseline value $N_{i-1}$ may be subtracted from s sum of the (i−1)-th piece of intermediate integrated information and the i-th piece of received-light information.

The method such that the M-th piece of intermediate integrated information is the integrated received-light information, and the individual baseline value $N_M$ extracted from the M-th piece of intermediate integrated information is the integrated baseline value Ns, is referred to as a non-zero base sequential integration method.

In the case of the received-light integration unit 6 configured to calculate the integrated received-light information such that Ns=0, that is, the zero-base integrated received-light information, the extraction threshold THe may be set in any of the methods indicated by the following equations (1) to (3) below.

$$THe = Smax \tag{1}$$

$$THe = Amax - Nx \tag{2}$$

$$THe = Amax - Nave \tag{3}$$

Here, Amax is the maximum value $MAX(A_1, A_2, \ldots, A_M)$ among M raw peak values $A_1$ to $A_M$. Nx is the individual baseline value in the received-light information from which the maximum raw peak value Amax was extracted. Nave is the average $AVE(N_1, N_2, \ldots, N_M)$ of M individual baseline values $N_1$ to $N_M$. In equations (1) through (3), a margin $\alpha$ may be added to the extraction threshold THe. Nx in equation (2) and Nave in equation (3) correspond to the offset values.

In the case of the received-light integration unit 6 configured to calculate the integrated received-light information such that Ns=$N_M$, using the non-zero-base sequential integration method, the extraction threshold THe may be set by any of the methods indicated by the following equations (4) to (7).

$$The = Smax + N_M \tag{4}$$

$$The = Amax - Nx + N_M \tag{5}$$

$$The = Amax - Nave + N_M \tag{6}$$

$$The = Amax \tag{7}$$

In the equations (4) to (6), the individual baseline value $N_M$ of the M-th piece of received-light information, which is the integrated baseline value Ns, is added to the respective equations (1) to (3). The equation (7) is an approximate equation acquired by assuming that Nx=$N_M$ in equation (5), and enables simplification of calculation of the threshold THe. Also in equations (4) to (7), a margin $\alpha$ may be added to the extraction threshold THe.

Here, the case has been described where the received-light information is integrated such that the individual baseline value $N_M$ of the M-th piece of received-light information is the integrated baseline value Ns of the non-zero-base integrated received-light information. The method of integrating the received-light information is not limited thereto. Alternatively, for example, the individual baseline value of one arbitrarily selected piece of received-light information may be the integrated baseline value Ns. Still alternatively, a sum of the individual baseline values of any arbitrarily selected number of pieces of received-light information may be the integrated baseline value.

The processes performed by the received-light integration unit 6 described using FIGS. 41 to 43 can be applied not only to the sixth and later embodiments but also to the received-light integration unit 6 in the first to fourth embodiments.

6. Sixth Embodiment

6-1. Differences from the First Embodiment

A sixth embodiment is similar in basic configuration to the first embodiment. Therefore, only differences of the sixth embodiment from the first embodiment will be described. Elements having the same functions as those in the first embodiment are assigned the same reference numerals. As for these elements, the preceding description should be referenced.

In the sixth embodiment, the characteristic setting unit 7f and the distance calculation unit 8e in the processing unit 5f are different in configuration from those of the first embodiment. The distance calculation unit 8e is configured in a similar manner as described in the fifth embodiment.

Figure 18:
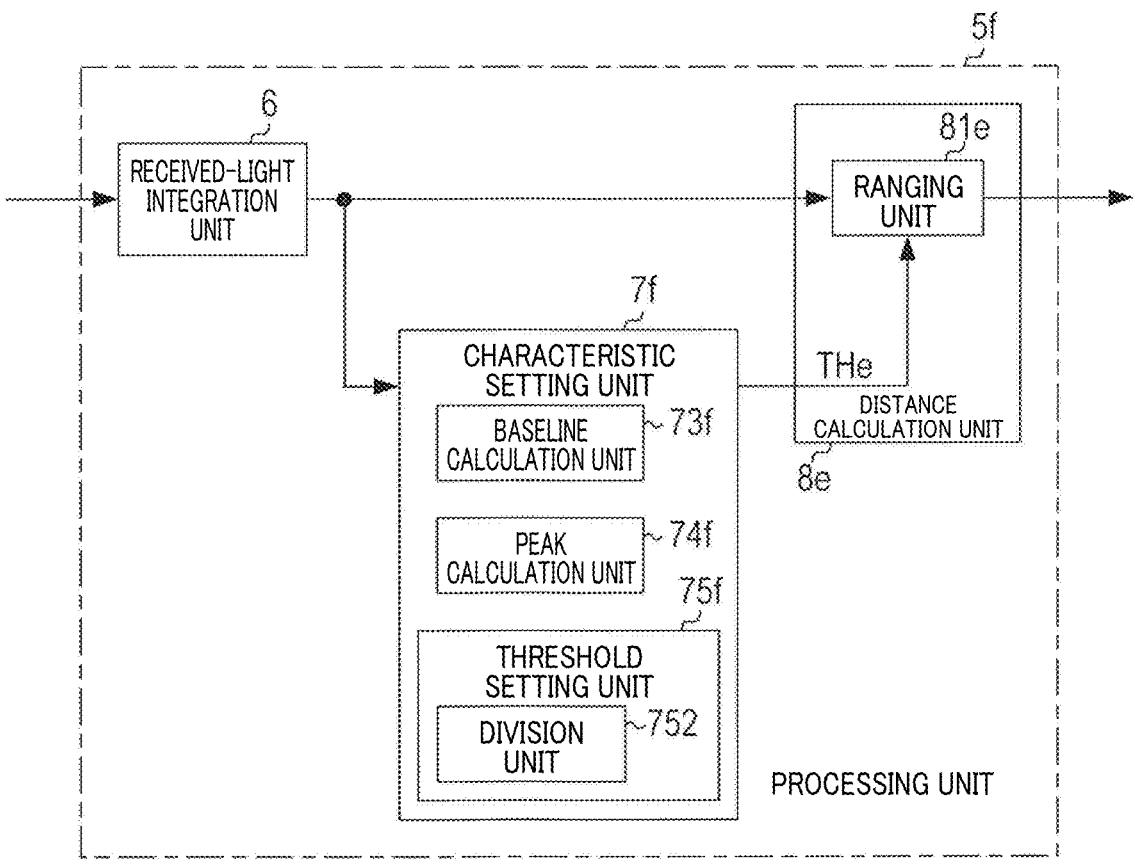
FIG. 18 is a block diagram of a ranging device according to a sixth embodiment.

As illustrated in FIG. 18, the characteristic setting unit 7f generates the extraction threshold value THe based on the integrated received-light information supplied from the received-light integration unit 6. The characteristic setting unit 7f includes the baseline calculation unit 73f, the peak calculation unit 74f, and the threshold setting unit 75f.

The baseline calculation unit 73f calculates the integrated baseline value Ns that represents the baseline value of the integrated received-light information calculated from the received-light integration unit 6. The integrated baseline value Ns may be the value extracted from the integrated received-light information, or may be a sum Nsum of the individual baseline values $N_1$ to $N_M$ extracted from the plurality of pieces of received-light information to be integrated in the received-light integration unit 6. The peak calculation unit 74f extracts the maximum value from the integrated received-light information and subtracts the integrated baseline value Ns calculated by the baseline calculation unit 73f from the extracted maximum value, thereby calculating the relative peak value S of the integrated received-light information.

The threshold setting unit 75f includes a division unit 752. The division unit 752 divides the relative peak value S of the integrated received-light information calculated by the peak calculation unit 74f by the number M of pieces of received-light information to be integrated by the received-light integration unit 6. Furthermore, the division unit 752 sets the extraction threshold value THe to the margin $\alpha$ plus the integrated baseline value Ns calculated by the baseline calculation unit 73f plus the result of division. That is, the extraction threshold THe is set according to the equation (8). The margin $\alpha$ may be any one of a pre-specified constant and a value calculated according to the division value S/M. Alternatively, the margin $\alpha$ may be omitted and the extraction threshold THe may be set according to the equation (9).

$$THe = S/M + a + Ns \tag{8}$$

$$THe = S/M + Ns \tag{9}$$

In situations where it is apparent that the peak value of the interfering-light waveform does not exceed the peak value of the reflected-light waveform in each piece of received-light information, the extraction threshold THe set in such a manner may be used.

6-2. Advantages

The sixth embodiment set forth above in detail can provide not only the advantage (1a) of the first embodiment, but also the following advantage (6a).

(6a) In the present embodiment, the characteristic setting unit 7f is provided in the subsequent stage of the received-light integration unit 6, and there is no need to perform calculation for each integration of received-light information, but only for the integrated received-light information, which can reduce the amount of calculation.

6-3. Modifications

In the received-light integration unit 6 configured to calculate the integrated received-light information such that Ns=0, the threshold setting unit 75 f may set the extraction threshold THe according to the equation (10) or (11).

$$THe = S/M + a \qquad (10)$$

$$THe = S/M \qquad (11)$$

7. Seventh Embodiment

7-1. Differences from the First Embodiment

A seventh embodiment is similar in basic configuration to the first embodiment. Therefore, only differences of the seventh embodiment from the first embodiment will be described. Elements having the same functions as those in the first embodiment are assigned the same reference numerals. As for these elements, the preceding description should be referenced.

In the seventh embodiment, the characteristic setting unit 7g and the distance calculation unit 8e in the processing unit 5g are different in configuration from those of the first embodiment. The distance calculation unit 8e is configured in a similar manner as that described in the fifth embodiment.

Figure 19:
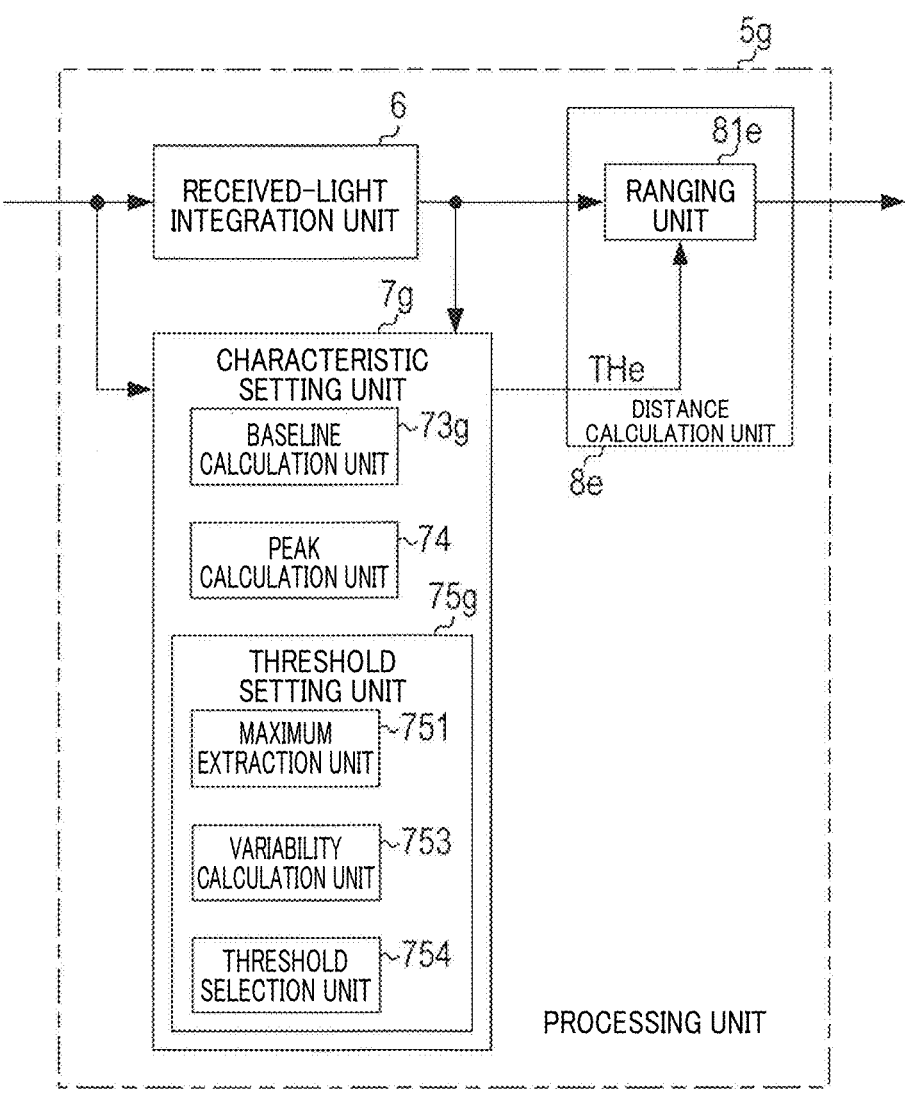
FIG. 19 is a block diagram of a ranging device according to a seventh embodiment.

As illustrated in FIG. 19, the characteristic setting unit 7g includes the baseline calculation unit 73g, the peak calculation unit 74, and the threshold setting unit 75g.

The baseline calculation unit 73g calculates the individual baseline value $N_m$ for each of the M pieces of received-light information in a similar manner as the baseline calculation unit 73, and calculates the integrated baseline value Ns. The baseline calculation unit 73g further calculates the variability of the individual baseline values $N_m$. For example, the standard deviation may be used as a parameter representing the variability.

The threshold setting unit 75g includes a maximum extraction unit 751, a variability calculation unit 753, and a threshold selection unit 754.

The maximum extraction unit 751 is configured in a similar manner as described in the fifth embodiment, and calculates the maximum relative peak value Smax.

The variability calculation unit 753 calculates an allowable variability value that is G times the variability $\sigma$, where the variability $\sigma$ is a product of the square root of M and the average of the standard deviations of the individual baseline values calculated by the baseline calculation unit 73g for respective ones of the M pieces of received-light information. G is a positive real number, which is set appropriately depending on how much the probability of noise being erroneously detected as an object is set. Here, as above, the variability $\sigma$ is a product of the square root of M and the average of the standard deviations of the individual baseline values $N_1$ to $N_M$ calculated for respective ones of the M pieces of received-light information. Alternatively, the variability $\sigma$ may be the standard deviation of the integrated baseline values calculated from the integrated received-light information.

Figure 20:
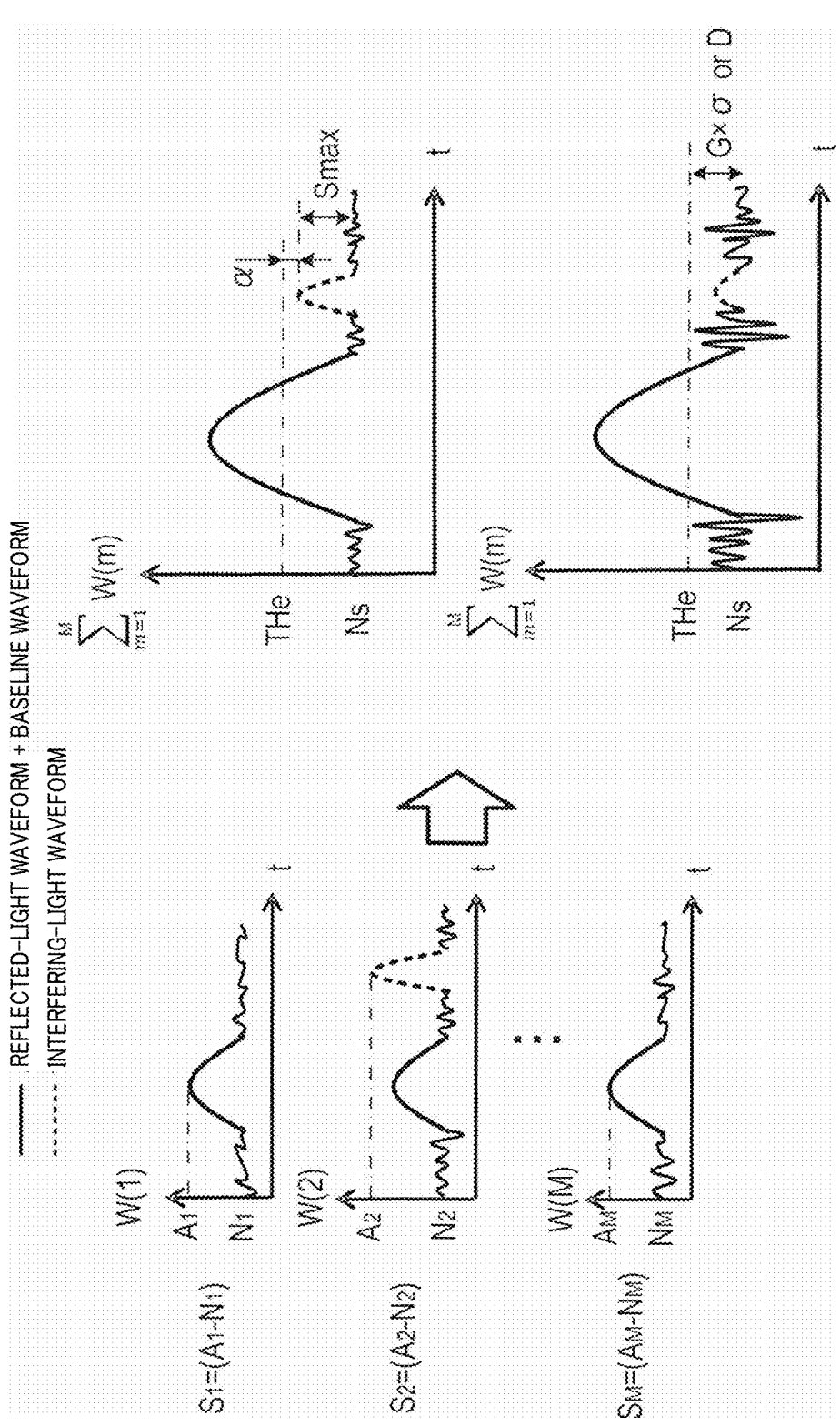
FIG. 20 is an illustration of a process performed by a threshold setting unit according to the seventh embodiment.

As illustrated in FIG. 20, the threshold selection unit 754 compares the allowable variability value G×$\sigma$, a preset and fixed value D, and a sum of the maximum relative peak value Smax and a margin $\alpha$. The fixed value D is set such that a moderate extraction threshold THe can be acquired even when the variability $\sigma$ is extremely small, for example, in a closed space. If Smax+$\alpha$ is a maximum, the extraction threshold THe is set according to the following equation (12). If G×$\sigma$ is a maximum, the extraction threshold THe is set according to the following equation (13). If D is a maximum, the extraction threshold THe is set according to the following equation (14).

$$THe = Smax + a + Ns \qquad (12)$$

$$The = G \times \sigma + Ns \qquad (13)$$

$$The = D + Ns \qquad (14)$$

The equation (12) may be replaced with the extraction threshold THe calculated using any of the equations (4) to (7) or with the extraction threshold THe calculated by adding a margin $\alpha$ to the right side of any of the equations (5) to (7).

7-2. Advantages

The seventh embodiment described in detail above can provide not only the advantage (1a) of the first embodiment and the advantage (5a) of the fifth embodiment described above, but also the following advantage (7a).

(7a) In the present embodiment, the extraction threshold is changed based on a comparison between the allowable variability value G×$\sigma$ calculated from the variability $\sigma$ of the baseline values, the maximum peak value Smax+a, and the fixed value D. Changing the extraction threshold THe can suppress false detections of noise as a reflected-light waveform even in cases where the interfering-light waveform is buried in noise. Furthermore, an appropriate extraction threshold THe can be set even in cases where the variability of the baseline values $\sigma$ is extremely small.

7-3. Modification

When the received-light integration unit 6 is configured to integrate the plurality of pieces of received-light information such that the integrated baseline value Ns becomes zero, the threshold setting unit 75 g may be configured to use the threshold value THe calculated using the right side of any of the equations (12) to (14) with the integrated baseline value Ns removed.

8. Eighth Embodiment

8-1. Differences from the First Embodiment

An eighth embodiment is similar in basic configuration to the first embodiment. Therefore, only differences of the eighth embodiment from the first embodiment will be described. Elements having the same functions as those in the first embodiment are assigned the same reference numerals. As for these elements, the preceding description should be referenced.

Figure 21:
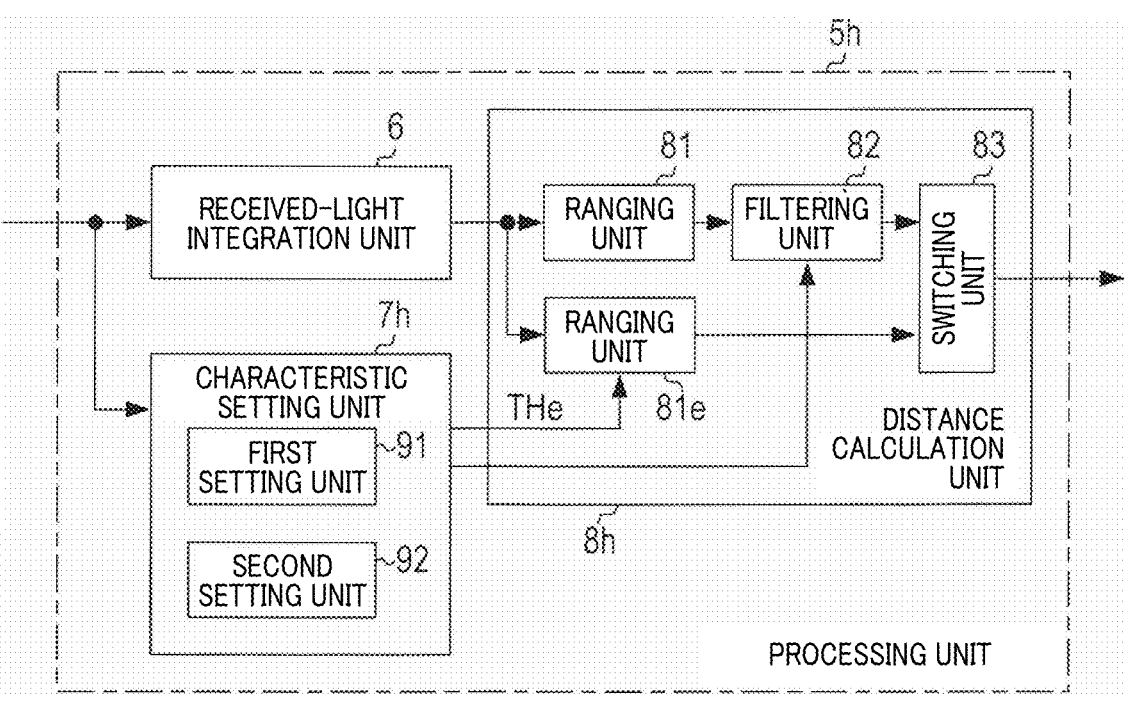
FIG. 21 is a block diagram of a ranging device according to an eighth embodiment.

In the eighth embodiment, as illustrated in FIG. 21, the characteristic setting unit 7h and the distance calculation unit 8h in the processing unit 5h are different in configuration from those of the first embodiment.

The characteristic setting unit 7h includes a first setting unit 91 and a second setting unit 92.

The first setting unit 91 has the similar configuration as any of the characteristic setting units 7, 7a, 7d described in the first through fourth embodiments and sets the valid range where reflected-light waveforms can exist.

The second setting unit 92 has the similar configuration as any of the characteristic setting units 7e to 7g described in the fifth to seventh embodiments and sets the extraction threshold THe. In the case of the characteristic setting unit 7f of the sixth embodiment being employed as the second setting unit 92, outputs of the received-light integration unit 6 are inputs of the second setting unit 92.

The distance calculation unit 8h includes two ranging devices 81, 81e, the filtering unit 82, and a switching unit 83.

The ranging unit 81 and the filtering unit 82 operate in a similar manner as the distance calculation unit 8 described in the first embodiment. The ranging unit 81 corresponds to a first ranging unit, and the ranging unit 81 and the filtering unit 82 correspond to a first processing unit.

The ranging unit 81e operates in a similar manner as the distance calculation unit 8e described in the fifth embodiment. The ranging unit 81e corresponds to a second ranging unit and a second processing unit.

The switching unit 83 outputs either a first ranging result output from the filtering unit 82 or a second ranging result output from the ranging unit 81e, according to a preset switching condition.

For example, the setting of a separately provided switch may be used as the switching condition, and either one of the first and second ranging results may be fixedly output according to this setting. A distance threshold may be used as the switching condition, where the second ranging result may be output for a close range of distances below the distance threshold, and the first ranging result may be output for a far range of distances above the distance threshold. Where, the integrated received-light information for a time range corresponding to the far range of distances may be input to the ranging unit 81, and the integrated received-light information for a time range corresponding to the close range of distances may be input to the ranging unit 81e.

8-2. Advantages

The eighth embodiment described in detail above can provide not only the advantages of the first to seventh embodiments according to the configurations of the first setting unit 91 and the second setting unit 92, but also the following advantage (8a).

(8a) In the present embodiment, the processing method to be performed by the distance calculation unit 8h can be switched according to a situation where interfering waves are occurring and the like, which can reduce the number of required memories and improve capability of removing interfering waves.

9. Ninth Embodiment

9-1. Differences from the First Embodiment

A ninth embodiment is similar in basic configuration to the first embodiment. Therefore, only differences of the ninth embodiment from the first embodiment will be described. Elements having the same functions as those in the first embodiment are assigned the same reference numerals. As for these elements, the preceding description should be referenced.

Figure 22:
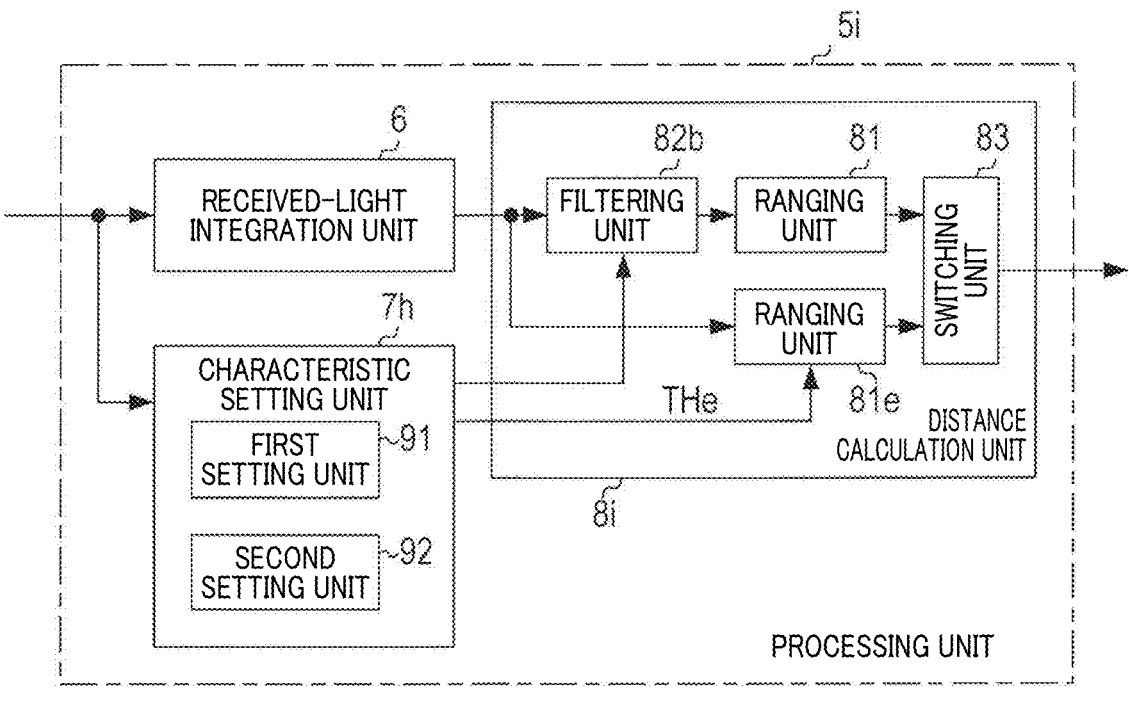
FIG. 22 is a block diagram of a ranging device according to a ninth embodiment.

In the ninth embodiment, as illustrated in FIG. 22, the characteristic setting unit 7h and the distance calculation unit 8i in the processing unit 5i are different in configuration from those of the first embodiment. The characteristic setting unit 7h has the similar configuration as that described in the seventh embodiment.

The distance calculation unit 8i includes the filtering unit 82b, two ranging units 81, 81e, and the switching unit 83.

The filtering unit 82b and the ranging unit 81 operate in a similar manner as the distance calculation unit 8b described in the third embodiment. The filtering unit 82b and the ranging unit 81 correspond to the first processing unit.

The ranging unit 81e operates in a similar manner as the distance calculation unit 8e described in the fifth embodiment. The ranging unit 81e corresponds to the second processing unit.

The switching unit 83 operates in a similar manner as described in the eighth embodiment.

9-2. Advantages

The ninth embodiment set forth above in detail can provide similar advantages to those of the eighth embodiment.

10. Tenth Embodiment

10-1. Differences from the First Embodiment

A tenth embodiment is similar in basic configuration to the first embodiment. Therefore, only differences of the tenth embodiment from the first embodiment will be described. Elements having the same functions as those in the first embodiment are assigned the same reference numerals. As for these elements, the preceding description should be referenced.

In the tenth embodiment, the characteristic setting unit 7j and the distance calculation unit 8j in the processing unit 5j are different in configuration from those of the first embodiment.

Figure 25:
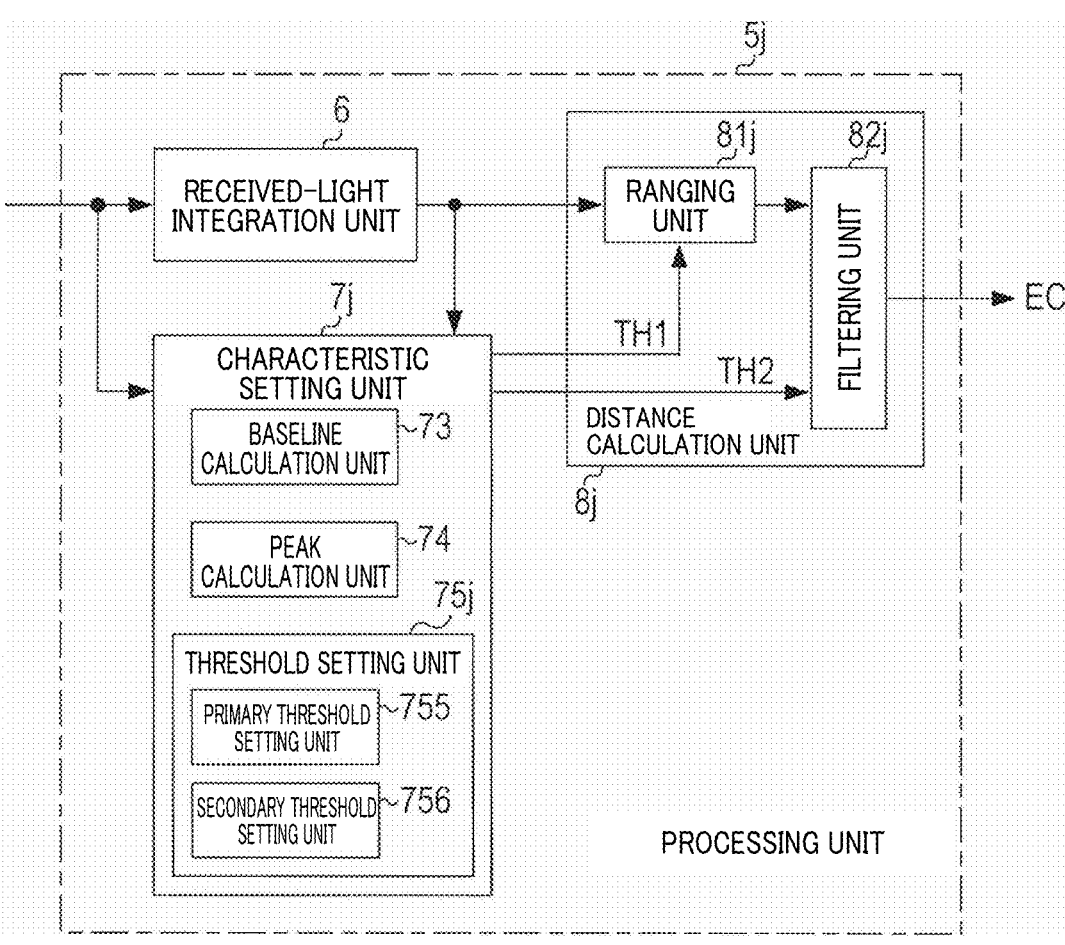
FIG. 25 is a block diagram of a ranging device according to a tenth embodiment.

As illustrated in FIG. 25, the characteristic setting unit 7j includes the baseline calculation unit 73, the peak calculation unit 74, and the threshold setting unit 75j.

The baseline calculation unit 73 and the peak calculation unit 74 are configured in a similar manner as described in the fifth embodiment. That is, the baseline calculation unit 73 calculates the individual baseline value $N_m$ for each piece of received-light information and further calculates the integrated baseline value Ns. The peak calculation unit 74 calculates the maximum amount of received light $S_m$ for each piece of received-light information.

The threshold setting unit 75j includes a primary threshold setting unit 755 and a secondary threshold setting unit 756.

As with the variability calculation unit 753 described in the seventh embodiment, the primary threshold setting unit 755 calculates the allowable variability value G×σ for the baseline values. Furthermore, the primary threshold setting unit 755 outputs a sum of the allowable variability value G×σ and the integrated baseline value Ns as the primary threshold value TH1. Supposing that D is the preset and fixed value, G×σ+Ns or D+Ns, whichever is larger, may be used as the primary threshold TH1.

As with the maximum extraction unit 751 described in the fifth embodiment, the secondary threshold setting unit 756 calculates the maximum relative peak value Smax. Furthermore, the secondary threshold setting unit 756 outputs a sum of the calculated maximum relative peak value Smax, the margin α, and the integrated baseline value Ns, as the secondary threshold TH2.

That is, the primary threshold TH1 is set using either the equation (15) or (16), and the secondary threshold TH2 is set using (17).

$$TH1 = G \times \sigma + Ns \qquad (15)$$

$$TH1 = D + Ns \qquad (16)$$

$$TH2 = S\text{max} + a + Ns \qquad (17)$$

Figure 26:
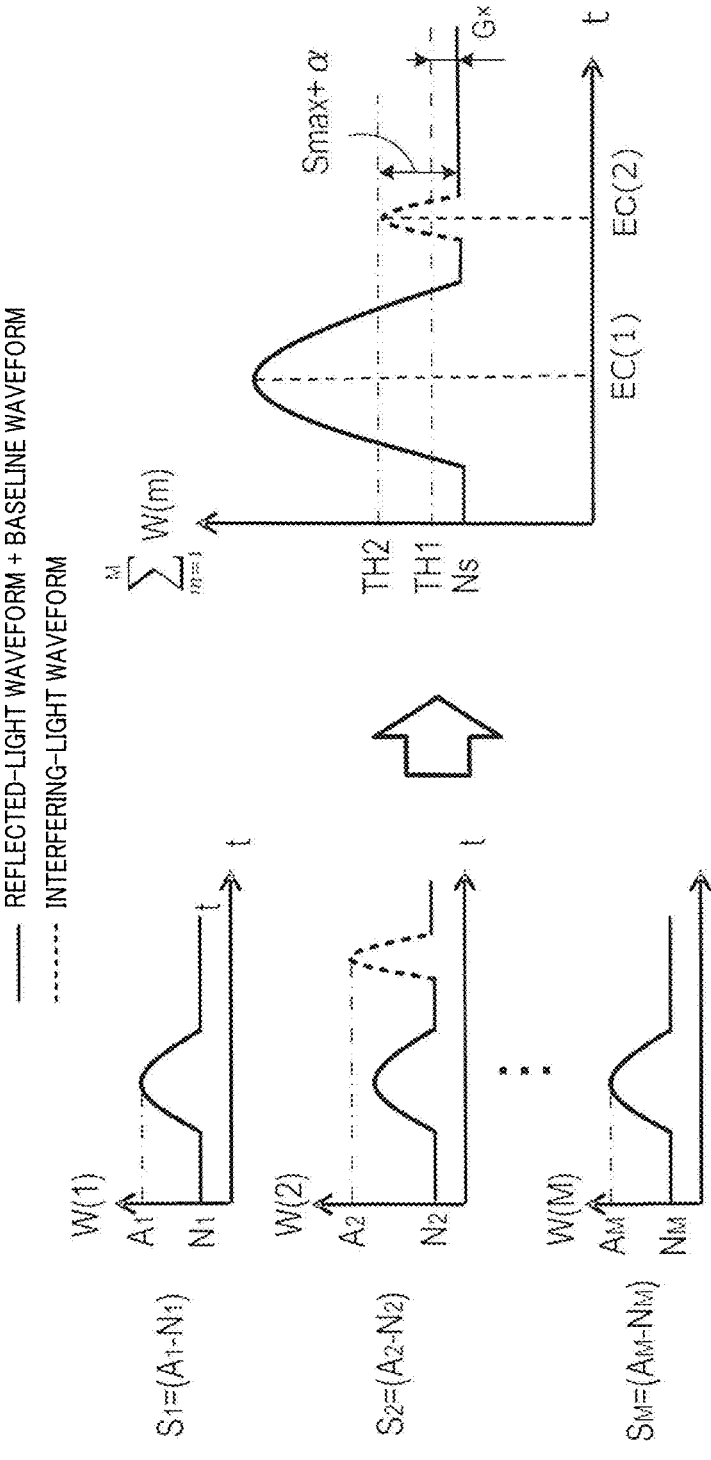
FIG. 26 is an illustration of a process performed by a ranging unit according to the tenth embodiment.

The relationship between the primary threshold TH1 and the secondary threshold TH2 is commonly TH1<TH2 as illustrated in FIG. 26. In cases where the baseline variability is large and the peak values of the reflected light and interfering light are small, the relationship between the primary threshold TH1 and the secondary threshold TH2 may be TH1≥TH2.

The distance calculation unit 8j includes the ranging unit 81j and the filtering unit 82j.

The ranging unit 81j extracts pulsed waveforms with a peak value greater than the primary threshold TH1 from the integrated received-light information and calculates a distance R to the object from the reception timing of each of the extracted pulsed waveforms. Then, the ranging unit 81j generates, for each extracted pulsed waveform, a piece of echo information EC that associates the distance R to the peak value P. In the following, the peak value for each piece of echo information EC is referred to as an echo peak value. The ranging unit 81j may sort the pieces of echo information EC in the order of decreasing echo peak value P.

In the following, the number of pieces of echo information EC generated by the ranging unit 81j is referred to as the number of detected echoes K. K is an integer equal to or greater than 0. The piece of echo information with the k-th largest echo peak value P among the pieces of echo information EC generated is referred to as EC(k), its echo peak value is denoted as P(k), and the distance is denoted as R(k).

The process performed by the filtering unit 82j will now be described in detail using the flowchart illustrated in FIG. 27.

This process is initiated every time the ranging process is performed by the ranging unit 81j on the integrated received-light information generated by the received-light integration unit 6.

At S110, the filtering unit 82j determines whether the number of detected echoes K is equal to or greater than one. If K≥1, the process flow proceeds to S120. If K<1, the process flow ends.

At S120, the filtering unit 82j initializes a count value Cnt which represents the number of pieces of valid-echo information based on reflected waves from an object among the plurality of pieces of echo information EC detected by the ranging unit 8j, and an index k used to identify the echo information EC. Specifically, the count value Cnt is initialized to zero and the index k is initialized to one. The echo information other than valid-echo information, that is, echo information based on interfering waves or the like, is referred to as invalid-echo information.

At S130, the filtering unit 82j determines whether the echo peak value P(k) of the echo information EC(k) is greater than the secondary threshold TH2. If P(k)≤TH2, the process flow proceeds to S140. If P(k)>TH2, the process flow proceeds to S150.

At S140, the filtering unit 82j sets the flag Flg (k) indicating whether the echo information EC (k) is valid-echo information or invalid-echo information to the value "False" indicating that the echo information EC (k) is invalid-echo information. The process flow proceeds to S170.

At S150, the filtering unit 82j increments the count value Cnt by one.

At subsequent S160, the filtering unit 82j sets the flag Flg (k) to the value "True" indicating that the echo information EC (k) is valid-echo information, The process flow proceeds to S170.

At S170, the filtering unit 82j increments the index k by one.

At S180, the filtering unit 82j determines whether the index k is equal to or less than the number K of detected echoes. If k≤K, the process flow returns to S130. If k>K, the process flow ends.

The count value Cnt acquired as a result of this process is referred to as the number of valid echoes. Assigning the flag Flg(k)=True to the echo information EC(k) corresponds to validating the echo information EC(k). Assigning the flag Flg(k)=False to the echo information EC(k) corresponds to invalidating the echo information EC(k). The invalid-echo information EC(k) may be removed or fed to later processing together with the valid-echo information EC(k).

10-2. Advantages

The tenth embodiment set forth above in detail can provide not only the advantage (1a) of the first embodiment, but also the following advantages (10a) and (10b).

(10a) In the present embodiment, echo information EC is generated from the integrated received-light information in two stages using two threshold values TH1 and TH2. In addition, the valid-echo information is extracted. That is, the similar advantage that TH1 (i.e., G×σ+Ns or D+Ns) or TH2 (i.e., Smax+α+Ns), whichever is larger, is used to extract the valid-echo information, can be provided as in the fifth embodiment.

(10b) In the present embodiment, use of the two thresholds TH1 and TH2 can improve flexibility of the device configuration. This means that, for example, in cases where an IC for generating only TH1 or an IC for generating only TH2 already exists separately, the device can be flexibly configured using these ICs.

10-3. Modification

In the case of the received-light integration unit 6 being configured to calculate the integrated received-light information such that Ns=0, the secondary threshold setting unit 756 may use the value calculated using the right side of any of the equations (1) to (3) instead of the equation (17) as the secondary threshold TH2. In the case of the received-light integration unit 6 being configured to integrate the plurality of pieces of received-light information using the non-zero baseline sequential integration method, the secondary threshold setting unit 756 may use the value calculated using the right side of any of the equations (4) to (7), instead of the equation (17) as the secondary threshold TH2.

11. Eleventh Embodiment

11-1. Differences from the Tenth Embodiment

An eleventh embodiment is similar in basic configuration to the tenth embodiment. Therefore, only differences of the eleventh embodiment from the tenth embodiment will be described. Elements having the same functions as those in the first embodiment are assigned the same reference numerals. As for these elements, the preceding description should be referenced.

In the eleventh embodiment, the distance calculation unit $8k$ in the processing unit $5k$ is different in configuration from that of the tenth embodiment.

Figure 28:
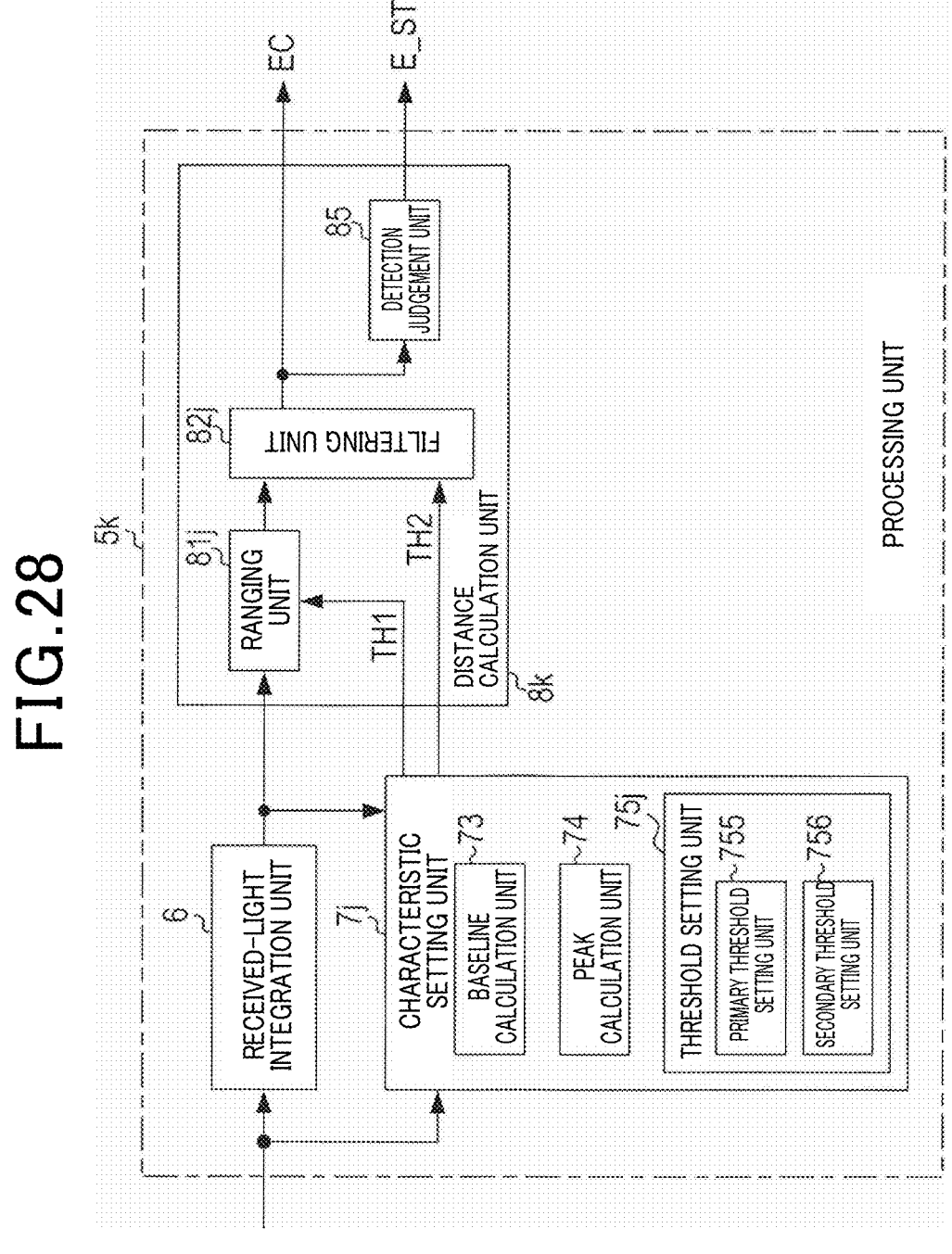
FIG. 28 is a block diagram of a ranging device according to an eleventh embodiment.

As illustrated in FIG. 28, the distance calculation unit $8k$ includes the ranging unit $81j$, the filtering unit $82j$, a detection judgement unit 85. The ranging unit $81j$ and the filtering unit $82j$ are configured in a similar manner as described in the tenth embodiment.

The detection judgement unit 85 determines whether valid-echo information has been properly extracted according to the number of detected echoes K acquired by the ranging unit $81j$ and the number of valid echoes Cnt acquired by the filtering uit $82j$.

Details of the process performed by the detection judgement unit 85 will now be described with reference to the flowchart illustrated in FIG. 29.

This process is initiated every time it is performed by the filtering unit $82j$.

At S210, the detection judgement unit 85 determines whether the number of detected echoes K is greater than zero and the number of valid echoes Cnt is zero. If the answer is YES at S210, the process flow proceeds to S220. Otherwise, the process flow proceeds to S230.

At S220, the detection judgement unit 85 sets a detection status E_ST to "UNDETECTED" indicating that there may be no valid echoes among the K echoes detected using the primary threshold TH1 but invalidated by the secondary threshold TH2. Thereafter, the process flow ends.

At S230, the detection judgement unit 85 sets the detection status E_ST to "DETECTED" indicating that the valid echoes have been properly detected. Thereafter, the process flow ends.

That is, in cases where the echoes based on the reflected waves from the object (hereinafter referred to as the "reflected echoes") have a higher peak value than the echoes based on the interfering waves (hereinafter referred to as the "interfering echoes") in the received-light information, the secondary threshold TH2 is set according to the peak values of the reflected echoes. In this case, the peak value of the reflected echoes is greater than the secondary threshold TH2 as a result of integration by the received-light integration unit 6, such that the echo information of the reflected echoes is extracted as valid-echo information. The peak value of the interfering echoes does not change in value even after integration by the received-light integration unit 6, and remains less than the secondary threshold TH2. Thus, the echo information of the interfering echoes is extracted as invalid-echo information.

Figure 30:
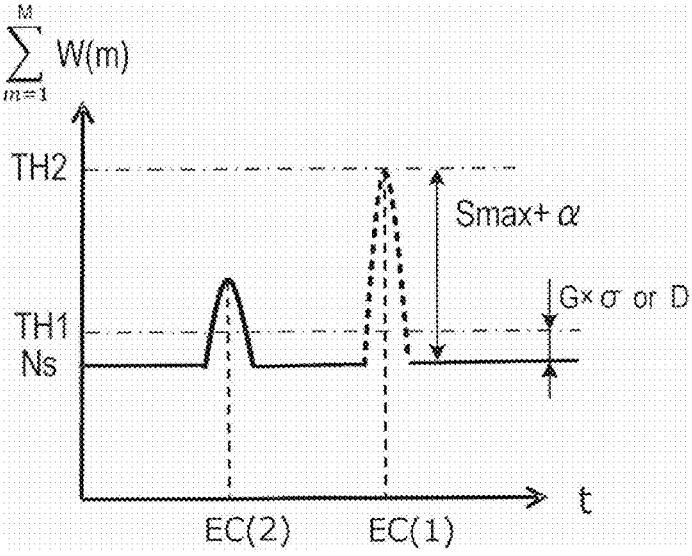
FIG. 30 is an illustration of a process performed by a detection judgement unit according to the eleventh embodiment.

On the other hand, as illustrated in FIG. 30, in cases where the echoes based on the interfering waves have a higher peak value than the echoes based on the reflected waves in the received-light information, the secondary threshold TH2 is set according to the peak value of the interfering echoes. In this case, since the secondary threshold TH2 may be greater than the peak value of the reflected echoes after integration, the echo information of the reflected echoes may be extracted as invalid-echo information. The detection status E_ST "UNDETECTED" indicates such a situation.

11-2. Advantages

The eleventh embodiment described in detail above can provide not only the advantage (1a) of the first embodiment and the advantages (10a) and (10b) of the tenth embodiment described above, but also the following advantage (11a) is achieved.

(11a) In the present embodiment, a notification that the echo information EC about the reflected echoes may be made invalid-echo information due to the presence of interfering echoes can be provided to later processing.

11-3. Modification

Figure 29:
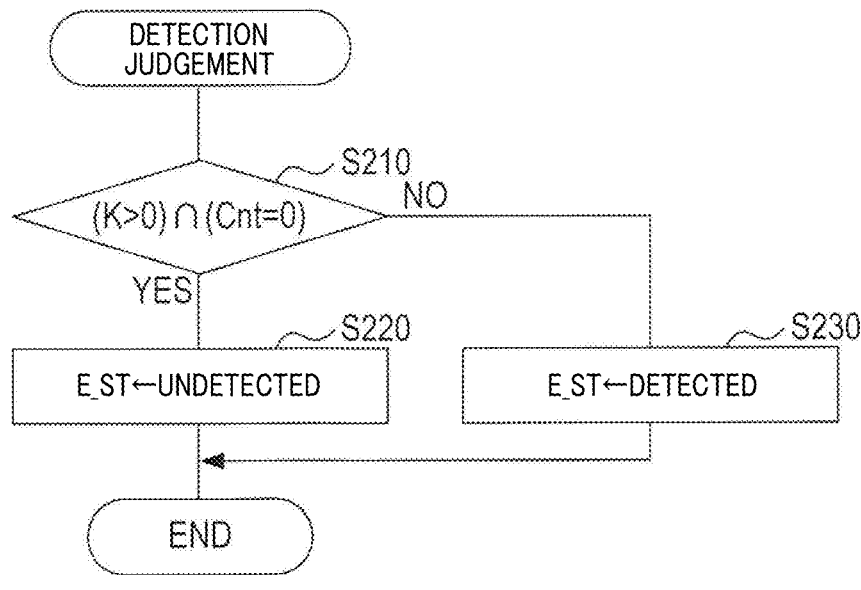
FIG. 29 is a flowchart of a process performed by a detection judgement unit according to the eleventh embodiment.
Figure 44:
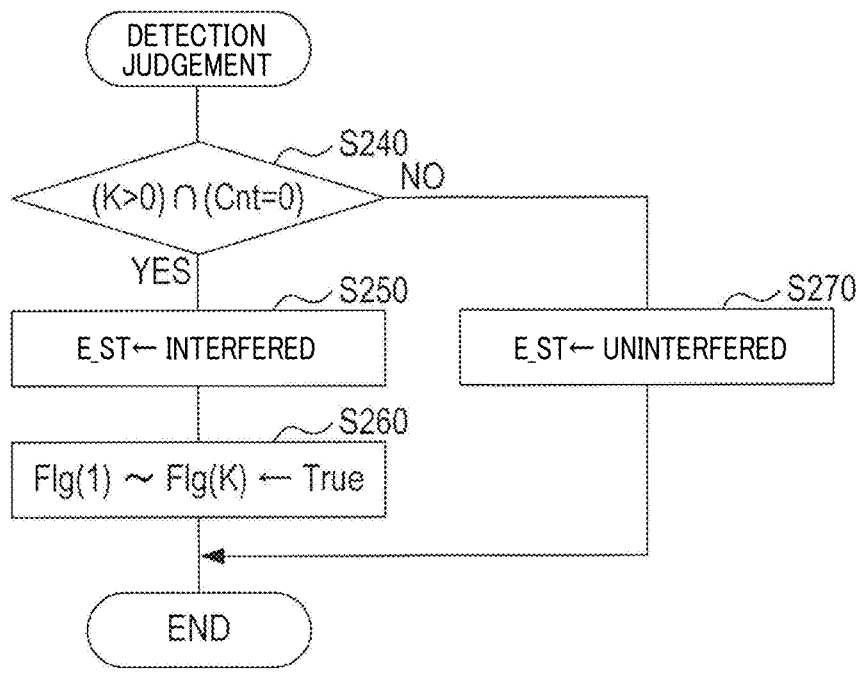
FIG. 44 is a flowchart of a process performed by a detection judgement unit according to a modification to the eleventh embodiment.

Instead of the detection determination process illustrated in FIG. 29, the detection judgement unit 85 may perform the detection determination process illustrated in FIG. 44.

At S240, the detection judgement unit 85 determines whether the number of detected echoes K is greater than zero and the number of valid echoes Cnt is zero. If the answer is YES at S240, the process flow proceeds to S250. Otherwise, the process flow proceeds to S270.

At S250, the detection judgement unit 85 determines the detection status E_ST to "INTERFERED" indicating that the K echoes detected using the primary threshold TH1 but invalidated by the secondary threshold TH2 may include echoes based on the interfering waves that can not be removed.

At S260, the detection judgement unit 85 returns the flags Flg(1) to Flg(K) of the K pieces of echo information EC(1) to EC(K) to True, indicating that they are all valid-echo information. Thereafter, the process flow ends.

At S270, the detection judgement unit 85 sets the detection status E_ST to "UNINTERFERED" indicating that there is no effect of interference. Thereafter, the process flow ends.

In this case, the interfering echoes may be detected, but reflected echoes can be suppressed from being non-detected.

12. Twelfth Embodiment

12-1. Differences from the Tenth Embodiment

A twelfth embodiment is similar in basic configuration to the tenth embodiment. Therefore, only differences of the twelfth embodiment from the tenth embodiment will be described. Elements having the same functions as those in the tenth embodiment are assigned the same reference numerals. As for these elements, the preceding description should be referenced.

In the twelfth embodiment, the distance calculation unit 81 in the processing unit $5k$ is different in configuration from that of the tenth embodiment.

Figure 31:
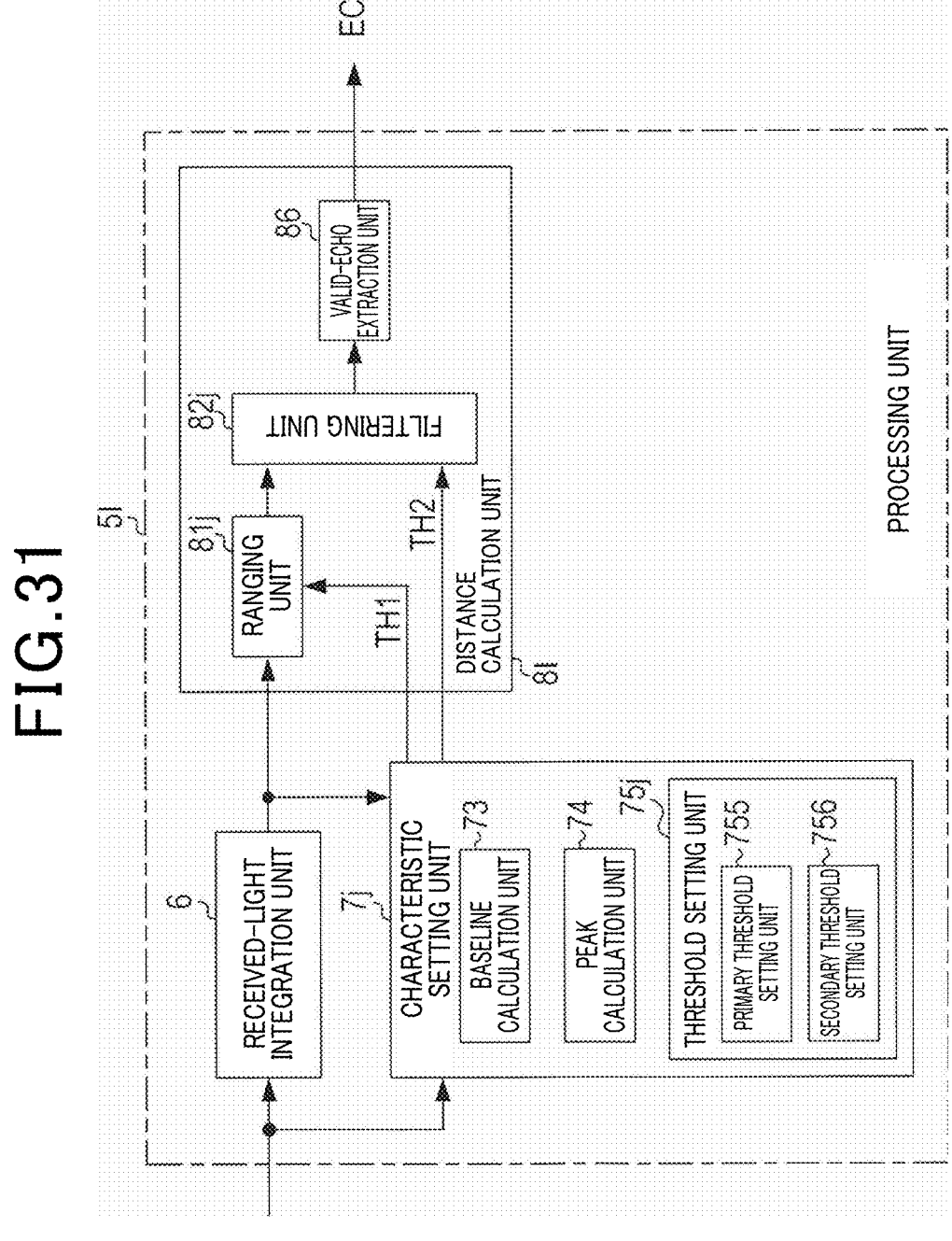
FIG. 31 is a block diagram of a ranging device according to a twelfth embodiment.

As illustrated in FIG. 31, the distance calculation unit 81 includes the ranging unit $81j$, the filtering unit $82j$, and a valid-echo extraction unit 86. The ranging unit $81j$ and the filtering unit $82j$ are configured in a similar manner as described in the tenth embodiment.

In cases where it is likely that the echo information EC about reflected echoes has been determined to be invalid-echo information by the filtering unit 82j, the valid-echo extraction unit 86 extracts this invalidated echo information as valid-echo information.

Figure 32:
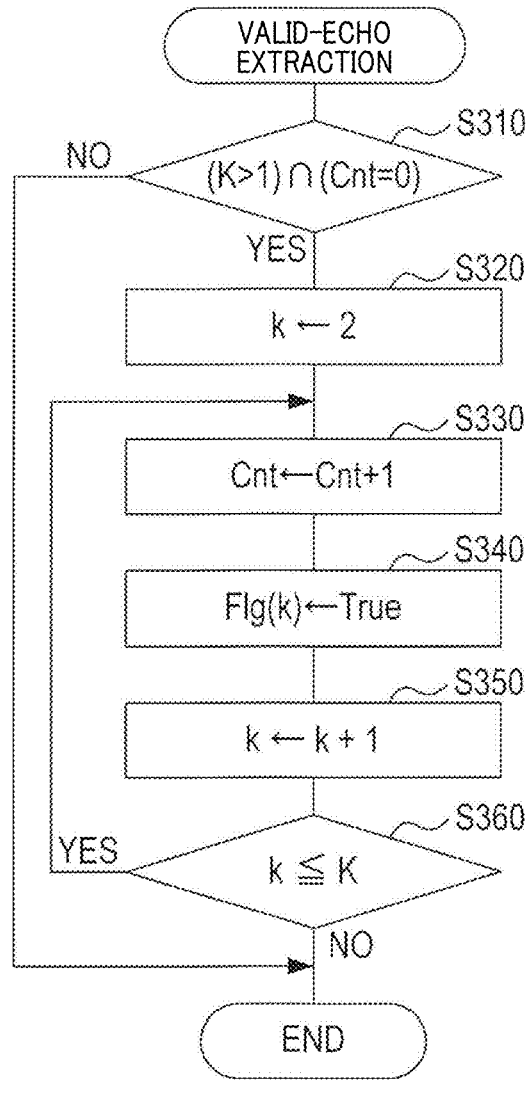
FIG. 32 is a flowchart of a process performed by a valid-echo extraction unit according to the twelfth embodiment.

Details of the process performed by the valid-echo extraction unit 86 will now be described with reference to the flowchart illustrated in FIG. 32.

This process is initiated every time it is performed by the filtering unit 82j.

At S310, the valid-echo extraction unit 86 determines whether the number of detected echoes K is greater than one and the number of valid echoes Cnt is zero. If the answer is YES at S310, the valid-echo extraction unit 86 assumes that the valid-echo information may not have been properly extracted. Then, the process flow proceeds to S320. If the answer is NO at S310, the valid-echo extraction unit 86 considers that the valid-echo information has been properly extracted. Then, the process flow ends.

At S320, the valid-echo extraction unit 86 sets the index k used to identify the echo information EC to two. At this point, the count value (i.e., the number of valid echoes) Cnt is zero and the flag Flg for each of all the pieces of echo information EC is set to the value "False" indicating that it is invalid.

Subsequently, at S330, the valid-echo extraction unit 86 increments the count value Cnt by one.

At S340, the valid-echo extraction unit 86 sets the flag Flg (k) which indicates whether the echo information EC (k) is valid-echo information to the value "True."

At S350, the valid-echo extraction unit 86 increments the index k by one.

Subsequently, at S360, the valid-echo extraction unit 86 determines whether the index k is equal to or less than the number of detected echoes K. If k≤K, the process flow returns to S330. If k>K, the process flow ends.

The pieces of echo information EC detected by the ranging unit 81j is sorted in the order of decreasing echo peak value P. Therefore, as a result of this processing, all the other pieces of echo information EC (2) to EC (K) are extracted as valid-echo information except for the echo information EC (1) that meets an invalidity condition of having the largest echo peak value.

12-2. Advantages

The twelfth embodiment described in detail above can provide not only the advantage (1a) of the first embodiment and the advantages (10a) and (10b) of the tenth embodiment described above, but also the following advantage (12a).

(12a) In the present embodiment, in cases where all the pieces of echo information EC are determined as invalid-echo information by the filtering unit 82j, the echo information EC (1) is removed as interfering echo information, which allows all the other pieces of echo information EC (2) to EC (K) to be extracted as valid-echo information.

12-3. Modification

Figure 33:
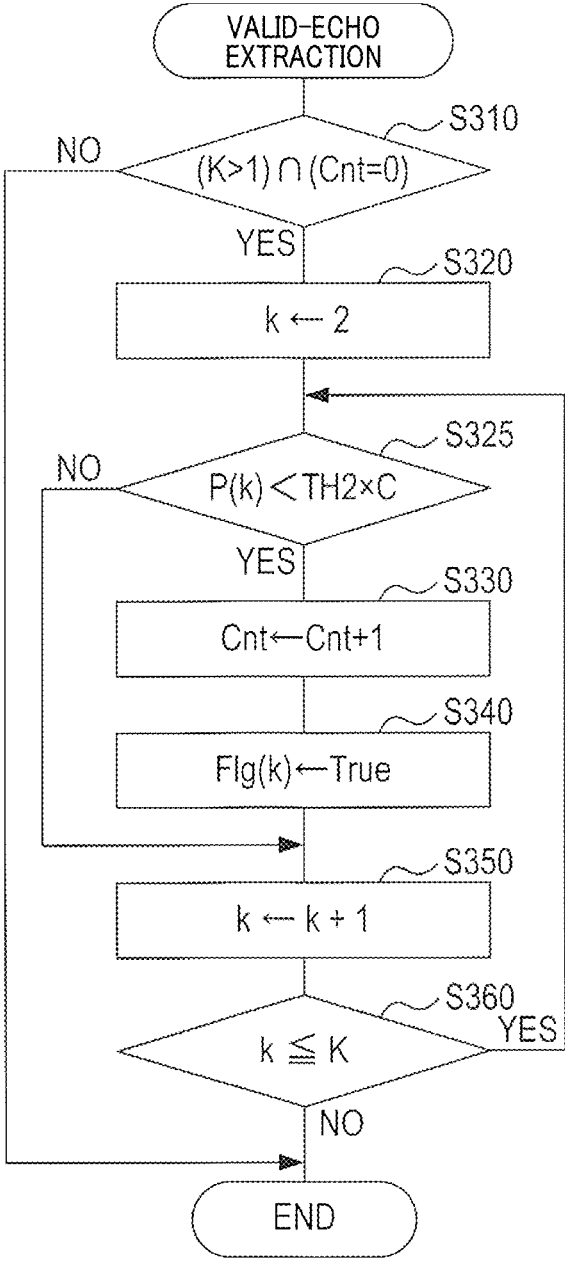
FIG. 33 is a flowchart of a process performed by a valid-echo extraction unit according to a modification to the twelfth embodiment.

A modification to the process performed by the valid-echo extraction unit 86 will now be described with reference to the flowchart illustrated in FIG. 33. This modified process is different from the process illustrated in FIG. 32 in that S325 is inserted before S330 and in that the process flow proceeds to S325 if the answer is YES at S360.

At S325, the valid-echo extraction unit 86 determines whether the echo peak value P(k) of the echo information EC(k) is less than the secondary threshold TH2 multiplied by a constant C. If P(k)<TH2×C, the process flow proceeds to S330. If P(k)≥TH2×C, the process flow proceeds to S350.

The constant C may be set to a value such that TH2× C=TH2−B, assuming that the integrated baseline value Ns varies within a range of Ns−B to Ns+B. That is, TH2×C corresponds to the invalidity threshold. The constant C is not limited thereto, but may be a fixed threshold value that can be freely set by developers.

The process of this modification allows other echo information having the peak value on the same order of magnitude as the echo peak value P(1) of the echo information EC(1) based on the interfering echo to be removed as invalid-echo information. Therefore, the valid-echo information can be properly extracted even in cases where there are multiple interfering echoes.

13. Thirteenth Embodiment

13-1. Differences from the Tenth Embodiment

A thirteenth embodiment is similar in basic configuration to the tenth embodiment. Therefore, only differences of the thirteenth embodiment from the tenth embodiment will be described. Elements having the same functions as those in the tenth embodiment are assigned the same reference numerals. As for these elements, the preceding description should be referenced.

In the thirteenth embodiment, the distance calculation unit 8m in the processing unit 5m is different in configuration from that of the tenth embodiment.

Figure 34:
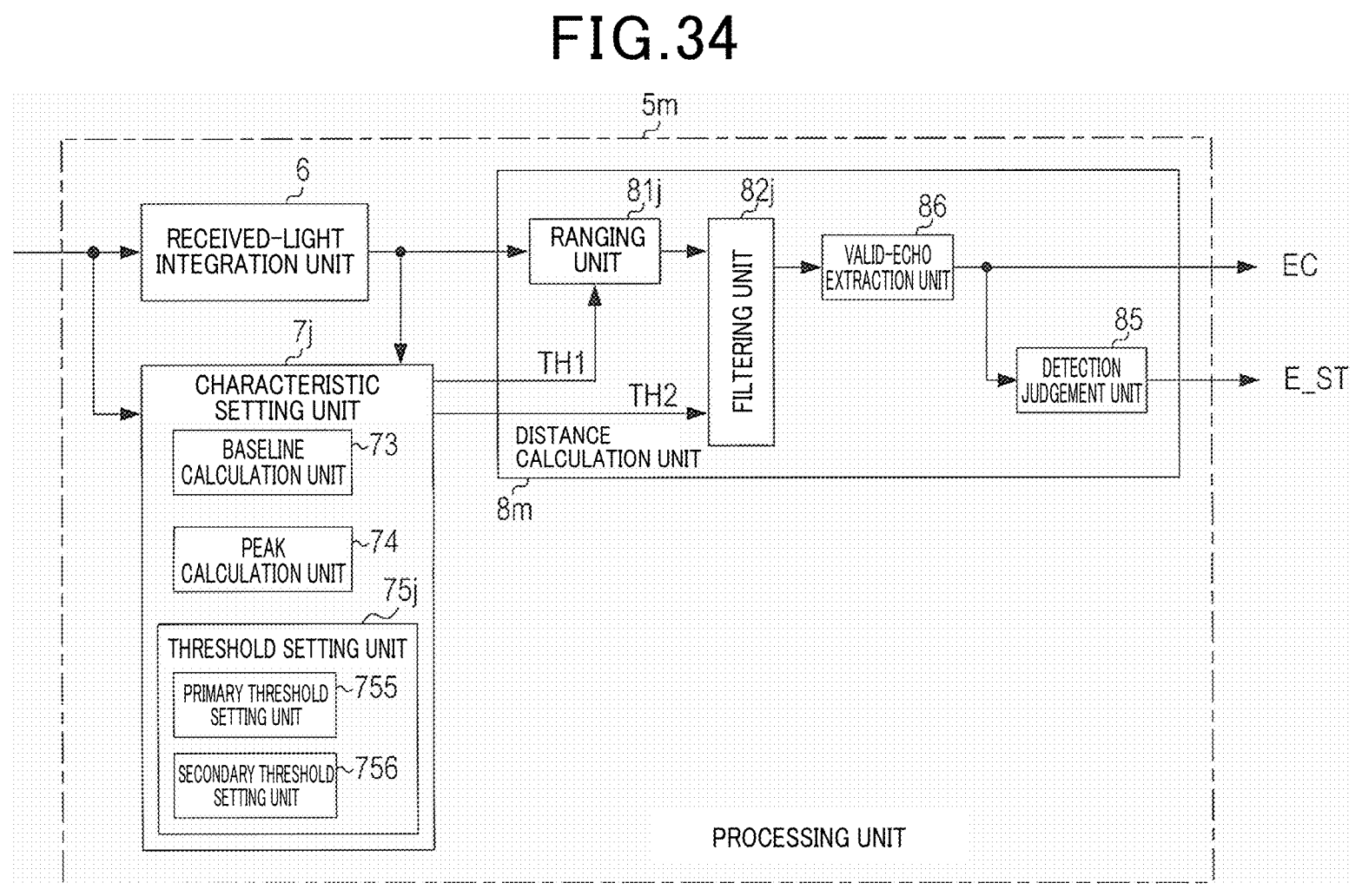

As illustrated in FIG. 34, the distance calculation unit 8m includes the ranging unit 81j, the filtering unit 82j, the valid-echo extraction unit 86, and the detection judgement unit 85. The ranging unit 81j and the filtering unit 82j are configured in a similar manner as described in the tenth embodiment. The detection judgement unit 85 is configured in a similar manner as described in the eleventh embodiment. The valid-echo extraction unit 86 is configured in a similar manner as described in the twelfth embodiment. In the present embodiment, the detection judgement unit 85 makes a determination using the number of valid echoes Cnt acquired as a result of processing by the valid-echo extraction unit 86.

12-2. Advantages

The thirteenth embodiment described in detail above can provide the advantages (1a), (10a), (10b), (11a) and (12a) of the first and tenth to twelfth embodiments.

14. Fourteenth Embodiment

14-1. Differences from the Thirteenth Embodiment

A fourteenth embodiment is similar in basic configuration to the thirteenth embodiment. Therefore, only differences of the fourteenth embodiment from the thirteenth embodiment will be described. Elements having the same functions as those in the thirteenth embodiment are assigned the same reference numerals. As for these elements, the preceding description should be referenced.

In the fourteenth embodiment, the characteristic setting unit 7n and the distance calculation unit 8n in the processing unit 5n are different in configuration from those of the thirteenth embodiment.

As illustrated in FIG. 35, the characteristic setting unit 7*n* includes the baseline calculation unit 73, the peak calculation unit 74, the threshold setting unit 75*j*, and the peak variability calculation unit 76. These units, other than the peak variability calculation unit 76, are configured in a similar manner as in the tenth embodiment.

The peak variability calculation unit 76 calculates a degree of variability using the maximum-light-reception timing $t_m$, which is the timing at which the maximum amount of received light is detected in the received-light information acquired in the m-th measurement, among the M pieces of received-light information to be integrated.

Figure 36:
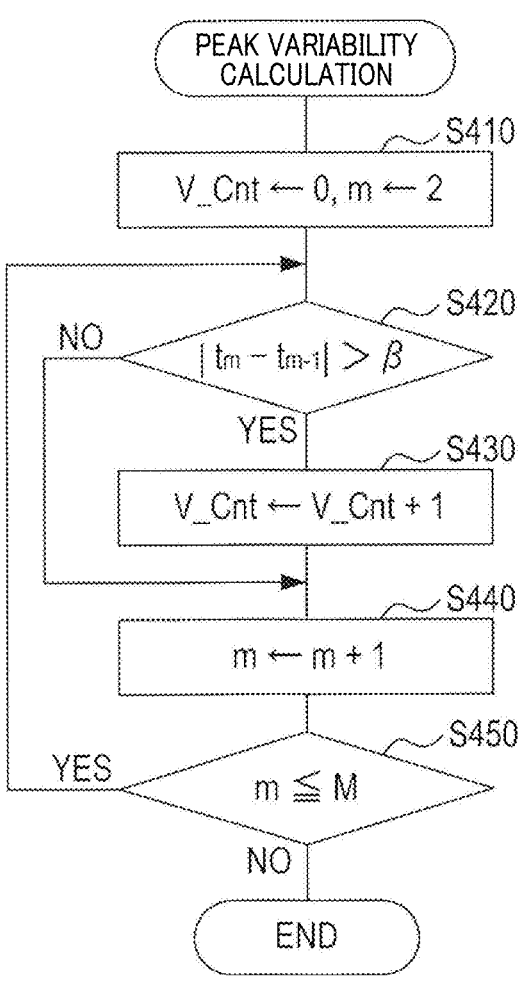
FIG. 36 is a flowchart of a process performed by a peak variability calculation unit according to the fourteenth embodiment.

Details of the process performed by the peak variability calculation unit 76 will now be described with reference to the flowchart illustrated in FIG. 36.

At S410, the variability calculation unit 76 initializes a variability count value V_Cnt which represents the degree of variability, and an index m which is used to identify the M pieces of received-light information to be integrated. Specifically, V_Cnt is set to zero and m is set to two.

Subsequently, at S420, the variability calculation unit 76 determines whether the absolute value of a difference between the maximum-light-reception timings $t_m$ and $t_{m-1}$ in the pieces of received-light information acquired in the m-th and (m−1)-th measurements (hereinafter referred to as a timing difference), that is, $|t_m−t_{m-1}|$, is greater than a preset threshold β. If the variability calculation unit 76 determines $|t_m−t_{m-1}|>β$, the process flow proceeds to S430. If the variability calculation unit 76 determines $|t_m−t_{m-1}|≤β$, the process flow proceeds to S440. For example, based on the measurement cycles or the like, β is set to the maximum value of allowable variability, taking into account the allowable variability in timings at which the echo peaks that can be regarded as peaks of reflected echoes from the same object are detected.

At S430, the variability calculation unit 76 increments the variability count value V_Cnt by one, and then the process flow proceeds to S440.

At S440, the variability calculation unit 76 increments the index m by one.

Subsequently, at S450, the variability calculation unit 76 determines whether the index m is equal to or less than the number of integrations M. If m≤M, the process flow returns to S420, and if m>M, the process flow ends.

Figure 37:
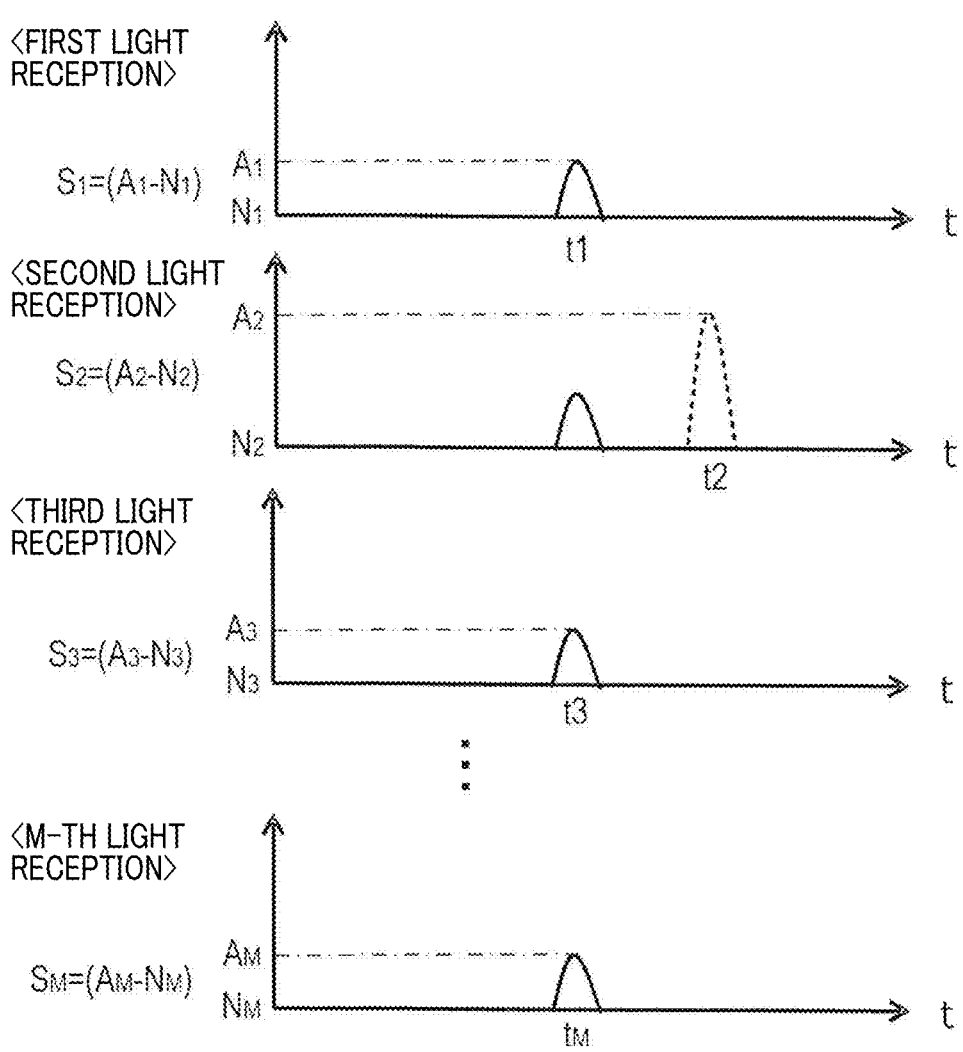
FIG. 37 is an illustration of a process performed by a peak variability calculation unit according to the fourteenth embodiment.

That is, as illustrated in FIG. 37, raw peak values based on reflected light from the same object are all detected at approximately the same timing in the M pieces of received-light information to be integrated. On the other hand, a raw peak value based on interfering light is detected singularly at a different timing from the raw peak values based on reflected light. In cases where the raw peak value based on interfering light is greater than the raw peak values based on reflected light, only the maximum-light-reception timing for the piece of received-light information in which interfering light is detected differs from the maximum-light-reception timings for the other pieces of received-light information. Thus, for example, in FIG. 36, the two timing differences calculated using the maximum-light-reception timing t2 for the piece of received-light information in which interfering light is detected, that is, |t2−t1| and |t3−t2|, are greater than the threshold β, and then the variability count value V_Cnt is incremented.

The distance calculation unit 8*n* is different from the detection judgement unit 8*m* described in the thirteenth embodiment in that the detection judgement unit 85*n* has a different configuration. The valid-echo extraction unit 86 performs the process illustrated in the flowchart of FIG. 32, that is, it removes the echo information EC (1) as invalid-echo information, and regards the other pieces of echo information than the echo information EC(1) as valid-echo information.

Details of the process performed by the detection judgement unit 85*n* will now be described with reference to the flowchart illustrated in FIG. 38.

Figure 38:
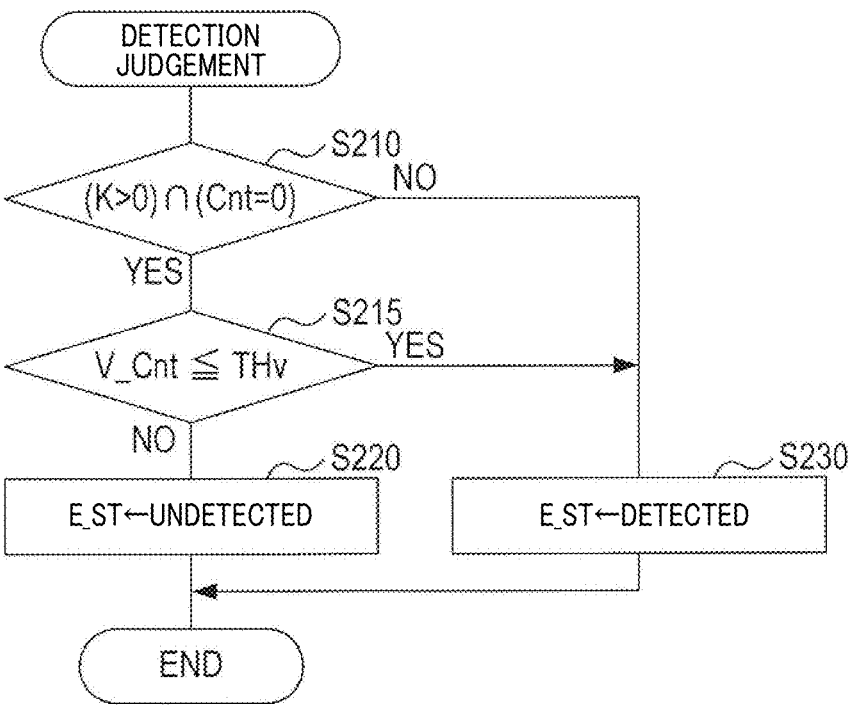
FIG. 38 is a flowchart of a process performed by a detection judgement unit according to the fourteenth embodiment.

The flowchart in FIG. 38 is different from the flowchart in FIG. 29 in that S215 is inserted between S210 and S220.

At S215, the detection judgement unit 85*n* determines whether the variability count value V_Cnt is equal to or less than a predefined variability threshold THv. If Cnt>THv, the process flow proceeds to S220. If V_Cnt≤THv, the process flow proceeds to S230.

The variability threshold THv is set, for example, to 2. The process step S215 in the case of THv=2 corresponds to determining whether the number of peaks based on interfering waves (i.e., interfering echoes) among the peaks with the maximum amount of received light detected in the respective pieces of received-light information is equal to or less than one.

That is, in cases where the number of interfering echoes detected as peaks with the maximum amount of received light is equal to or less than one, the echo information of the interfering echo is considered to be invalid-echo information by the valid-echo extraction unit 86, and the echo information other than the echo information is extracted as valid-echo information. Therefore, the detection status E_ST is set to the value "DETECTED". In cases where the number of interfering echoes detected as peaks with the maximum amount of received light is equal to or greater than two, the valid-echo information may not be correctly extracted by the effective echo extraction unit 86. Therefore, the detection status E_ST is set to the value "UNDETECTED".

14-2. Advantages

The fourteenth embodiment described in detail above, as with the thirteenth embodiment described above, can provide the advantages (1a), (10a), (10b), (11a), and (12a) of the first and tenth to twelfth embodiments, and further provide the following advantage (14a).

(14a) In the present embodiment, the extent to which the received-light information includes interfering echoes with a raw peak value greater than that of any of the reflected echoes is determined from the variability of the maximum-light-reception timings. In cases of large extent, the detection status E_ST is set to "UNDETECTED". This can prevent false echo information affected by interfering echoes from being provided to later processing.

14-3. Modification

In the above fourteenth embodiment, the variability count value V_Cnt is used for processing in the detection judgement unit 85*n*. The variability count value V_Cnt may be used for processing in the valid-echo extraction unit 86, as indicated by the dotted arrow in FIG. 35. In this case, in the flowchart of FIG. 32, a step may be inserted just before or just after S310, such that, if V_Cnt>2, the process flow may be terminated without rewriting the Flg.

15. Fifteenth Embodiment

15-1. Differences from the Tenth Embodiment

A fifteenth embodiment is similar in basic configuration to the tenth embodiment. Therefore, only differences of the fifteenth embodiment from the tenth embodiment will be described. Elements having the same functions as those in the tenth embodiment are assigned the same reference numerals. As for these elements, the preceding description should be referenced.

In the fifteenth embodiment, the characteristic setting unit 70 and the distance calculation unit 80 in the processing unit 50 are different in configuration from those of the tenth embodiment.

Figure 39:
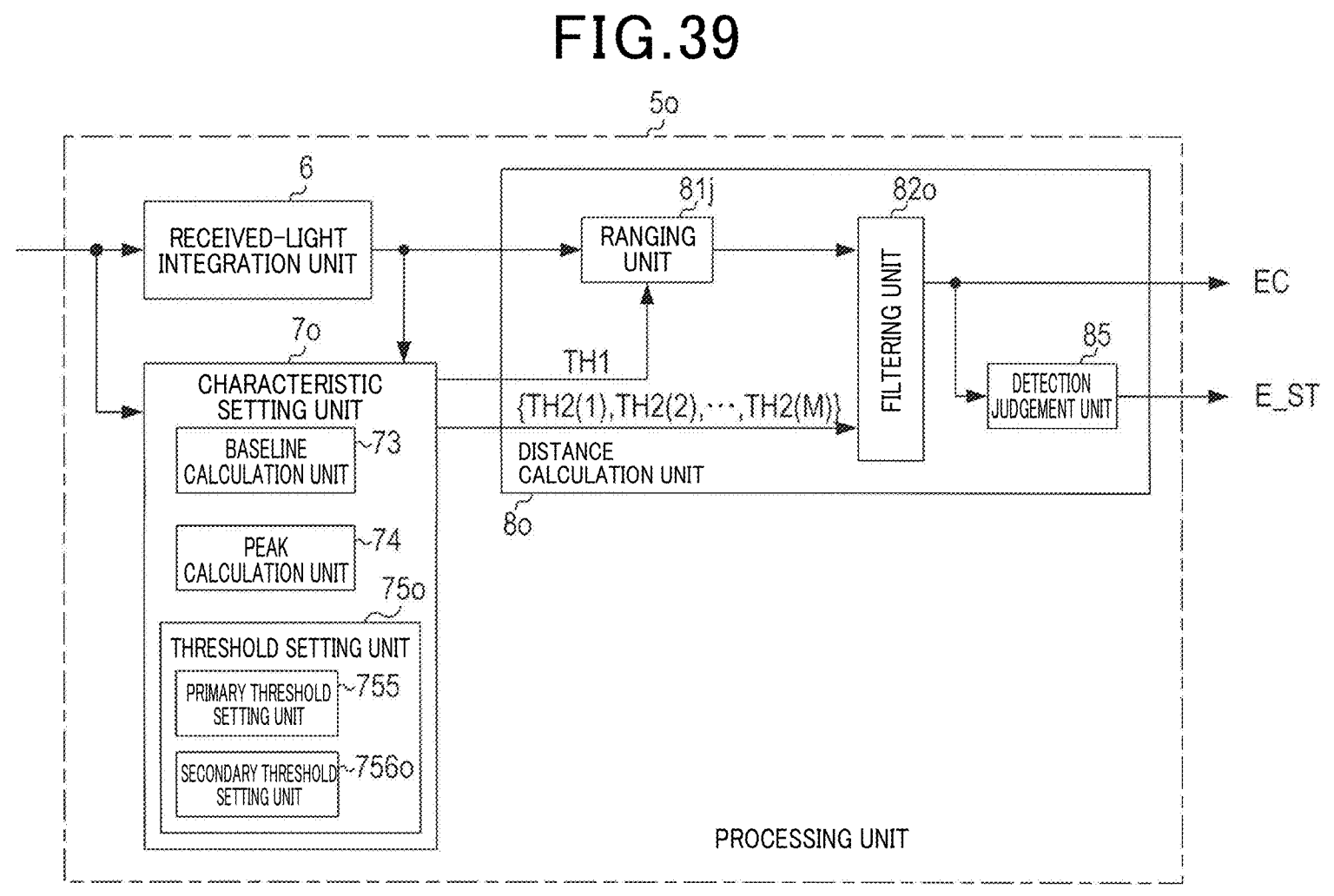

As illustrated in FIG. 39, the characteristic setting unit 70 includes the baseline calculation unit 73, the peak calculation unit 74, the threshold setting unit 750. The baseline calculation unit 73 and the peak calculation unit 74 are configured in a similar manner as those described in the tenth embodiment.

The threshold setting unit 750 includes the primary threshold setting unit 755 and the secondary threshold setting unit 7560. The primary threshold setting unit 755 is configured in a similar manner as described in the tenth embodiment.

The secondary threshold setting unit 7560 sorts the maximum amounts of received light (i.e., raw peak values) $A_1$ to $A_M$ calculated for the respective pieces of received-light information W(1) to W(M) by the peak calculation unit 74 in the order of decreasing maximum amount of received light. The m-th largest maximum amount of received light $A_m$ is denoted as TH2 ($m$). The secondary threshold setting unit 7560 generates M secondary threshold values TH2(1) to TH2(M) and supply them to the distance calculation unit 80.

The distance calculation unit 80 includes the ranging unit 81*j*, the filtering unit 82*o*, and the detection judgement unit 85. The ranging unit 81*j* is configured in a similar manner as described in the tenth embodiment. The detection judgement unit 85 is configured in a similar manner as described in the 11th embodiment.

Figure 40:
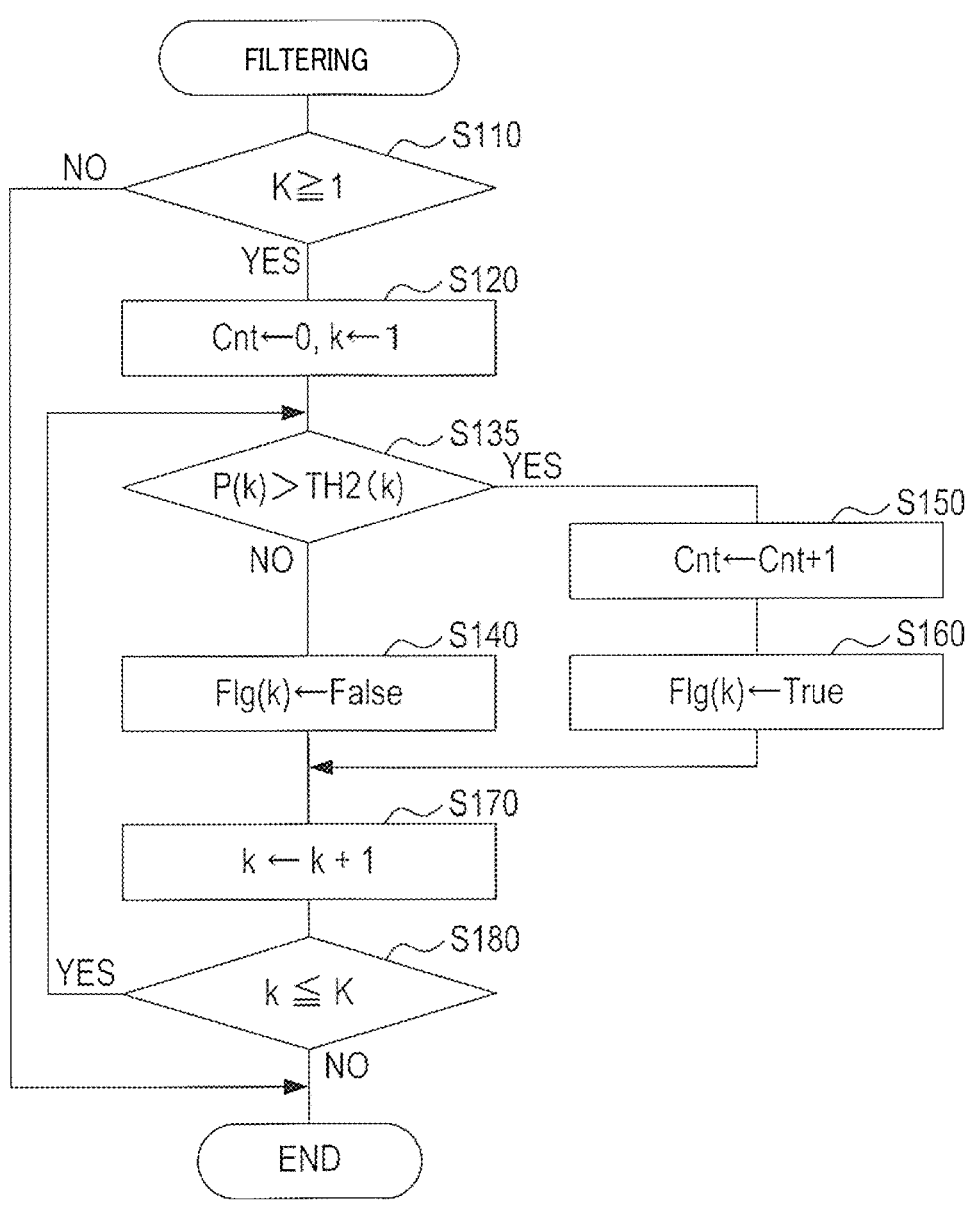
FIG. 40 is a flowchart of a process performed by a filtering unit according to the fifteenth embodiment.

Details of the process performed by the filtering unit 82*o* will now be described with reference to the flowchart illustrated in FIG. 40.

This process is initiated every time a result of the ranging process performed by the ranging unit 81*j* on the integrated received-light information generated by the received-light integration unit 6 is output. It is assumed that the K pieces of echo information EC(1) to EC(K) supplied from the ranging unit 81*j* are sorted in the order of decreasing echo peak value P(k) and K≤M, where the echo peak value P(k) is the maximum amount of received-light in the corresponding pulsed waveform.

Figure 27:
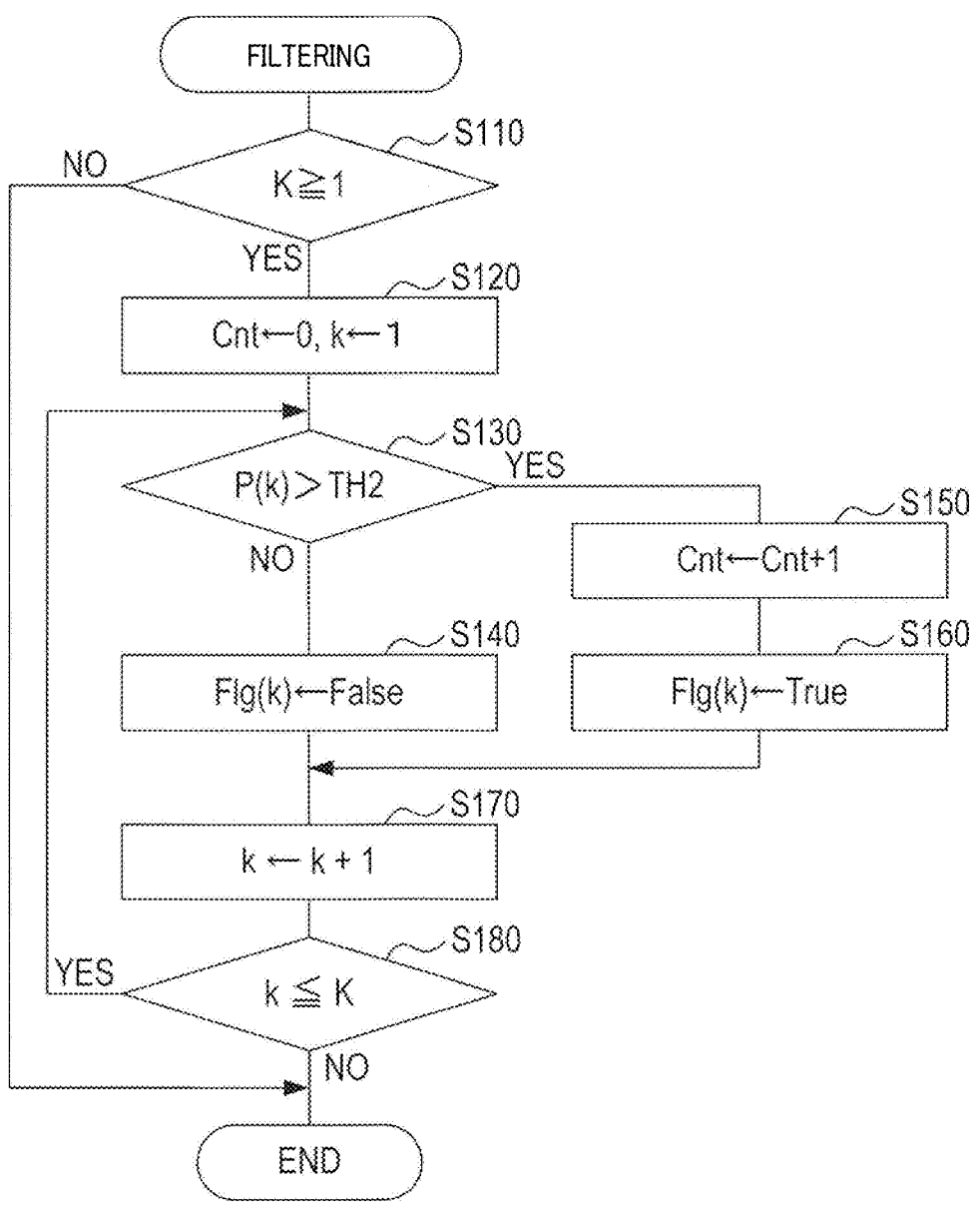
FIG. 27 is a flowchart of a process performed by a filtering unit according to the tenth embodiment.

This process is different from the flowchart illustrated in FIG. 27 in that S130 is replaced with S135.

At S135, the filtering unit 82*o* determines whether the echo peak value P(k) of the echo information EC(k) with the k-th largest peak value is greater than the k-th largest secondary threshold TH2(*k*). If P(k)≤TH2, the process flow proceeds to S140, and if P(k)>TH2 (*k*), the process flow proceeds to S150.

Assuming that one interfering echo is only detected in any of the plurality of pieces of received-light information, the aforementioned process enables removal of the echo information of one or more interfering echoes having a peak value greater than the echo peak value P of the reflected echo after integration as invalid echo information.

15-2. Advantages

The fifteenth embodiment described in detail above can provide not only the advantage (1a) of the first embodiment and the advantages (10a) and (10b) of the tenth embodiment described above, but also the following advantage (15a).

(15a) According to the present embodiment, the echo information of one or more interfering echoes having a peak value greater than the echo peak value P of the reflected echo after integration can all be removed. Therefore, this enables improvement of the reliability of object detection based on the finally extracted valid-echo information.

In the present embodiment, the pieces of echo information EC are sorted in the order of decreasing echo peak value P. Alternatively, the pieces of echo information EC may be sorted in the order of increasing echo peak value P and compared with the secondary thresholds TH2 sorted in ascending order.

16. Sixteenth Embodiment

16-1. Assumed Situation

Before describing the configuration of the sixteenth embodiment, an assumed mode of interfering light in the present embodiment will now be described.

Figure 45:
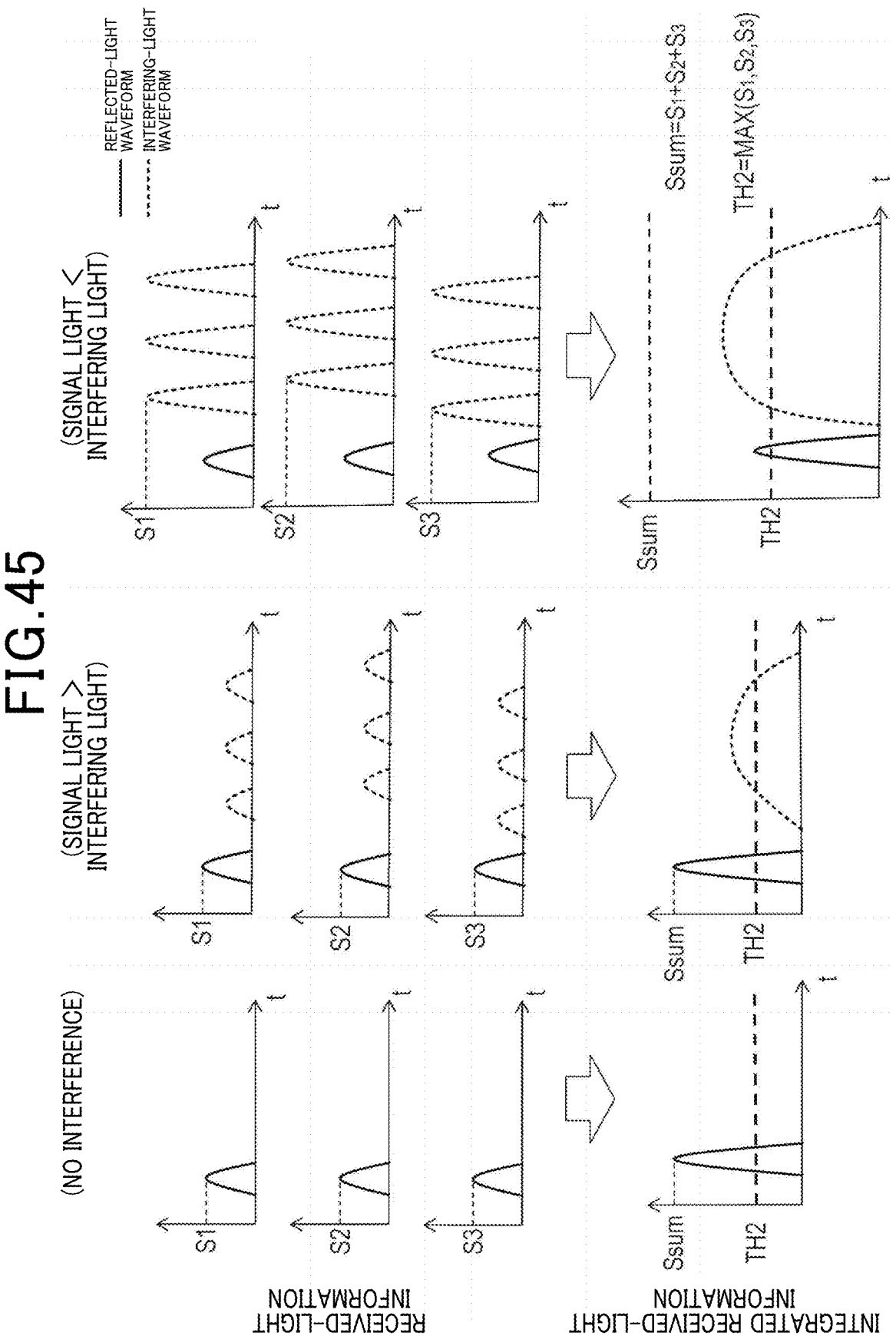
FIG. 45 is an illustration of an assumed situation according to a sixteenth embodiment.

In the present embodiment, it is assumed that interfering light is emitted light from a flash-type LiDAR. The flash type LiDAR transmits light repeatedly in short time intervals. In addition, since the flash-type LiDAR emits light by diffusing it when it is projected, the intensity of light per unit area is lower than that of other types of LIDAR. Thus, a plurality of rays of interfering light are detected in respective pieces of received-light information, but the timings at which the rays of interfering light are detected in the pieces of received information are different. As a result, as illustrated in FIG. 45, the waveform of the interfering light in the integrated received-light information has a lower peak value than a simple sum of peak values of the interfering echoes detected in the respective pieces of received-light information, and has a large pulse width that covers the entire time range in which the interfering light exists. The peak value of interfering echoes integrated in this manner may exceed the second threshold TH2 and may be detected as signal light. In FIG. 45, the noise floor is omitted for ease of viewing the drawing.

In the present embodiment, even if the interfering echoes can not be removed in such a situation, it is possible to suppress occurrence of situations where the reflected echoes are undetected due to the effect of the interfering echoes.

16-2. Differences from the Tenth Embodiment

A sixteenth embodiment is similar in basic configuration to the tenth embodiment. Therefore, only differences of the sixteenth embodiment from the tenth embodiment will be described. Elements having the same functions as those in the first embodiment are assigned the same reference numerals. As for these elements, the preceding description should be referenced.

In the sixteenth embodiment, the characteristic setting unit 7*p* and the distance calculation unit 8*p* in the processing unit 5*p* are different in configuration from those of the tenth embodiment.

Figure 46:
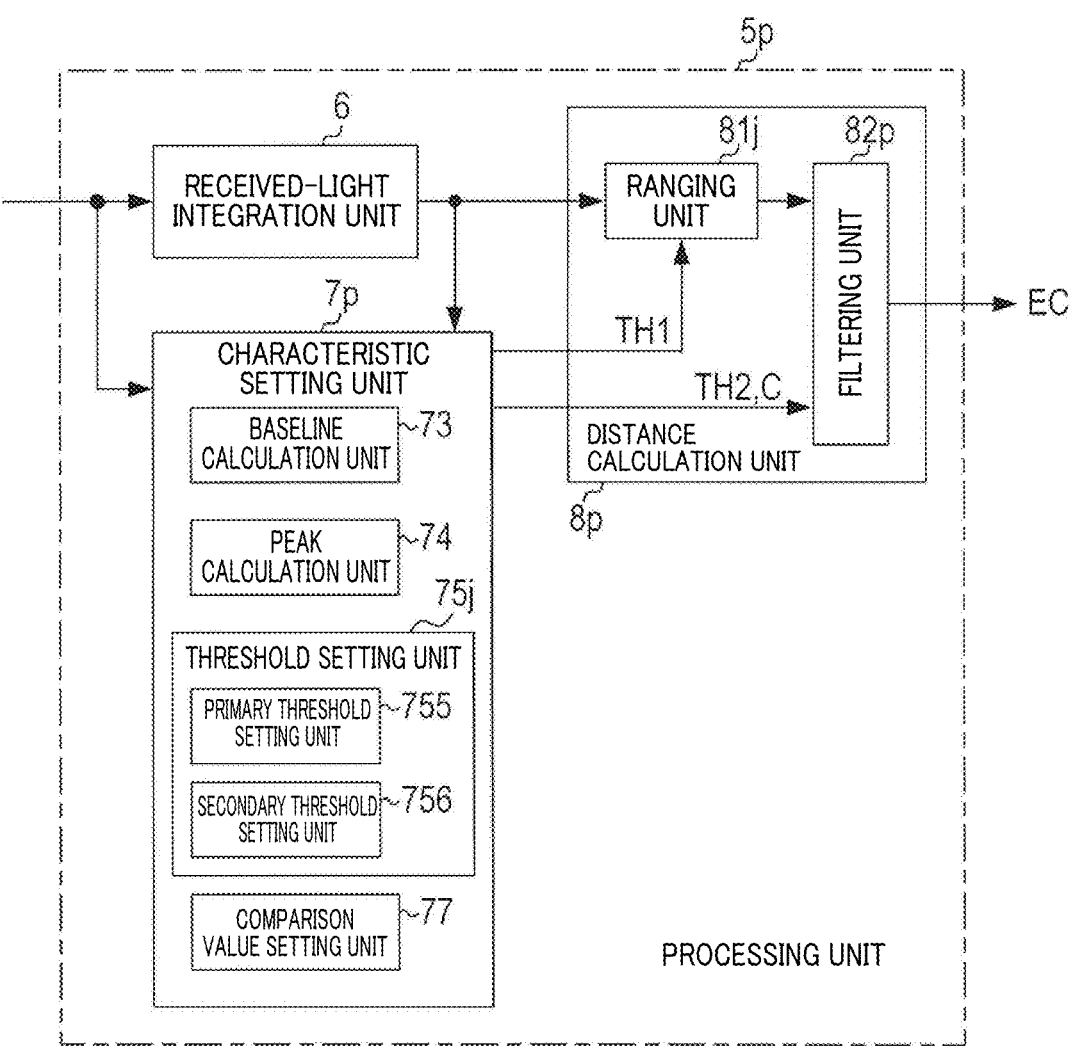
FIG. 46 is a block diagram of a ranging device according to the sixteenth embodiment.

As illustrated in FIG. 46, the characteristic setting unit 7*p* includes the baseline calculation unit 73, the peak calculation unit 74, the threshold setting unit 75*j*, and a comparison value setting unit 77. That is, the characteristic setting unit 7*p* is configured such that the comparison value setting unit 7*j* is added to the characteristic setting unit 7*j* configured as in the tenth embodiment.

The comparison value setting unit 77 calculates the comparison value D to be used for determining the presence or absence of interference, and supplies the comparison value D to the distance calculation unit 8p. As shown in equation (18), the comparison value D is calculated by adding a sum of the relative peak values S1 to SM calculated by the peak calculation unit 74 for the plurality of received-light information, Ssum, to the integrated baseline value Ns calculated by the baseline calculation unit 73.

$$D = Ssum + Ns \qquad (18)$$

The distance calculation unit 8p includes the ranging unit 81j and the filtering unit 82p.

The filtering unit 82p performs the process described in the tenth embodiment when the following equation (19) is satisfied.

$$|D - P(1)| < THp \qquad (19)$$

P(1) is the peak value of the echo information EC(1), and is the largest peak value among the K echoes extracted by the ranging unit 81j. THp is an interference threshold. The interference threshold THp is set based on the result of experimentally calculating the magnitude and variability in difference between the sum of the relative peak values detected in the respective pieces of received-light information based on the same object and the relative peak value detected in the integrated received-light information for the same object. The interference threshold THp may be set by multiplying the maximum relative peak value Smax by a coefficient.

Figure 48:
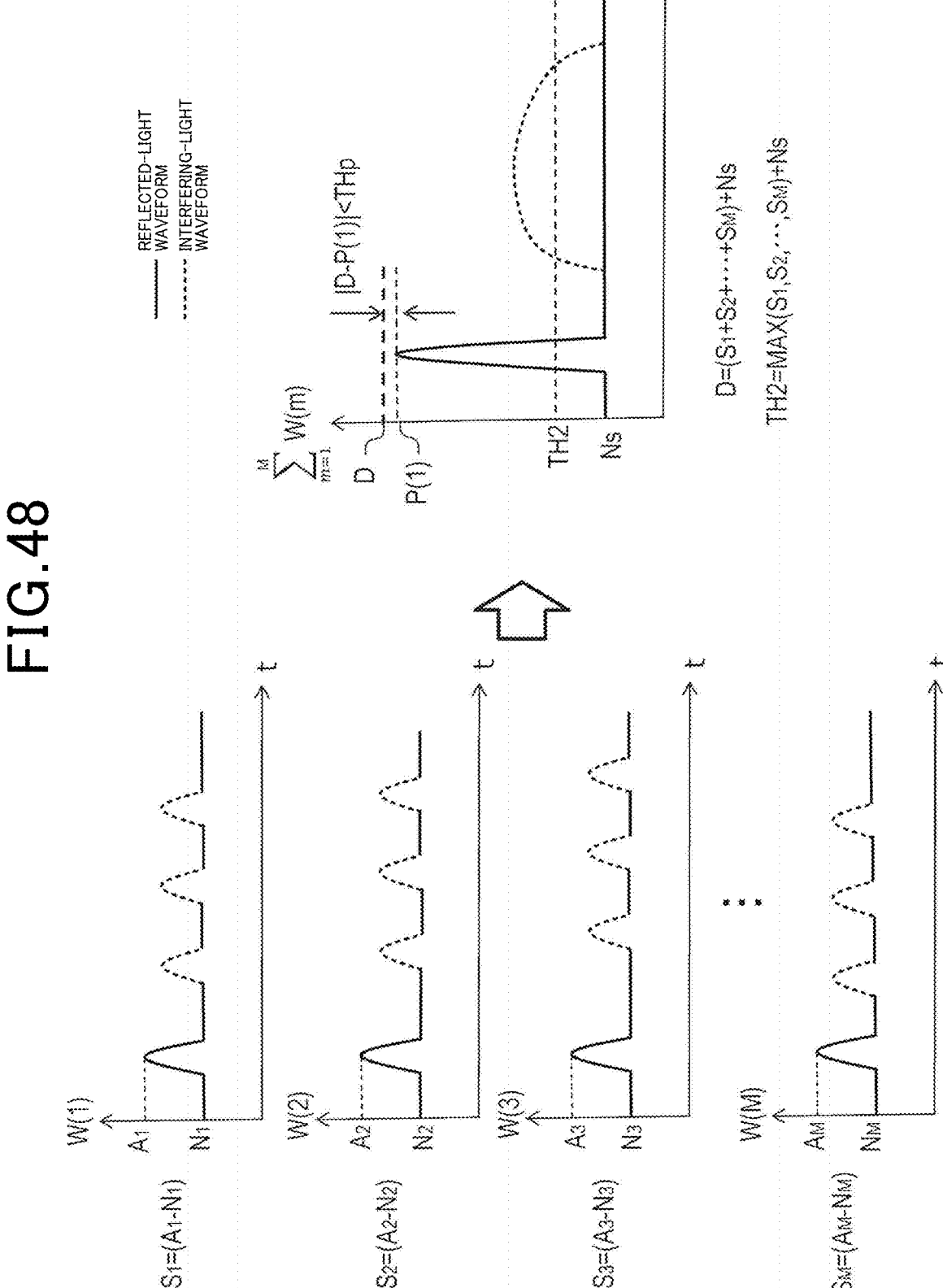
FIG. 48 is an illustration of each piece of received-light information and integrated received-light information in a case where interfering light peaks included in each piece of received-light information are lower than a reflected light peak.

That is, as illustrated in FIGS. 47 and 48, in cases where the relative peak values $S_1$-$S_M$ extracted from the M pieces of received-light information include no relative peak values based on interfering echoes, the comparison value D and the peak value P(1) will be almost the same. Therefore, when the equation (19) is satisfied, the echo information EC (1) can be determined to be a reflected echo. FIG. 47 illustrates a case where there is no interfering light, and FIG. 48 illustrates a case where the interfering light has a low intensity than the signal light.

Figure 49:
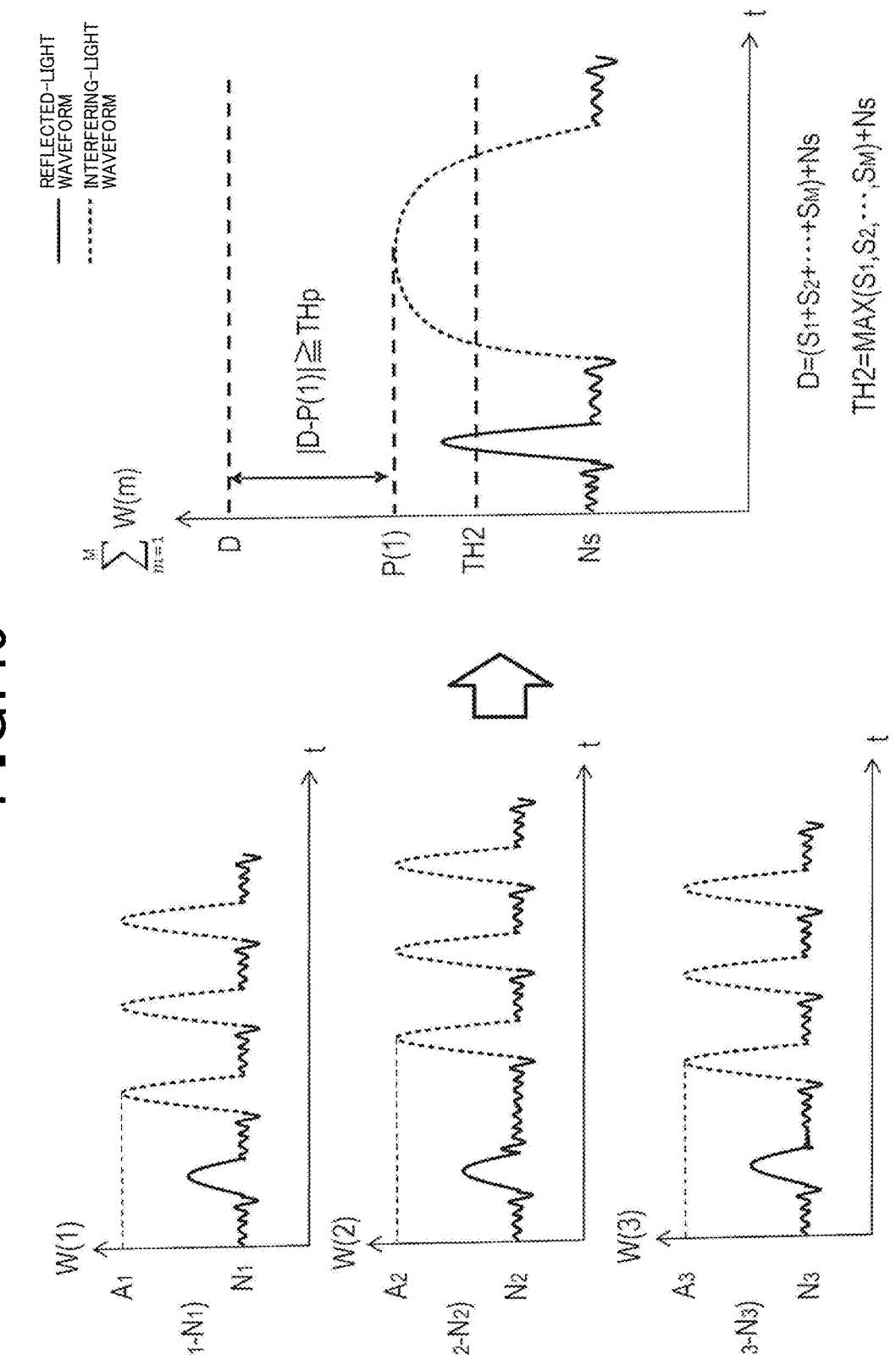
FIG. 49 is an illustration of each piece of received-light information and integrated received-light information in a case where interfering light peaks included in each piece of received-light information are higher than a reflected light peak.
Figure 50:
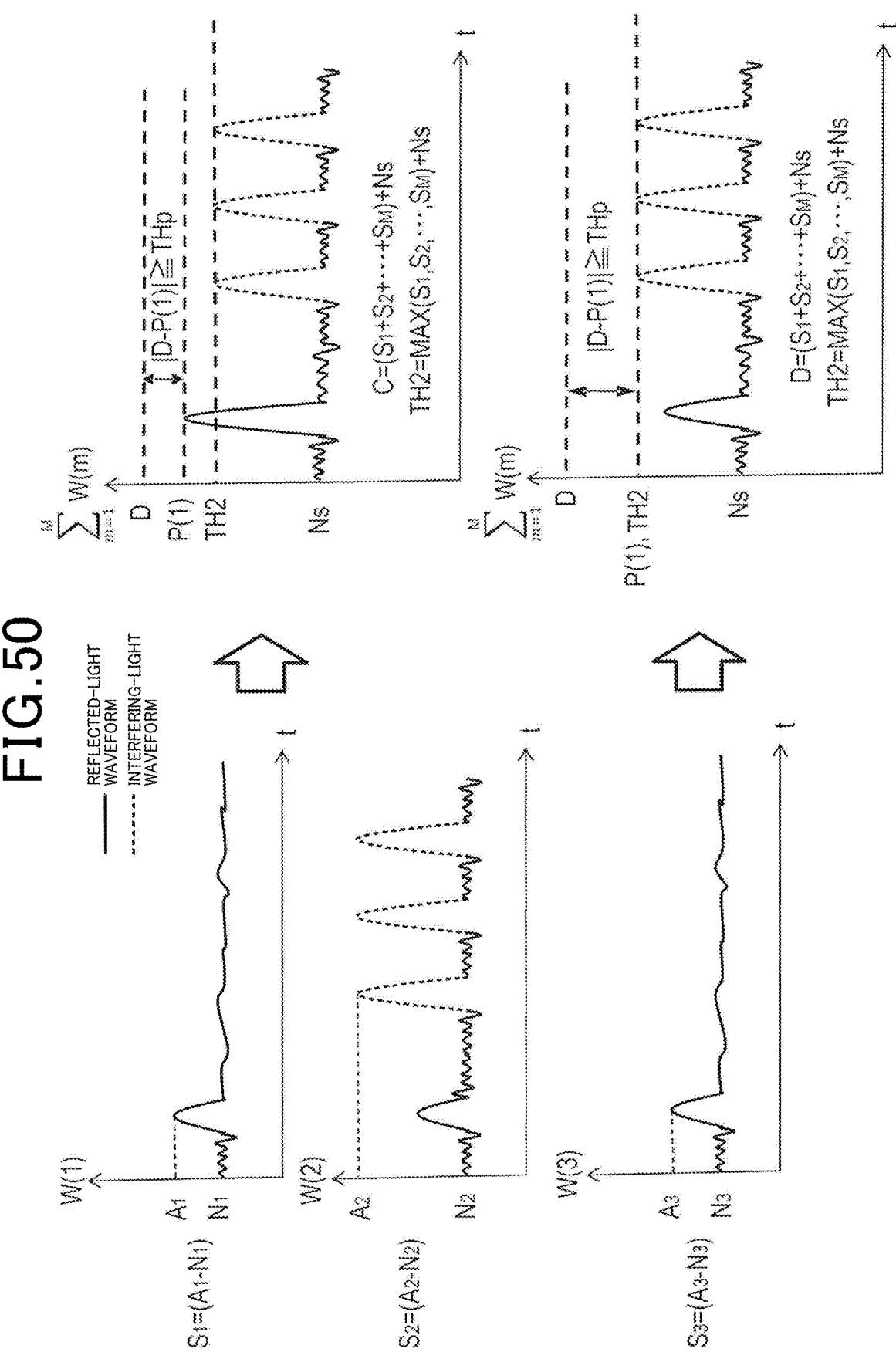
FIG. 50 is an illustration of each piece of received-light information and integrated received-light information in a case where interfering light peaks included in a piece of received-light information are higher than a reflected light peak.

As illustrated in FIGS. 49 and 50, in cases where the relative peak values $S_1$-$S_M$ extracted from the M pieces of received-light information include relative peak values based on interfering echoes, the comparison value D and the peak value P(1) are likely to be different. Therefore, when the equation (19) is not satisfied, it can be determined that the pieces of echo information EC(1) to EC (K) extracted by the ranging device 81j include interfering echoes. FIG. 49 illustrates a case where the relative peak values based on the interfering echoes are detected in all of the M pieces of received-light information, and FIG. 50 illustrates a case where the relative peak values based on the interfering echoes are detected in only one of the M pieces of received-light information.

16-3. Advantages

The sixteenth embodiment described in detail above can provide not only the advantage (1a) of the first embodiment and the advantages (10a) and (10b) of the tenth embodiment described above, but also the following advantage (16a).

(16a) In the present embodiment, when the emitted light from the flash type LiDAR is received as interfering light, the reflected light can be suppressed from being undetected due to the effect of the interfering light.

16-4. Modification

Figure 51:
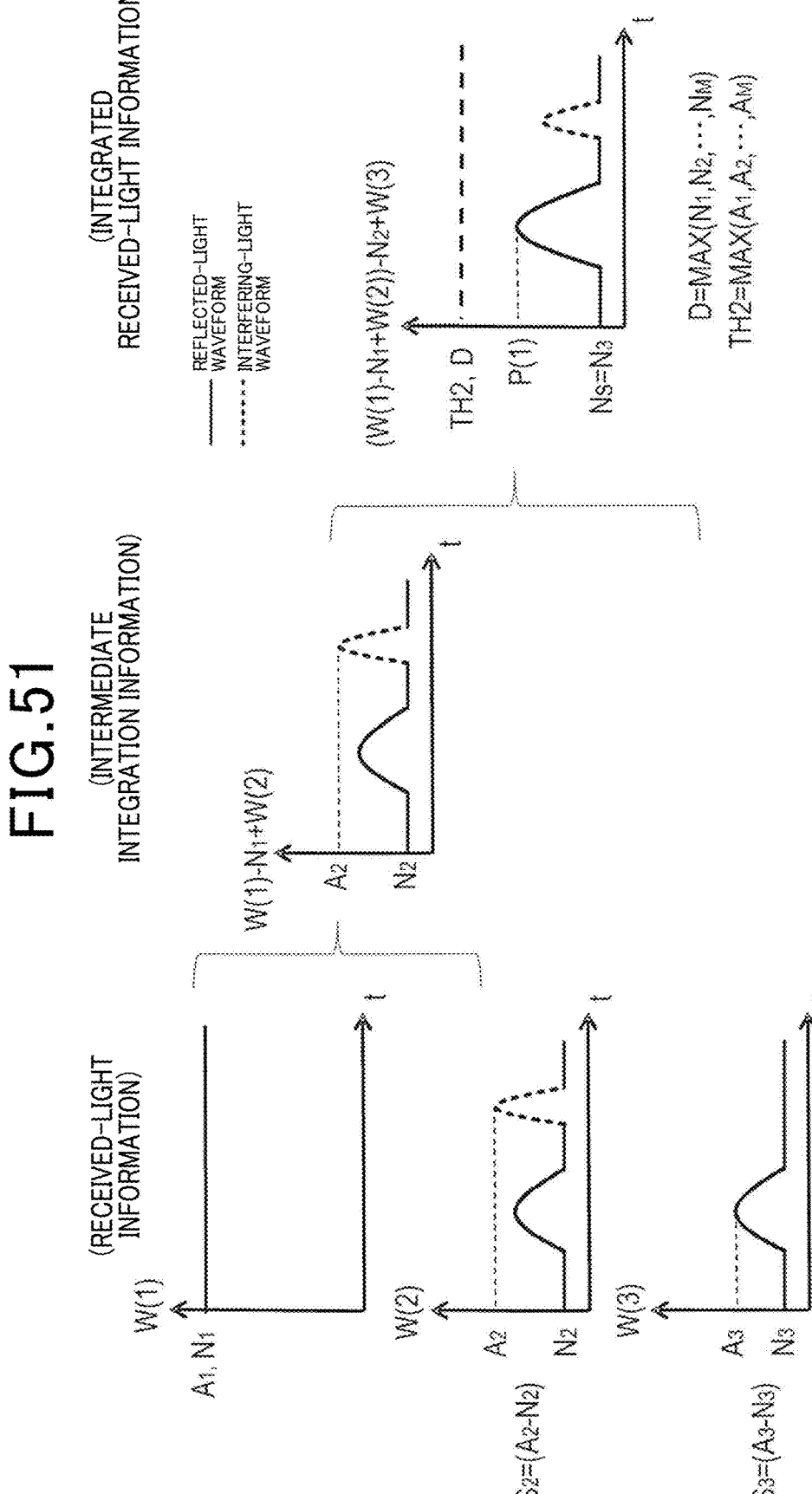
FIG. 51 is an illustration of each piece of received-light information, intermediate integrated information, and integrated received-light information according to a modification to the sixteenth embodiment.

In the present embodiment, in a configuration that the received-light integration unit 6 integrates the plurality of pieces of received-light information using the non-zero baseline sequential integration method and the secondary threshold setting unit 756 sets the secondary threshold TH2 to the maximum raw peak value Amax according to the equation (7), there will be the following issue. That is, as illustrated in FIG. 51, the individual baseline value $N_m$ may exceed the raw peak value $A_m$ of signal light and interfering light due to the variability of disturbance light. In FIG. 51, the first received-light information W(1) corresponds to such a case. In this case, A1=N1 is detected, which leads to the integrated received-light given by integrating the second to M-th pieces of received-light information. Then, since Amax=A1, the secondary threshold is set such that TH2=A1. As a result, all peaks detected in the integrated received-light information falls below the secondary threshold TH2, and thus not only interfering echoes but also reflected echoes may be undetected.

In this modification, the filtering unit 82p determines whether the following inequation (20) is satisfied, using P(1)=S2+A3 where P(1) is the amplitude of the echo information EC(1) detected using the primary threshold TH1.

$$P(1) < MAX(N_1, N_2, \dots, N_M) \qquad (20)$$

When the inequation (20) is satisfied, the filtering unit 82p is prohibited from performing the process using the secondary threshold TH2. For example, in cases where the reflected light is buried in disturbance light in any of the pieces of received-light information, the filtering unit 82p is prohibited from performing the process and all the pieces of echo information EC (1) to EC (K) extracted using the primary threshold TH1 are provided to the later processing. Although interfering echoes may be incorrectly detected as reflected echoes in the later processing, it is possible to suppress the reflected echoes from being left undetected.

17. Other Embodiments

It is to be understood that the invention is not to be limited to the specific embodiments disclosed above and that modifications and other embodiments are intended to be included within the scope of the appended claims.

(17a) In the determination unit 722 described in the present disclosure, the range above the determination threshold is extracted as the valid range, but the method of extracting the valid range is not limited thereto. Alternatively, for example, another determination threshold for extracting an interference range where interfering-light waveforms are estimated to be present may be set, and the interference range extracted using this other determination threshold is set as the invalid range, and the range other than the invalid range may be extracted as the valid range.

(17b) In the present disclosure, using the results of processing in the characteristic setting units 7, 7a, 7d to 7h, the distance calculation units 8, 8b, 8e, 8h, 8i exclude calculation results based on pulsed waveforms arising from interfering light. It is not necessary to exclude these calculation results. For example, instead of excluding distances calculated based on pulsed waveforms that exist in the invalid range (i.e., the specified range), the calculated distances may be flagged to indicate that they are based on interfering light. In this configuration, a later process or user using the distance calculation results may perform a process to remove the effects of interfering light according to the flag.

(17c) In the light receiving unit 3 described in the present disclosure, the SPADs are used as the light receiving elements, but the light receiving elements are not limited to the SPADs. Any type of light receiving element may be used as long as it can detect changes with time in received light intensity.

Figure 23:
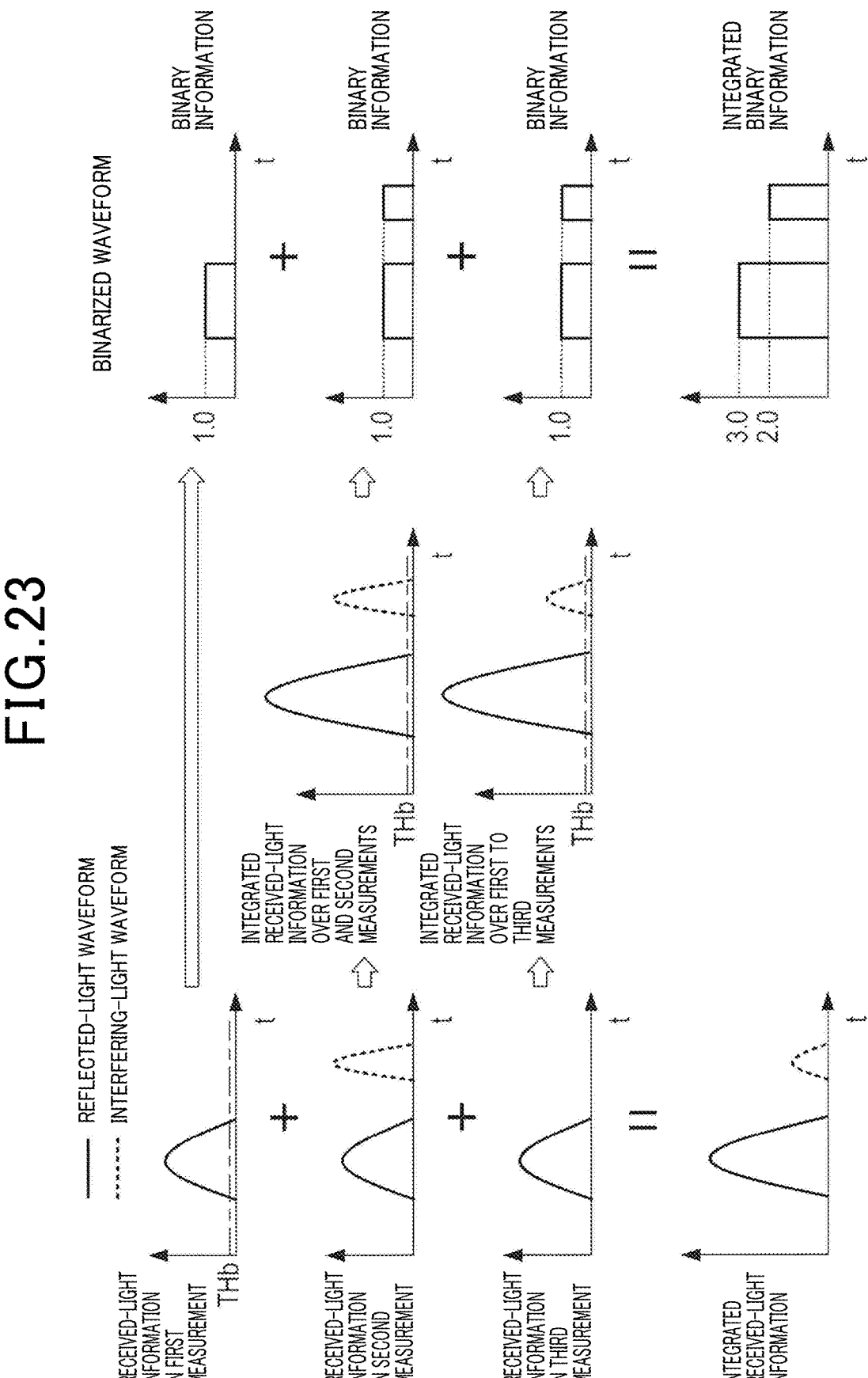
FIG. 23 is an illustration of binarizing received-light waveforms according to a modification, integrating received-light waveforms, and integrating binarized waveforms.
Figure 24:
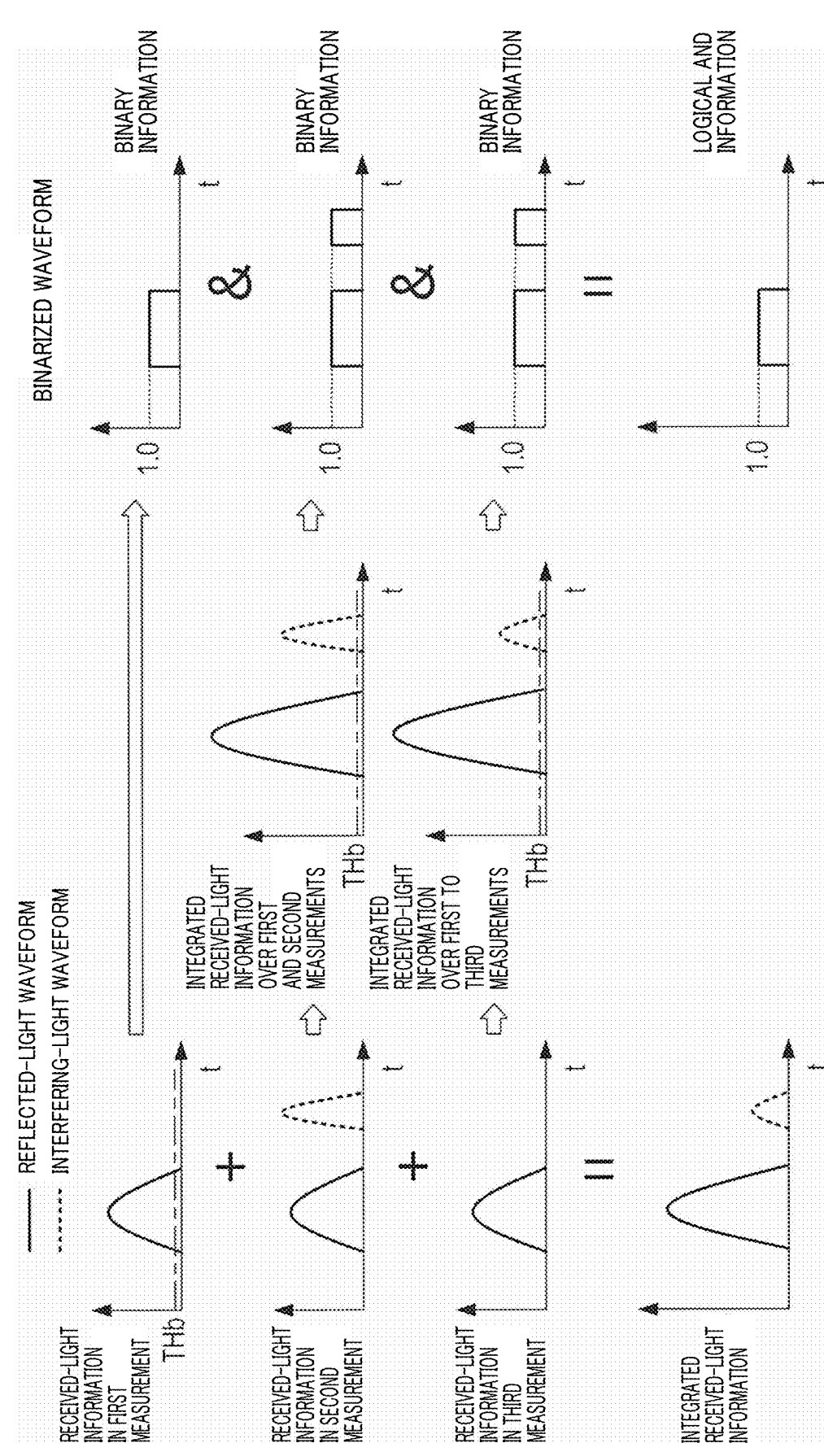
FIG. 24 is an illustration of binarizing received-light waveforms according to a modification, integrating received-light waveforms, and logically ANDing binarized waveforms.

(17d) The binarization unit 71 described in the present disclosure uses the plurality of pieces of received-light information to be integrated as the information subjected to binarization, but the information subjected to binarization is not limited thereto. For example, as illustrated in FIGS. 23 and 24, when the number of integrations on received-light information is three, the binarization unit 71 may use, as the information subjected to binarization, the first piece of received-light information, an integration of the first and second pieces of received-light information, and an integration of the first to third pieces of received-light information. That is, the received-light binary information may be generated by binarizing the received-light waveform indicated by the information generated sequentially in the process of integrating the received-light information using the preset binarization threshold THb.

In a configuration where such a binarization unit 71 is applied, regarding the integrated binary waveform indicated by the integrated binary information generated by the binary integration unit 721 illustrated in the first embodiment, the value in the time range where the interfering light waveform is detected is 2 as illustrated in FIG. 23, unlike the case of the first embodiment illustrated in FIG. 3. In addition, the waveform indicated by the logical AND information generated by the logical operation unit 723 illustrated in the second embodiment is, as illustrated in FIG. 24, similar as in the case of the second embodiment.

Figure 52:
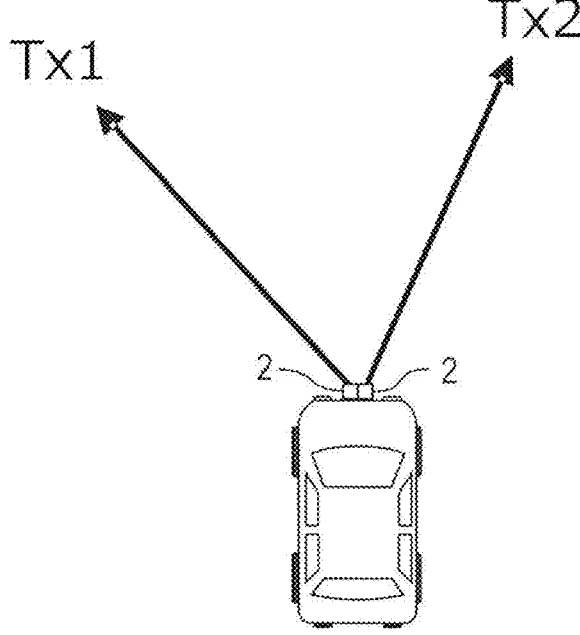
FIG. 52 is an illustration of a configuration where the ranging device includes a plurality of light emitting units and each light emitting unit emits light in a different direction.
Figure 53:
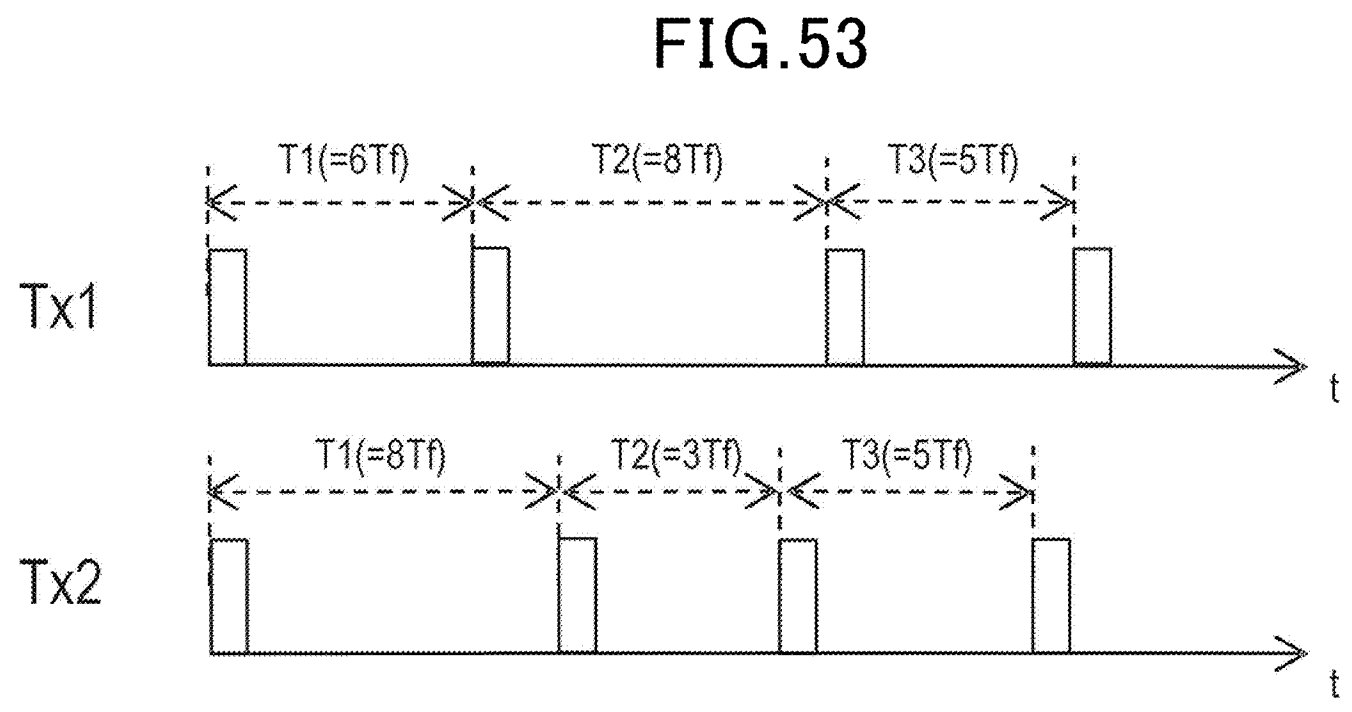
Figure 54:
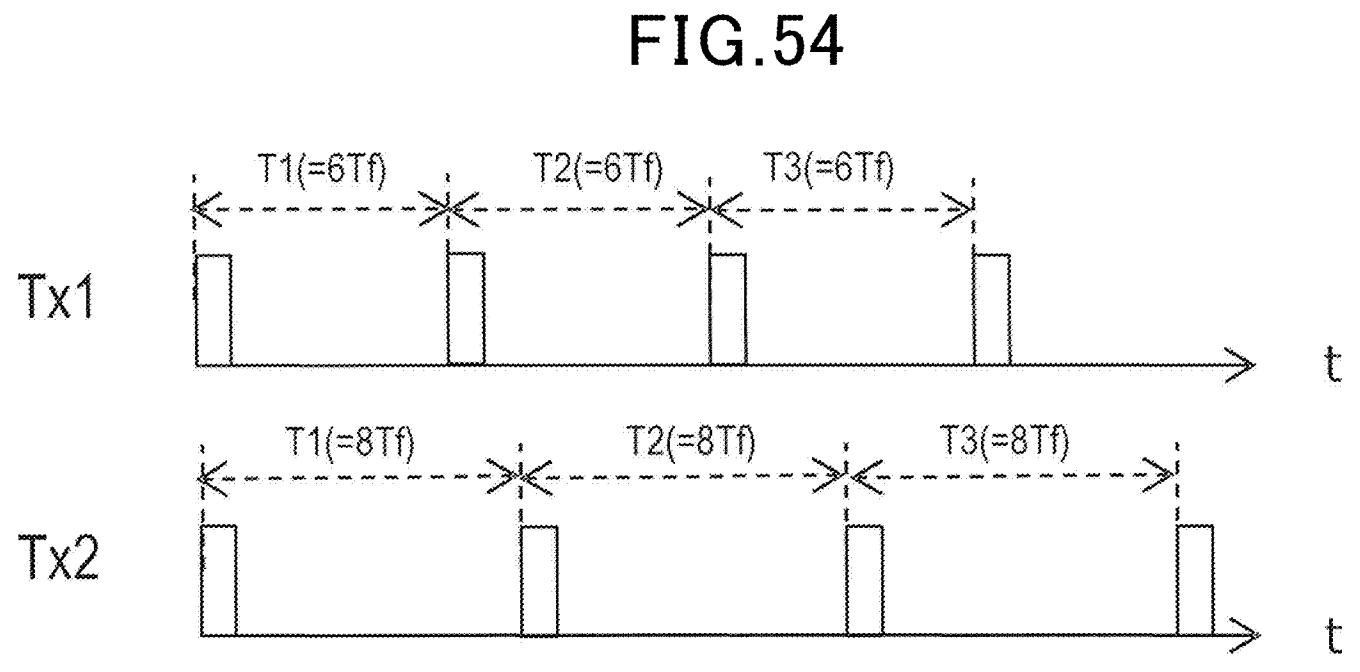

(17e) In the present disclosure, in one light emitting unit 2, the output intervals of the light emission trigger signal T1, T2, T3, . . . are randomly varied within a certain range, but the setting of the output intervals of the emission trigger signal is not limited thereto. For example, as illustrated in FIG. 52, a plurality of light emitting units 2 that emit light in different emission directions may be provided. In a configuration where a plurality of light emitting units 2 are provided, the output intervals may be randomly varied in each of the plurality of light emitting units 2, as illustrated in FIG. 53. As illustrated in FIG. 54, each of the light emitting units 2 may have a constant output interval, and each of the light emitting units 2 may have a different constant output interval. In a configuration where one light emitting unit 2 emits light in different emission directions as the scanner moves, such as a rider with a scanner mirror, the output interval may be varied with emission directions.

(17f) In the above-described embodiments and modifications, each of the processing units 5, 5a to 5p and its method described in the present disclosure may be implemented by a dedicated computer including a processor and a memory programmed to execute one or more functions embodied by computer programs. Alternatively, each of the processing units 5, 5a to 5p and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in each of the processing units 5, 5a to 5p does not necessarily include software, and all of its functions may be implemented using one or more pieces of hardware.

(17g) A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

(17h) In the appended claims, the method of calculating the integrated received-light information described in some claims may be applied to other claims. The method of setting the extraction threshold described in some claims may be applied to other claims. In such cases, the "extraction threshold" shall be read as the "secondary threshold".

(17i) The present disclosure is not limited to the above-described ranging device 1. Besides the ranging device 1 described above, the present disclosure may be implemented in various forms, such as a system including the ranging device 1 as a component, a program enabling a computer to serve as all or some of the processing units 5, 5a to 5p of the ranging device 1, a non-transitory tangible storage medium, such as a semiconductor memory, storing this program, and a ranging method.

What is claimed is:

1. A ranging device comprising:
a light emitting unit configured to emit light toward an object;
a light receiving unit configured to receive light reflected from the object;
a characteristic setting unit configured to extract, from one or more pieces of received-light information representing changes with time in amount of received light acquired by the light receiving unit, at least one of a received-light amount range and a light reception time range of pulsed light other than emitted light from the light emitting unit, as a specified range;
a received-light integration unit configured to generate integrated received-light information by integrating the received-light information on a time axis with emission timings matched over a plurality of light receptions; and
a distance calculation unit configured to exclude or identify distance noise formed of pulsed waveforms arising from pulsed light other than the emitted light, among pulsed waveforms with a peak value greater than an extraction threshold included in the integrated received-light waveform represented by the integrated received-light information, using the specified range extracted by the characteristic setting unit, and calculate a distance to the object reflecting the emitted light with light reception timing at which the pulsed waveforms peak, wherein the distance calculation unit comprises:

a ranging unit configured to, using the integrated received-light information, calculate the distance to the object from a time difference between light emission and light reception; and a filtering unit configured to, using a filter, remove, invalidate, or reduce pulsed light other than the emitted light in the integrated received-light information to be processed by the ranging unit, and the characteristic setting unit comprises:

a binarization unit configured to, using a binarization threshold that is either a preset threshold or a threshold calculated from information subjected to binarization, the information subjected to binarization including at least either the respective pieces of received-light information or information sequentially generated in a process of the received-light integration unit integrating the pieces of received-light information, generate received-light binary information representing a relationship between time and the information subjected to binarization binarized; and a filter generation unit configured to set filter characteristics of the filtering unit by extracting a valid range that represents at least one of a time range where reflected light from the object arising from the emitted light is estimated to exist and a time range where pulsed light other than the emitted light does not exist, in the integrated received-light information, using the received-light binary information.

2. The ranging device according to claim 1, wherein the filter generation unit comprises:

a binary integration unit configured to integrate a plurality of pieces of the received-light binary information generated by the binary integration unit on a time axis with the emission timings matched; and a determination unit configured to extract the valid range by binarizing an integration of the plurality of pieces of the received-light binary information using one of a preset and fixed threshold and a determination threshold calculated according to a number of integrations of the received-light binary information.

3. The ranging device according to claim 1, wherein the filter generation unit comprises a logical operation unit configured to extract the valid range by calculating a logical AND of the plurality of pieces of received-light binary information generated by the binarization unit on the time axis with the emission timings matched.

4. The ranging device according to claim 1, wherein the filter generation unit comprises:

a binary integration unit configured to integrate a plurality of pieces of the received-light binary information generated by the binary integration unit on a time axis with the emission timings matched; and a normalization unit configured to extract the valid range and set a gain in the valid range by dividing and normalizing an integration of the plurality of pieces of the received-light binary information by a number of integrations of the received-light binary information in the binary integration unit.

5. The ranging device according to claim 1, wherein the characteristic setting unit is configured to generate the filter by converting the valid range set on a time axis to the valid range on a distance axis, the distance calculation unit is configured to calculate distances for respective pulsed waveforms in the integrated received-light information, and the filtering unit is configured to apply the filter to the calculated distances to extract the distance included in the valid range for the filter.

6. The ranging device according to claim 1, wherein the characteristic setting unit is configured to generate the filter according to the valid range set on the time axis, the filtering unit in the distance calculation unit is configured to extract the time range included in the valid range by applying the filter to the integrated received-light information, and the ranging unit in the distance calculation unit is configured to calculate the distance for each pulsed waveform present in the extracted time range.

7. The ranging device according to claim 1, wherein the ranging unit in the distance calculation unit is configured to calculate intermediate data necessary for calculation of the distance for each pulsed waveform in the integrated received-light information, and the filtering unit in the distance calculation unit is configured to apply the filter to the calculated intermediate data to extract the intermediate data in the valid range for the filter, and calculate the distance to the object using the extracted intermediate data.

8. The ranging device according to claim 7, wherein the characteristic setting unit is configured to generate the filter by converting the valid range set on a time axis to the valid range on a distance axis, and the distance calculation unit is configured to apply the filter to the intermediate data that has been converted to data on the distance axis.

9. The ranging device according to claim 7, wherein the characteristic setting unit is configured to generate the filter according to the valid range set on the time axis, and the distance calculation unit is configured to apply the filter to the intermediate data that is data on the time axis.

10. The ranging device according to claim 1, wherein the light emitting unit is configured to change the emission timing for each of one or more emissions.

11. The ranging device according to claim 1, wherein the light emitting unit is configured to emit light in a plurality of emission directions such that a time interval of the emission timings is different for each emission direction.

* * * * *